(12) United States Patent
Mendoza-Schrock

(10) Patent No.: US 11,176,370 B2
(45) Date of Patent: Nov. 16, 2021

(54) DIFFUSION MAPS AND TRANSFER SUBSPACE LEARNING

(71) Applicant: Government of the United States as Represented by the Secretary of the Air Force, Wright-Patterson AFB, OH (US)

(72) Inventor: Olga Mendoza-Schrock, Kettering, OH (US)

(73) Assignee: United States of America as represented by the Secretary of the Air Force, Wright-Patterson AFB, OH (US)

(*) Notice: Subject to any disclaimer, the term of this patent is extended or adjusted under 35 U.S.C. 154(b) by 36 days.

(21) Appl. No.: 16/458,126

(22) Filed: Jun. 30, 2019

(65) Prior Publication Data
US 2020/0050825 A1    Feb. 13, 2020

Related U.S. Application Data

(60) Provisional application No. 62/868,205, filed on Jun. 28, 2019, provisional application No. 62/692,911, filed on Jul. 2, 2018.

(51) Int. Cl.
*G06K 9/00* (2006.01)
*G06K 9/62* (2006.01)

(52) U.S. Cl.
CPC ......... *G06K 9/0063* (2013.01); *G06K 9/6234* (2013.01); *G06K 2209/21* (2013.01)

(58) Field of Classification Search
CPC . G06K 9/0063; G06K 9/6234; G06K 2209/21

USPC ........................................................ 382/103
See application file for complete search history.

(56) References Cited

U.S. PATENT DOCUMENTS 6,347,762 B1 * 2/2002 Sims .................... F41G 7/2226
244/3.1

OTHER PUBLICATIONS

O. Mendoza-Schrock, M. M. Rizki, and V. J. Velten, "Manifold and Transfer Subspace Learning for Cross-Domain Vehicle Recognition in Dynamic Systems", Proc. IEEE Int. Conf. on Information Fusion, Jul. 2015.

Mendoza-Schrock, Olga, M. M. Rizki, E. G. Zelnio, V. J. Velten, F. D. Garber, M. L. Raymer, J. C. Gallagher, "Exploring EO Vehicle Recognition Performance using Manifolds as a function of Lighting Condition Variability" Proc. SPIE DSS 111 Ground/Air Multisensor Interoperability, Integration, and Networking for Persistent ISR V, Apr. 2015.

* cited by examiner

*Primary Examiner* — Mark Roz
(74) *Attorney, Agent, or Firm* — AFMCLO/JAZ; David E. Franklin

(57) ABSTRACT

A method, computer program product, and customized image processing system provide aided target recognition (AiTR) using manifold transfer substance learning (MTSL). The method includes receiving image data. The method includes performing manifold learning technique comprising diffusion mapping on the received image data to transform the received image data. The method includes applying a transfer subspace learning technique comprising Transfer Fishers Linear Discriminative Analysis (TrFLDA) to the transformed data to recognize an object within the image data.

4 Claims, 36 Drawing Sheets

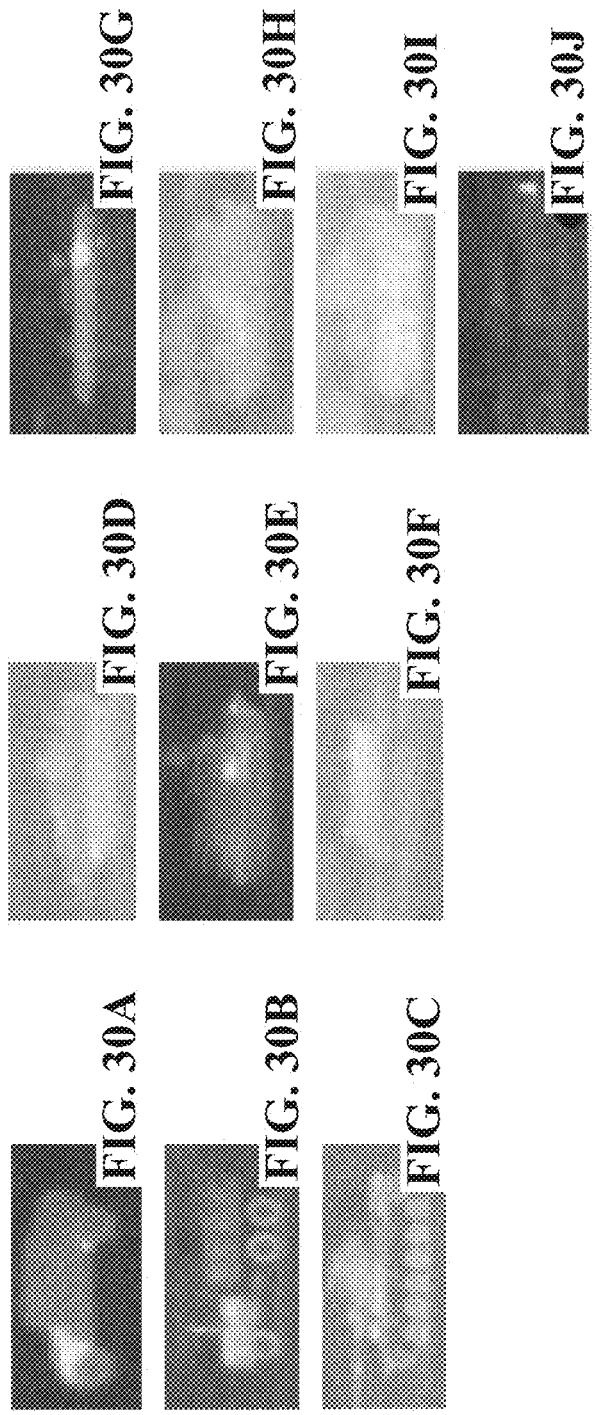

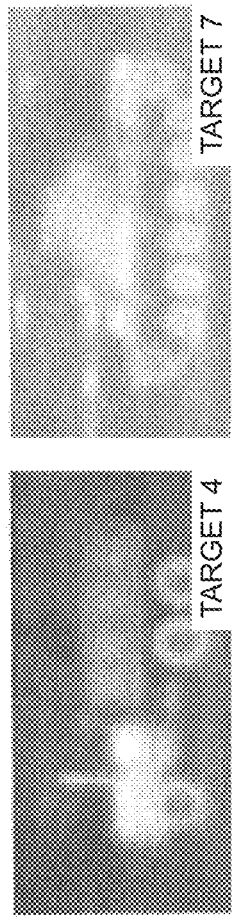
FIG. 31A
FIG. 31B
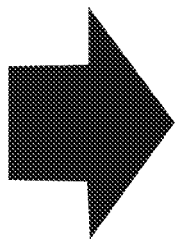
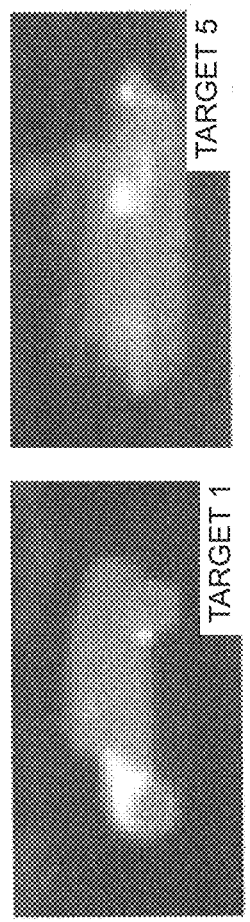
FIG. 31C
FIG. 31D

3400

Algorithm I: Manifold Transfer Subspace Learning (MTSL)

Input: High-dimensional source and target data, $X_S = \{x_1^S, x_2^S, \cdots, x_{N_S}^S\} \subset R^D$ and $X_T = \{x_1^T, x_2^T, \cdots, x_{N_T}^T\} \subset R^D$, and parameters $\sigma$, $t$, $d$, and $\lambda$

Output: Low-dimensional source and target data, $Y_S = \{y_1^S, y_2^S, \cdots, y_{N_S}^S\} \subset R^d$ and $Y_T = \{y_1^T, y_2^T, \cdots, y_{N_T}^T\} \subset R^d$, where $d \ll D$, and classification rates 1. Normalize the source and target data
2. Manifold Learning Step: Compute the Diffusion Maps coordinates for the source data and the coordinates for the target data using the Nystrom extension:
    a) Compute the probability matrix $P_S \in R^{N_S \times N_S}$ and matrix $W_{DM} \in R^{N_S \times d}$ with the eigenvectors and compute
    $$X_S^{DM} = P_S W_{DM}$$
    b) Nystrom Extension: Compute the probability matrix $P_{TS} \in R^{N_T \times N_S}$ and compute
    $$X_T^{DM} = P_{TS} W_{DM}$$
3. Transfer Subspace Learning Step: Compute the projection matrix $W^*$ by solving the optimization problem
    $$\max_{W \in R^{D \times d}} (1-\lambda) F(W, X_S^{DM}) + \lambda D(W, X_S^{DM}, X_T^{DM})$$
4. Compute the source and target data in the low dimensional subspace as follows:
    $$Y_S = X_S^{DM} W^* \text{ and } Y_T = X_T^{DM} W^*$$
5. Classification Step: Compute the classification rates for the target data

*FIG. 34*

DIFFUSION MAPS AND TRANSFER SUBSPACE LEARNING

CROSS-REFERENCE TO RELATED APPLICATIONS

This application claims the benefit of priority under 35 U.S.C. § 119(e) to U.S. Provisional Application Ser. No. 62/692,911 entitled "Diffusion Maps And Transfer Subspace Learning", filed 2 Jul. 2018, the contents of which are incorporated herein by reference in their entirety. This application also claims the benefit of priority under 35 U.S.C. § 119(e) to U.S. Provisional Application Ser. No. 62/868,205 entitled "Diffusion Maps And Transfer Subspace Learning", filed 28 Jun. 2019, the contents of which are incorporated herein by reference in their entirety.

ORIGIN OF THE INVENTION

The invention described herein was made by employees of the United States Government and may be manufactured and used by or for the Government of the United States of America for governmental purposes without the payment of any royalties thereon or therefore.

BACKGROUND

1. Technical Field

The present disclosure generally relates to image processing and more particularly to aided target recognition.

2. Description of the Related Art

Background: This chapter includes background information that provides context for the research conducted for the present disclosure. The material includes a review of the literature and a description of the key techniques used in the present disclosure—Manifold Learning and Transfer Subspace Learning.

Research in Aided Target Recognition (AiTR) has a rich history. In fact the first survey paper dates back to 1986. At that time, the field was referred to as Automatic Target Recognition. Recently the term 'Automatic' has lost favor, at least within the Air Force community. Instead, the term 'Aided' is preferred to emphasize that the human will always be in control of the technology, or at least for the foreseeable future. Aided Target Recognition includes both identification of relevant features and classification. At this time there is no favored algorithmic technique, nor feature space, which has been shown superior to others. The deciding factors are not just algorithm performance and ease of training, but also algorithm speed and storage requirements.

The ability to classify (identify or recognize) an object is of extreme importance for both civilian and noncivilian applications. Consequently AiTR is a heavily funded area as evidenced by the great number of articles, books, funding opportunities, special sessions in conferences and workshops, and special issues on selected topics which occur or are published annually. It is impractical to review these topics in their entirety. Therefore to avoid confusion and dilution of the primary contributions we limit the discussion to electrooptical AiTR. For noncivilian applications the state-of-the-art leaves much to be desired as cross-domain and real-time classification have yet to be truly investigated.

The main limitation of AiTRs is the requirement for a large amount of data, especially for the target classes that are being classified. Not only is there a need for data samples but also for labeled data. The techniques investigated in the present disclosure are unique as they can not only handle situations where the source and target classes are different but also when the amount of labeled samples for the target classes is small. Current attempts in the development of sophisticated exploitation algorithms which apply computationally efficient signal processing methods have had limited success, and lack a proper understanding and emphasis on relevant information extraction and dimensionality reduction. To address these concerns the present disclosure investigates manifold and transfer learning algorithms and models that can adequately capture the nonlinear salient lower-dimensional subspaces of large high-dimensional multimodal datasets generated from sensors in a Layered Sensing paradigm.

Manifold learning is the process of finding an intrinsically low-dimensional structure embedded in data that resides in a high-dimensional space. Before moving into a general discussion on manifold learning a brief introduction to terminology is appropriate. A "manifold" is a topological space that is locally Euclidean (i.e., around every point, there is a neighborhood that is topologically the same as the open unit ball in relation). The key idea behind manifold learning is that although the data collected may be in a high dimensional ambient space, the information may reside in a lower dimensionality manifold. If one can "learn" the structure of this manifold, estimation and inference are much more efficient.

Manifold learning is also known as nonlinear dimensionality reduction technique as the resulting manifold is of a lower dimensionality compared to the original higher-dimensional feature space. The goal of manifold learning techniques is to learn a mapping from the data observation space to a lower-dimensional space that captures salient structure in the data. These techniques exploit the underlying "Manifold Assumption" on the observed data which asserts that the observed high-dimensional data is parametrized by only a few degrees of freedom. Under this assumption we say that the data resides on a low-dimensional manifold embedded in a high-dimensional space. Common techniques in manifold learning include diffusion maps, Laplacian Eigenmaps, Local Linear Embedding, Principle Component Analysis, and Multi-dimensional Scaling. These techniques differ from one another in regards to speed, sensitivity to parameters, the ability to handle sparsity, the ability to handle nonconvexity, etc. but they all share the same goal—to resolve the lower dimensional structure of the data. These techniques are all relevant as they are commonly cited and utilized in dimensionality reduction applications. The benefits of dimensionality reduction include efficient processing, visualization, and data collection reduction.

Although the research in this area is extensive, there are still gaps that prevent the techniques from being used in real-world applications. Challenges include intense tuning of parameters and the delicate balance between reducing the dimensionality of the data at the expense of discarding relevant information. Furthermore, some of the techniques (e.g. Isomaps) suffer from poor performance of their out-of-sample extension (OSE) method. If the OSE is not reliable then the manifold would need to be recreated each time a new sample is added to database thus making such techniques computationally intractable for real-world applications.

BRIEF SUMMARY

In one aspect, the present disclosure provides a method, computer program product, and customized image processing system for aided target recognition (AiTR) using manifold transfer substance learning (MTSL). The method includes receiving image data. The method includes performing manifold learning technique comprising diffusion mapping on the received image data to transform the received image data. The method includes applying a transfer subspace learning technique comprising Transfer Fishers Linear Discriminative Analysis (TrFLDA) to the transformed data to recognize an object within the image data.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 30 illustrates a composite depiction of ten examples of Comanche Army Research Laboratory (ARL) dataset with all vehicles being at 90° viewing angle and at approximately 2000 meters;

FIG. 31 illustrates a conceptual flowchart of cross-domain transfer challenge using the Comanche database;

FIG. 34 is a textual depiction of an algorithm for Manifold Transfer Subspace Learning (MTSL), according to one or more embodiments.

DETAILED DESCRIPTION

Figures 1A, 1B, 1C:
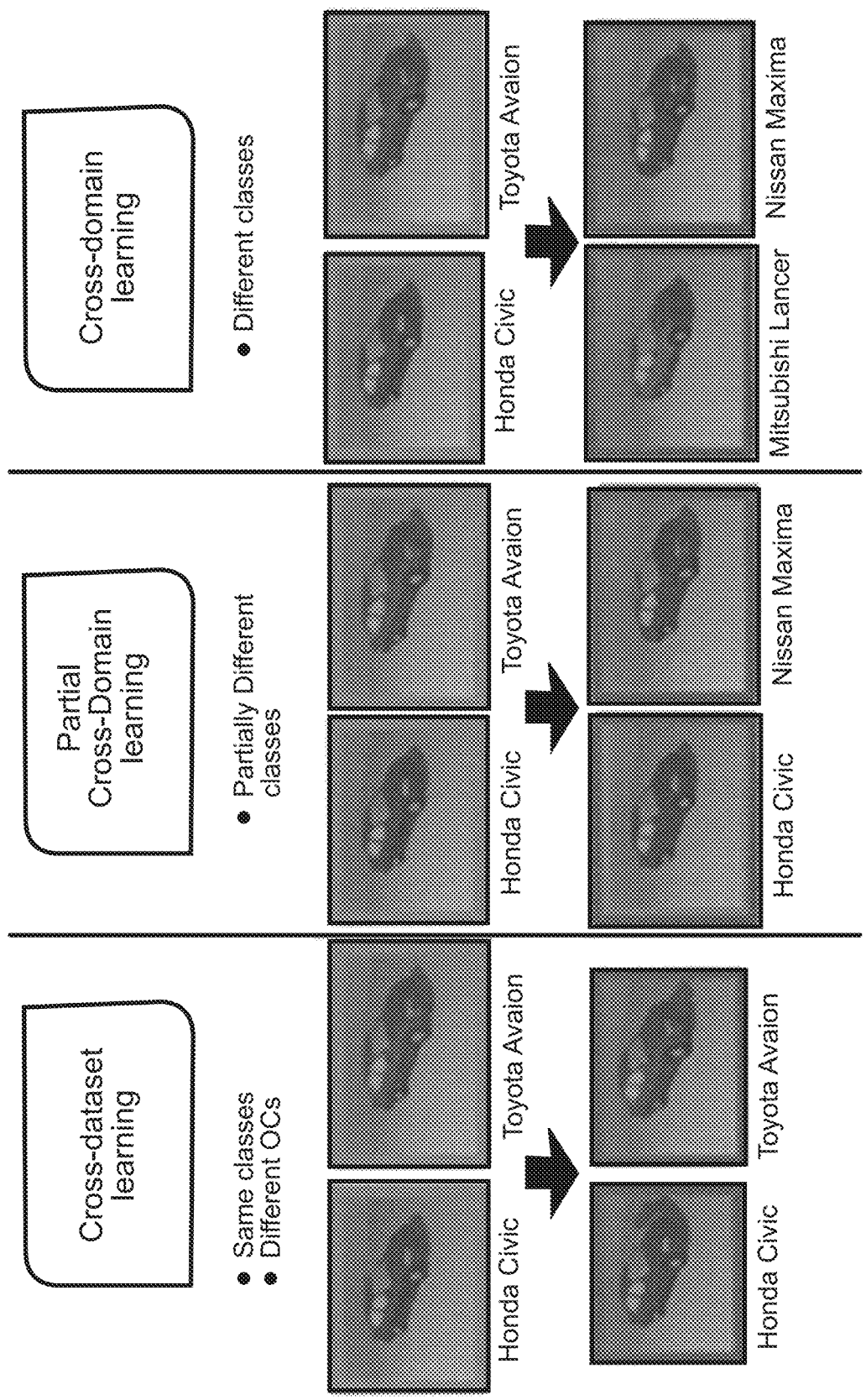
FIG. 1A illustrates a graphical diagram of cross-dataset learning, according to one or more embodiments.
FIG. 1B illustrates a graphical diagram of partial cross-domain learning, according to one or more embodiments.
FIG. 1C illustrates a graphical diagram of cross-domain learning, according to one or more embodiments.

A method, computer program product, and customized image processing system provide aided target recognition (AiTR) using manifold transfer substance learning (MTSL). The method includes receiving image data. The method includes performing manifold learning technique comprising diffusion mapping on the received image data to transform the received image data. The method includes applying a transfer subspace learning technique comprising Transfer Fishers Linear Discriminative Analysis (TrFLDA) to the transformed data to recognize an object within the image data.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Transfer Subspace Learning has recently gained popularity for its ability to perform cross-dataset and cross-domain object recognition. The ability to leverage existing data without the need for additional data collections is attractive for Aided Target Recognition applications. For Aided Target Recognition (or object assessment) applications, Transfer Subspace Learning is particularly useful, as it enables the incorporation of sparse and dynamically collected data into existing systems that utilize large databases. In the present disclosure, Manifold Learning and Transfer Subspace Learning are combined to create new Aided Target Recognition systems capable of achieving high target recognition rates for cross-dataset conditions and cross-domain applications. The Manifold Learning technique used in the present disclosure is Diffusion Maps, a nonlinear dimensionality reduction technique based on a heat diffusion analogy. The Transfer Subspace Learning technique used is Transfer Fishers Linear Discriminative Analysis. The new Aided Target Recognition systems introduced in the present disclosure are (i) Manifold Transfer Subspace Learning, which combines Manifold Learning and Transfer Subspace Learning sequentially, and (ii) Transfer Diffusion Maps, which simultaneously integrates Manifold Learning and Transfer Subspace Learning. Finally, the ability of the new techniques to achieve high target recognition rates for cross-dataset and cross-domain applications is illustrated using a variety of diverse datasets.

INTRODUCTION: Transfer Subspace Learning (TSL) has found a diverse range of applications, including cross-domain face recognition and text categorization. TSL is an enabler for data fusion and dynamic model building, an important component for Dynamic Data Driven Application Systems (DDDAS). The focus of this study is to extend the TSL framework by combining it with Manifold Learning for a robust Aided Target Recognition (AiTR) system capable of achieving high target recognition rates for cross-dataset and cross-domain target recognition.

We seek to build an AiTR system that is robust to different operating conditions including sensor modality, lighting conditions, shadows, weather, sensor type, terrain, image quality, and quality of metadata. A robust AiTR system would leverage all available "similar" data to recognize a new target of interest to avoid having to collect large amounts of data on a new target before a recognition model could be built.

Data collections are resource intensive and costly, on the order of tens of thousands to a million dollars depending on the scope of the collection, the number of sensors utilized, and the complexity of the scenarios. Often, AiTR systems which are built utilizing data from a particular data collection suffer from dramatic performance loss when utilizing data from a different data collection or under real-world scenarios. By utilizing TSL, AiTRsystems can be extended to dynamic systems where they are more robust and applicable to scenarios outside of the ones from which they were developed.

In the present disclosure, Manifold Learning and Transfer Subspace Learning are combined to create new dynamic Aided Target Recognition (AiTR) systems capable of achieving high target recognition rates for cross-dataset conditions and cross-domain applications. The Manifold Learning technique used in the present disclosure is Diffusion Maps, a nonlinear dimensionality reduction technique based on a heat diffusion analogy. The Transfer Subspace Learning technique used is Transfer Fisher's Linear Discriminative Analysis, based on the standard Fisher's Linear Discriminative Analysis. The new AiTR systems introduced are (i) Manifold Transfer Subspace Learning, which combines Manifold Learning and Transfer Subspace Learning sequentially, and (ii) Transfer Diffusion maps which simultaneously integrates Manifold Learning and Transfer Subspace Learning.

Finally, the ability of the new techniques to achieve high target recognition rates for cross-dataset and cross-domain applications is illustrated using a diverse set of datasets. The datasets include (i) the electro-optical (EO) synthetic vehicle dataset, (ii) the MNIST handwritten digits dataset, (iii) a microarray gene expressions dataset from the Biomedical Knowledge Repository developed at the National Library of Medicine, and (iv) a military vehicles dataset collected by a forward looking infrared (FLIR) sensor and provided by the Army Research Laboratory (ARL). The cross-dataset experiments use information about a set of objects under one set of operating conditions to recognize the same set of objects under a different set of operating conditions. For instance, using the electro-optical (EO) synthetic vehicle dataset, we use information about a set of vehicles under one set of lighting conditions to recognize the same set of vehicles under a different set of lighting conditions. The cross-domain experiments use information about one set of objects to recognize a similar but different set of objects. Specifically, using the microarray gene expressions dataset, we use information about positive and negative lung cancer cells to recognize positive and negative breast cancer cells.

MOTIVATION: Aided Target Recognition (AiTR) techniques typically rely on large databases of data both for the "training" data and for the "testing" data including a large number of labeled samples. For typical AiTR techniques, it is common in the literature to report results using data from one data collection and reserve a part from the same collection for training and a part for testing. The process is usually referred to as sequestration and the sequestered data is utilized for testing and/or validation. However, under many real-world scenarios; the amount of data is often restricted and the amount of labeled data is even more restricted. In the commercial and academic world it can be relatively inexpensive to label data because the data doesn't have any access restrictions and the public can usually help label data. However, for military applications where the data has access restrictions, it is very expensive to label data. Furthermore, it is also time-prohibitive for real-time applications. Furthermore, even when data is plentiful, it may lack sufficient quality. Novel techniques are required that can exploit "similar" data in order to classify new targets.

The purpose of Transfer Learning is to utilize information for recognition in one domain to recognize objects in a different but related domain. The idea is to leverage information from the source classification problem to better classify the instances in the transfer classification problem. Without the transfer learning algorithms, the solutions to this problem would be limited.

Transfer Learning should not be confused with the sequestration process explained above. In fact, to avoid confusion, new terminology is introduced. The database that is labeled and well-understood is the "source" data while the database that is related and not labeled is the "target data". Transfer Learning recognition is different in that it utilizes data from one data collection for training and data from a completely different data collection, potentially under different operating conditions, for testing.

For cross-domain recognition the objects and the labels are different but "similar" where the definition of similar is application dependent. For facial recognition similar would mean that the objects are all faces. In generally-known datasets, faces utilized did not share the same subjects but were all faces under a set of restricted poses.

In the present disclosure, for cross-dataset recognition "similar" is defined to be the same set of objects under different operating conditions (OCs) such as two different lighting conditions or two different viewing ranges. For cross-domain recognition "similar" is defined to be objects in the same class, such as vehicles or digits. As long as the source contains vehicles and the target contains vehicles then a cross-domain recognition challenge can be constructed.

Another type of transfer learning scenario explored in the present disclosure is partial cross-domain learning. This is when an object is both in the source and target classification problem, but the other objects are different. Hence, it is not a genuine cross-domain problem since there is an overlap between the source and target objects. This is a realistic scenario especially in large research organizations when suppose one team collects data on a Honda Civic and a Toyota Avalon and another team across the country collects data on a Honda Civic and a Nissan Maxima. This is a scenario where these Transfer Learning techniques could be of great benefit.

The different types of learning are illustrated in FIG. 1A C. FIG. 1A illustrates a graphical diagram of cross-dataset learning. Cross-dataset learning uses the same objects for source and target but the operating conditions are different as illustrated in FIG. 1A, where the source data is the Honda Civic and the Toyota Avalon and the target data is also the Honda Civic and the Toyota Avalon but under different lighting conditions. FIG. 1B illustrates a graphical diagram of partial cross-domain learning. Partial cross-domain learning is illustrated in FIG. 1B, where the source data is the Honda Civic and the Toyota Avalon while the target classification objects are the Honda Civic and the Nissan Maxima. FIG. 1C illustrates a graphical diagram of cross-domain learning. Finally cross-domain learning is illustrated in FIG. 1C where the source data is the Honda Civic and the Toytota Avalon and the targets are still sedans but they are the Mitsubishi Lancer and the Nissan Maxima.

The new Aided Target Recognition systems introduced in the present disclosure based on Transfer Subspace Learning are particularly useful for military application allowing the recognition of targets which were not in the original training database by utilizing the original database to provide some information about the new target. This includes scenarios disadvantaged by having very few samples, very few labeled samples, very few high-quality samples, or a mixture of all three. For industry applications the contributions of this effort are also of interest but the main advantage is for military applications as commercial applications usually have the advantage of having a large number of target samples such as in image or text classification. The contributions made in the present disclosure expand the state-of-the-art techniques in Transfer Subspace Learning and are summarized in the following section.

CONTRIBUTIONS: There are several research questions that are addressed in the present disclosure. First, we develop a methodology for evaluating and predicting the performance of a Transfer Subspace Learning system and identify an appropriate approach to evaluate the utility of transfer learning. The objective of transfer Subspace Learning is to compute a lower-dimensional projection subspace which separates the source data and aligns the distributions of the source and target data in the projected subspace. This lower-dimensional subspace is computed as the solution to an optimization problem in which the objective function is a linear combination or weighted sum of (i) separating the source data and (ii) aligning the distributions for the source and target data. The term measuring the alignment of the distributions is referred to as the regularization term.

Currently Transfer Subspace Learning techniques use an arbitrary weight for the regularization term and the classification results are analyzed to see if an increase or decrease in classification accuracy has occurred, but there is no methodology for selecting the appropriate weight for the regularization term. Generally there is a trade-off between separating the source data and aligning the distributions of the source and target data. That is, as the weight assigned to the regularization term increases, the alignment of the distribution will increase but classification rates for the source data may decrease. In addition there is the need to quantify the improvement in classification performance and to predict how well Transfer Subspace Learning will work in different situations.

An important contribution of the present disclosure is to combine Manifold Learning and Transfer Subspace Learning to create new Aided Target Recognition systems capable of achieving high target recognition rates for cross-dataset and cross-domain applications. Manifold Learning techniques such as Diffusion Maps can capture the basic structure of the data in lower-dimensional subspace which may improve the effectiveness of Transfer Subspace Learning. However the key question here is how to formally combine Manifold Learning with Transfer Subspace Learning. Transfer Subspace Learning is a linear technique which uses a linear transformation to project the source and target data into the lower-dimensional subspace, while Manifold Learning techniques such as Diffusion Maps are non-linear techniques. The key contributions of the present disclosure are summarized in the following subsections.

Improved TrFLDA Algorithm: As mentioned previously the objective of Transfer Subspace Learning is to compute a lower-dimensional projection subspace which separates the source data and aligns the distributions of the source and target data in the projected subspace. Therefore Transfer Subspace Learning consists of a basic technique for the analysis of the source data and a technique for measuring the alignment of the distributions. For illustration and comparison purposes in the present disclosure the Transfer Fisher's Linear Discriminant Analysis (TrFLDA) is utilized as the basic framework in which FLDA is the basic technique for the analysis for the source data and a Kernel Density Estimation (KDE) technique is used for measuring the alignment of the distributions.

In the present disclosure several improvements to the existing TrFLDA algorithm are made including (1) the implementation of relative weights, (2) a reformulation of the objective function, and (3) improvements to the KDE technique. Although these changes are relatively minor, the enhanced version of TrFLDA consistently outperforms the classic implementation. More importantly the basic TrFLDA framework is utilized to provide a methodology for selecting the appropriate weight for the regularization term and for quantifying the improvement in classification performance brought about by transfer learning.

Manifold Transfer Subspace Learning (MTSL): The second significant contribution is the formal combination of Transfer Subspace Learning (TSL) and Manifold Learning in a sequential process referred to as Manifold Transfer Subspace Learning (MTSL). In the present disclosure the Diffusion Maps (DM) is utilized as the Manifold Learning technique and TrFLDA as the Transfer Subspace Learning method. The basic framework for Manifold Transfer Subspace Learning can be described as a sequential process. In step one, the original source and target data are transformed using Diffusion Maps. Then, in step two the TrFLDA technique is used with the transformed data.

An important question in this context is how to compute the appropriate parameters for the Diffusion Maps technique. Therefore in the present disclosure a strategy for the parameter selection is included. Another question is how to compute the Diffusion maps coordinates for the target data. In the present disclosure, the "out-of-sample-extension" (OSE) method based on the Nystrom extension method are employed and a new and more effective method, referred to as the 'merge' method is employed. As shown in the experimental analysis the new MTSL technique using the "merge" method consistently outperform the enhance TrFLDA technique.

Transfer Diffusion Maps (TrDM): The third significant contribution is the development of a second novel Transfer Subspace Learning (TSL) technique referred to as Transfer Diffusion Maps (TrDM). TrDM simultaneously combines Manifold Learning and Transfer Subspace Learning. As mentioned previously Transfer Subspace Learning is based on an optimization framework where the objective function is a linear combination of (i) the basic technique used to separate the source data and (ii) the regularization term measuring the alignment of the distributions. Therefore a technical challenge in this dissection is to formulate the Diffusion Maps technique as an optimization problem.

Diffusion maps is a nonlinear dimensionality reduction technique in which the data is transformed into a weighted graph and the Diffusion Maps coordinates are computed using the eigenvalues and eigenvectors of the associated Markov transition probability matrix. Therefore a considerable effort is employed to reformulate the Diffusion Maps technique as an optimization problem. In other words, to simultaneously combine Diffusion Maps and Transfer Subspace Learning, it was first necessary to obtain the Diffusion Maps coordinates for the data as the solution to an optimization problem.

As with the previous technique an important question in the context of TrDM is how to compute the Diffusion Maps coordinates for the target data. As before we employ the existing "out-of-sample-extension" (OSE) method based on the Nystrom extension method and the new "merge" method. As is shown in the Experimental results chapter, except for the handwritten digits database, the new TrDM technique using the "merge" method consistently outperformed the other techniques and was particularly impressive in the experiments with the microarray gene expressions database. The introduction of the new TrDM technique together with the analysis and results of the experiments have greatly contributed to an improved understanding of the Diffusion Maps technique. For example a relevant observation is the finding that manifolds produced with the Diffusion Map method are scale invariant.

The present disclosure provides the following: (i) background material a general description of the key techniques used in the present disclosure—Manifold Learning and Transfer Subspace Learning; (ii) theoretical analysis for the new Aided Target Recognition systems presented in the present disclosure; (iii) a more formal description of the Transfer Fishers Linear Discriminant Analysis (TrFLDA) technique and the improvements made to the existing TrFLDA algorithm; (iii) an introduction to Manifold Transfer Subspace Learning (MTSL) which sequentially combines Diffusion Maps (DM) and Transfer Fishers Linear Discriminant Analysis (TrFLDA); (iv) an introduction to Transfer Diffusion Maps (TrDM) which simultaneously combines Diffusion Maps and Transfer Subspace Learning; (v) a description of the various datasets and the experimental design used in the present disclosure; (vi) results of the experiments and evaluates the performance of the new Aided Target Recognition systems presented in the present disclosure; and (vii) concluding remarks including a summary of the results and suggestions for future research.

Notation: In the present disclosure, the terms "similar", "transfer challenge", "source classification problem/domain", and "target classification problem/domain" are utilized. The literature is rich with traditional classification work. Most of these classification efforts first sequester a part of the data to later be used for independent testing of the classification technique. The transfer learning should not be confused with the sequester/validation process. Instead the transfer challenge is a meta classification problem. Specifically there are two classification problems of importance. One problem is referred to as the source classification problem or source domain. The assumption is that it is a fully labeled database and the classification rates on that database are acceptable. The other classification problem is referred to as the target classification problem or target domain. For each class in the target domain there is a minimum of one labeled instance per class. The transfer challenge is to first "align" the source data with the target data and then utilize the classification of the source domain to classify the target domain. The term "align" means to align the distributions, in the sense of a probability distribution function (pdf), of the source data and the distributions of the target data.

For the present disclosure, we focus our efforts on the Diffusion Maps technique as it can incorporate different modalities of data. This is an important consideration for military applications. At the onset of this effort our primary concern with Diffusion Maps was related to properly choosing all the tuning parameters needed to be set for this technique. In our previous work we have applied the technique to various applications including gender classification using EO images, vehicle classification using vibrometry signatures, gender classification using surface anthropometric data, and skin classification using long wave infrared data. In all of these example applications we discovered that Diffusion Maps outperforms linear dimensionality reduction techniques and that Diffusion Maps outperforms classification performed on raw data. However it was a struggle to determine the correct tuning parameters and often the classification results were utilized to find the correct tuning parameters. Since then we are fortunate that a self-tuning diffusion map framework has come to fruition. To date this framework has not been thoroughly explored in the literature so we investigate this framework.

Transfer Learning (also known as cross-domain learning, domain transfer, and domain adaptation) is the newest research area of the three sections in the literature. To date there have been three workshops in this area. The first workshop was in 1995 at the Ninth Annual Conference on Neural Information Processing Systems (NIPS) entitled "Learning to Learn" that focused on the need for lifelong machine learning methods that retain and reuse learned knowledge. The idea was to overtly borrow learning concepts from psychology (e.g. learning to recognize chairs might help to recognize tables).

The second workshop was in 2005 when NIPS sponsored a follow-up workshop entitled "Inductive Transfer: 10 Years Later". Two major themes were brought to light: (i) the learning of the source and target datasets did not occur at the same time and (ii) that learning with zero prior knowledge continues to dominate the research.

The third workshop was in 2006 at the International Conference on Machine Learning (ICML) entitled "Structural Knowledge Transfer for Machine Learning" where the focus was on how the learned knowledge was structured and exploited. Additionally there have been five government Broad Agency Announcements (BAAs) from 2005 to 2014. The first BAA was in 2005 when Defense Advanced Research Projects Agency (DARPA) Information Processing Technology Office (IPTO) made a call entitled 'Transfer Learning Issues and Potential Contributions'. This BAA funded several academic research efforts most of which pushed the state-of-the-art for Transfer Learning for cross-dataset and cross-domain text classification. The most current BAA is from DARPA under the Target Recognition and Adaptation in Contested Environments (TRACE) program—where the focus now is to develop an AiTR specifically for hierarchical learning for limited or sparse target datasets. The continued funding in this area provides further evidence of the potential benefits for military applications.

The current section will discuss a limited selection of Transfer Learning techniques and terminology relevant to the current work; however, a few more encompassing survey papers of this field exist. Specifically the survey paper by Pan et al. provides a good overall discussion on Transfer Learning and summarizes when, what, and how information is transferred by different techniques. In 2013 Cook et al. provided a mathematical formalization for the transfer learning domain giving formal definitions to "domain", "task", and "transfer learning". Last we mention the 2014 paper by Shao, et al. which describes classification-level transfer learning and compares and contrasts 12 of those techniques.

Transfer Learning can be categorized into two areas: 1) Transfer learning for reinforcement learning and 2) Transfer learning for classification, regression, and clustering. The present disclosure will focus its efforts on the latter. Transfer learning for classification, regression, and clustering can be further decomposed into three areas: transfer learning at the feature level, the classifier level, or at the subspace learning level.

Transfer learning at the feature level is also known as translated learning and feature-representation-transfer. The idea behind these techniques is to transfer information between source and target datasets at the feature level and then use existing classifiers to continue the AiTR process. Usually the features of the source dataset are transformed to be similar to the features of the target dataset. These approaches include constructing higher-level features or augmenting the current features of the source and target datasets. The second type of transfer learning for classification, regression, and clustering (CRC) is at the classifier level where new classifiers are created or existing classifiers are extended to enable Transfer Learning. Since 2007 most of the well-known classifiers have all been extended to a Transfer Learning version of the classifier. The seminal technique for transfer learning classifiers is Transfer Learning Adaboost. That effort extended the standard Adaboost algorithm to a Transfer Learning approach. Since then most of the standard classifiers have been extended to Transfer Learning versions. For example the Neural Network Algorithm was extended to Discriminability-Based Transfer (DBT) between neural networks, the Genetic Algorithm was extended to Genetic Transfer Learning (GTL), Support Vector Machines (SVM) was extended to Multiple Kernel Learning SVM (MKL-SVM), and the generic boosting algorithm was extended to transfer boosting algorithm entitled Transfer Network Learning (TNL) algorithm.

The third type of transfer learning for CRC is Transfer Subspace Learning (TSL). TSL techniques create or extend traditional subspace learning (i.e. dimension reduction techniques) to account for the difference in the distribution of the data in the source and target domains. TSL can be used under cross-dataset, cross-domain, and hierarchical applications when the source and target data are not independent and identically distributed (i.i.d). TSL techniques attempt to correct for this problem either by aligning the dataset or minimizing the difference in their distributions. The focus of the present disclosure is in the subspace learning level. Based on their recent importance to military applications, this study focuses on TSL based on the Bregman Divergence-Based Regularization as a starting point.

The assumption of TSL based on the Bregman Regularization is that the target domain has very few labeled instances. Decent classification results have been reported with as little as one labeled instance per class. The goal is to find a subspace that separates classes and aligns the distributions of the source and target data. This optimal subspace is then used to train labeled examples from the target domain by using a classifier.

Although the transfer learning field is expanding there have been few attempts to expand nonlinear dimensionality reduction techniques to the transfer learning portfolio. There has been some recent activity to expand deep learning neural networks to account for transfer learning; however, because of the relative infancy of the field there hasn't been any activity to date outside of the deep learning expansion. Several applications exist for nonlinear transfer learning approaches and the recent deep learning expansion proves its feasibility. The majority of the research in the field is still focused on expanding classifiers to transfer learning classifiers, to evaluate the performance of current techniques, or to apply the techniques to new applications. Furthermore there is a lack of formalism to the area without standard definitions that have been accepted by the community.

In this chapter we review the standard Transfer Fisher's Linear Discriminant Analysis (TrFLDA) technique. In addition, in this chapter we describe the enhancements made to the standard TrFLDA algorithm. The enhancements include the implementation of relative weights, a reformulation of the objective function, and improvements to the KDE technique. Although these changes are relatively minor the enhanced version of TrFLDA consistently outperforms the classic implementation.

Transfer Fisher's Linear Discriminant Analysis: The purpose of Transfer Learning is to utilize information for recognition in a "source" domain to recognize objects in a different but related "target" domain. Generally the source dataset is a large and labeled dataset which can be used to train a given learning algorithm. In contrast the target dataset is generally smaller and with only a few labeled points and therefore it is not possible to directly train the learning algorithm on the target dataset. In this situation if the source and target data are independently and identically distributed, one can apply what is learned from the source data to separate the objects in the target dataset.

However if the distributions of the source and target datasets are different, the performance of the learning algorithm on the target dataset will be suboptimal.

The objective of Transfer Subspace Learning is to compute a lower-dimensional projection subspace which separates the source data and aligns the distributions of the source and target data in the projected subspace. Transfer Subspace Learning consists of a basic technique for the analysis of the source data and a technique for measuring the alignment of the distributions. More formally denote by $X_S \subset R^D$ and $X_T \subset R^D$ the source and target data in the original high-dimensional space, respectively. In addition let $W \in R^{D \times d}$ be a linear mapping from the high-dimensional space to a lower-dimensional subspace and denote by $F(W, X_S)$ the objective function of the particular technique used to separate the source data.

For comparison purposes in the basic Transfer Learning approach the optimal subspace projection W* is determined by solving the problem and classification is performed. As mentioned previously this technique may not work well if the distributions of the source and target data are different.

$$\min_{W \in R^{D \times 1}} F(W, X_S) \quad \text{(Eqn. 1)}$$

$$W^T W = 1 \quad \text{(Eqn. 2)}$$

Then using the optimal subspace projection derived from the source data, the target data is projected onto the lower-dimensional subspace $$Y_T = X_T W^* \quad \text{(Eqn. 3)}$$

Therefore in the original implementation of Transfer Subspace Learning (TSL) in, and the related code, the optimization problem is expressed as $$\min_{W \in R^{D \times 1}} F(W, X_S) + \lambda D(W, X_S, X_T) \quad \text{(Eqn. 4)}$$

$$W^T W = 1 \quad \text{(Eqn. 5)}$$

where $D(W, X_S, X_T)$ is the regularization term and $\lambda \in R+$ is the "absolute" weight assigned to the regularization term. Here the regularization term accounts for the difference in the distributions of the source and target data in the projected subspace.

The Transfer Fisher's Linear Discriminant Analysis (TrFLDA), one of six Transfer Subspace Learning (TSL) approaches introduced in, is utilized since it is simple and it makes the results easily comparable to other efforts. For this approach Fisher's Linear Discriminant Analysis (FLDA) is the basic technique for the analysis of the source data. Intuitively FLDA separates the different classes by minimizing the "within-class" variation and maximizing the "between-class" variation. The objective function for FLDA is given by $$F(W, X_S) = \frac{W^T S_B W}{W^T S_A W} \quad \text{(Eqn. 6)}$$

where $S_A$ is the standard "within-class" scatter matrix and $S_B$ is the standard "between-class" scatter matrix of the source data.

The regularization term is a measure of the difference in the distributions of the source and target data in the projected subspace. Given a subspace projection W, the source and target data in the projected subspace are given by $$Y_S = X_S W \quad \text{(Eqn. 7)}$$

$$Y_T = X_T W \quad \text{(Eqn. 8)}$$

The regularization term based on the Bregman divergence measure is given by $$D(W, X_S, X_T) = \int [H_S(y) - H_T(y)]^2 dy \quad \text{(Eqn. 9)}$$

where $H_S$ and $H_T$ are the probability density functions (PDFs) of the source data ($Y_S$) and the target data ($Y_T$) in the projected subspace. The densities in the projected subspace are estimated using the Kernel Density Estimation (KDE) technique. There are several Bregman divergence measures to choose from such as Mutual Information, the Kullback-Leibler (K-L) divergence measure, and Squared Euclidean distance (SED). For this effort the SED was chosen as the baseline since it offers low computational cost and in TrFLDA it may be more applicable as it appears it can better handle sparse data. A thorough explanation of the TrFLDA technique is given in, but we provide a summary of this technique in Algorithm 1.

ENHANCEMENTS: In this section we describe the enhancements made to the standard TrFLDA algorithm. The enhancements include the implementation of relative weights, a reformulation of the objective function, and improvements to the KDE technique.

Implementation of Relative Weight: TrFLDA is one of six Transfer Subspace Learning (TSL) approaches introduced in. An assumption of TrFLDA, inherited from Fishers Linear Discriminative Analysis (FLDA), is that the number of samples must be greater than or equal to the number of classes plus the number of dimensions of the data. A thorough explanation of the algorithm for TrFLDA is given in. In the original implementation and associated example code Algorithm 1 Transfer Fisher's Linear Discriminative Analysis (TrFLDA): Input:

$X_S, X_T \subset R^{D \times}$ (High-dimensional source and target data); Output: $W^* R^{D \times d}$ (Lower-dimensional subspace projection); $Y_S, Y_T R^d$ (Lower-dimensional source and target data) Classification rate.

1. Compute W* by solving the following optimization problem using the Gradient Descent algorithm:

$$\min_{W \in R^{D \times d}} F(W, X_S) + \lambda D(W, X_S, X_T) \quad \text{(Eqn. 10)}$$

$$W^T W = 1 \quad \text{(Eqn. 11)}$$

2. Compute the source and target data in the lower-dimensional subspace as follows $$Y_S = X_S W^* \text{ and } Y_T = X_T W^* \quad \text{(Eqn. 12)}$$

3. Compute the classification rate for the target data, the optimization problem in Step One is expressed as $$\min_{W \in R^{D \times d}} F(W, X_S) + \lambda D(W, X_S, X_T) \quad \text{(Eqn. 13)}$$

where $W \in R^{D \times d}$ is a linear mapping from the high-dimensional space to the lower-dimensional subspace, $X_S$ and $X_T$ are the source and target data, F ($W, X_S$) is the objective function for the particular Transfer Subspace Learning (TSL) approach, $D(W, X_S, X_T)$ is the regularization term, and $\lambda \in R+$ is the "absolute" weight assigned to the regularization term.

We use a slightly different objective function for TrFLDA, expressed as $$\min_{W \in R^{D \times d}} (1 - \lambda) F(W, X_S) + \lambda D(W, X_S, X_T) \quad \text{(Eqn. 14)}$$

where $\lambda \in [0, 1]$ is the "relative" weight assigned to the regularization term. This formulation of the objective function allows for a more systematic search of the optimal weight to assign to the regularization term. Note that whereas in the original implementation $\lambda$ could range over the positive reals, the new implementation restricts $\lambda$ to the interval [0, 1]. This provides for a more systematic treatment as $\lambda = 0$ corresponds to the non-regularized approach while $\lambda=1$ corresponds to pure data alignment with no transfer learning. In the original implementation the latter scenario could be realized only asymptotically.

The formulations of the problem with the "absolute" and "relative" weights assigned to the regularization term are essentially equivalent. That is for any absolute weight $\lambda \in [0, \infty)$ there is a relative weight $\hat{\lambda} \in [0, 1)$ such that the problems are equivalent. Take any $\lambda \in [0, \infty)$ and assume $W^*$ solves the problem $$\min_{W \in R^{D \times d}} F(W, X_S) + \lambda D(W, X_S, X_T) \quad \text{(Eqn. 15)}$$

Then we must have the necessary condition $$\frac{dF(W, X_S)}{dW} + \frac{dD(W, X_S, X_T)}{dW} \quad \text{(Eqn. 16)}$$

This implies $$\left(\frac{1}{1+\lambda}\right)\frac{dF(W, X_S)}{dW} + \left(\frac{\lambda}{1+\lambda}\right)\frac{dD(W, X_S, X_T)}{dW} = 0 \quad \text{(Eqn. 17)}$$

$$\left(1 - \frac{\lambda}{1+\lambda}\right)\frac{dF(W, X_S)}{dW} + \left(\frac{\lambda}{1+\lambda}\right)\frac{dD(W, X_S, X_T)}{dW} = 0 \quad \text{(Eqn. 18)}$$

$$(1 - \hat{\lambda})\frac{dF(W, X_S)}{dW} + \hat{\lambda}\frac{dD(W, X_S, X_T)}{dW} = 0 \quad \text{(Eqn. 19)}$$

The last expression implies solves the problem $$\min_{W \in R^{D \times d}} (1 - \hat{\lambda})F(W, X_S) + \hat{\lambda} D(W, X_R, X_T) \quad \text{(Eqn. 20)}$$

A similar proof can be used to show that the converse is true as well.

Reformulation of the Optimization Problem: The objective of FLDA is to maximize the "between-class" variation while minimizing the "within-class" variation in this way separating the different classes. For a one-dimensional subspace projection $W \in R^{D \times 1}$ the optimization problem for FLDA is generally written as $$\min_{W \in R^{D \times d}} -\frac{W^T S_B W}{W^T S_A W} \quad \text{(Eqn. 21)}$$

$$W^T W = 1 \quad \text{(Eqn. 22)}$$

The normalization is necessary because the solution is invariant to scalar multiplication but other normalizations are possible. In particular we can use the normalization where the denominator of the objective function is equal to one. With this normalization the problem becomes $$\min_{W \in R^{D \times d}} -\frac{W^T S_B W}{W^T S_A W} \quad \text{(Eqn. 23)}$$

$$W^T S_A W = 1 \quad \text{(Eqn. 24)}$$

The corresponding Lagrangian is given by $$L(W, \delta) = -W^T S_B W + (W^T S_B W - 1) \quad \text{(Eqn. 25)}$$

where $\delta \in R+$ is the Lagrange multiplier. Hence the Kuhn-Tucker (KKT) necessary conditions imply.

$$S_B W = \delta S_A W \quad \text{(Eqn. 26)}$$

This is a generalized eigenvalue problem. We can transform the problem into a regular eigenvalue problem by using a change of variable technique. If we let $$V = S_A^{1/2} W \quad \text{(Eqn. 27)}$$

and substitute into the previous optimization problem the problem can be restated as $$\min_{V \in R^{D \times d}} -V^T M V \quad \text{(Eqn. 28)}$$

$$V^T V = 1 \quad \text{(Eqn. 29)}$$

where $$M = S_A^{1/2} S_B S_A^{1/2} \quad \text{(Eqn. 30)}$$

In this formulation of the problem the corresponding Lagrangian is given by the expression $$L(V, \delta) = -V^T S_B M V + \delta(V^T V - 1) \quad \text{(Eqn. 31)}$$

Hence the KKT conditions imply $$MV = \delta V \quad \text{(Eqn. 32)}$$

Therefore, this is a regular eigenvalue problem with a symmetric and positive definite matrix which computationally is a desirable property. In the optimization problem the objective function is quadratic and hence computationally tractable. This is the formulation of the FLDA optimization problem used in the present disclosure.

Improvements to Kernel Density Estimation (KDE) Technique: An important step in Transfer Subspace Learning is to select a technique to estimate the probability density functions (PDFs) for the regularization term. In the original implementation the densities in the projected subspace are estimated using the Kernel Density Estimation (KDE) technique but others can be used such as simply producing a raw histogram.

As in the original implementation in we use the KDE technique with the Gaussian kernel to estimate the distributions. Recall the Gaussian kernel is given by $$G_h(x) = \frac{1}{h}\left[\frac{1}{2\pi} e^{-\frac{1}{2}\left(\frac{x}{h}\right)^2}\right] \quad \text{(Eqn. 33)}$$

where h is the bandwidth parameter. Then, the estimated probability density functions $H_S$ and $H_T$ are given by $$H_S(y) = \frac{1}{N_S} \sum_{i=1}^{N_S} G_{h_S}(y - y_i) \quad y_i \in Y_S \quad \text{(Eqn. 34)}$$

$$H_T(y) = \frac{1}{N_T} \sum_{i=1}^{N_T} G_{h_T}(y - y_i) \quad y_i \in Y_T \quad \text{(Eqn. 35)}$$

where $N_S$ and $N_T$ are the number of source and target samples, and $h_S$ and $h_T$ are the bandwidth parameters for the source and target data, respectively.

The bandwidth parameters can be estimated using the standard deviation of the data. Given a projection W, we have $$h_S = std(Y_S) \quad Y_S = X_S W \qquad \text{(Eqn. 36)}$$

$$h_T = std(Y_T) \quad Y_T = X_T W \qquad \text{(Eqn. 37)}$$

In terms of the optimization problem, this means the bandwidth parameters keep changing with each iteration. This makes the optimization procedure problematic because the gradient of the objective function is computed incorrectly (because it ignores how changing W changes the bandwidth parameters, which in turn change the regularization term).

In the present disclosure this problem is circumvented by estimating the bandwidth parameters before solving the optimization problem. In particular, denote by $W_0$ the optimal projection without Transfer Subspace Learning which solves the problem $$W_0 = \min_{V \in R^{D \times d}} F(W, X_S) \qquad \text{(Eq. 38)}$$

Then, the bandwidth parameters are estimated using the standard deviation of the projected data without Transfer Subspace Learning. That is $$h_S = std(Y_S) \quad Y_S = X_S W_0 \qquad \text{(Eqn. 39)}$$

$$h_T = std(Y_T) \quad Y_T = X_T W_0 \qquad \text{(Eqn. 40)}$$

In this way the bandwidth parameters are estimated based on the distribution of the data but remain constant during the optimization problem. As a consequence the optimization algorithm runs much faster.

Manifold Transfer Subspace Learning (MTSL): In this chapter we present one of the new Aided Target Recognition systems introduced in the present disclosure referred to as Manifold Transfer Subspace Learning (MTSL). The Manifold Transfer Subspace Learning technique combines Manifold Learning and Transfer Subspace Learning in a sequential process. In the present disclosure we use Diffusion Maps (DM) as the Manifold Learning technique and the TrFLDA enhanced technique as the Transfer Subspace Learning technique. The basic framework for Manifold Transfer Subspace Learning can be described as a sequential process. In step one the original source and target data are transformed using Diffusion Maps. In step two the TrFLDA enhanced technique is used with the transformed data.

Diffusion Maps: Manifold learning involves finding the underlying structure of data to achieve nonlinear dimensionality reduction. The goal of these techniques is to learn a mapping from the original high-dimensional data observation space to a lower-dimensional space that captures the underlying structure in the data. Manifold learning techniques are based on the assumption that the observed high dimensional data is parameterized by only a few degrees of freedom. These techniques evolved from Principal Component Analysis (PCA), a linear method ill-suited for analyzing nonlinear phenomena. Manifold learning techniques were created to overcome this limitation. Common techniques in Manifold Learning include Isomaps, Laplacian Eigenmaps, Multi-dimensional Scaling, and Diffusion Maps. The focus of our study is on Diffusion Maps as explained below.

Diffusion Maps is a nonlinear dimensionality reduction technique introduced by Lafon et al. in. Diffusion maps are of particular interest for AiTR applications as the technique is robust to data fusion. In other words, the input data can originate from sensors of different modalities. The technique is amenable to multi-sensor applications where data is collected from different sensors over the same area and of the same targets. The main benefits of the technique are its efficiency and robustness to non-uniform sampling and noise. Two areas of active research are expanding the technique's ability to handle sparse sampling and reducing sensitivity to tuning parameters.

The diffusion maps technique derives a multi-scale, low-dimensional embedding from high-dimensional data by considering a random walk over a graph of the data. Here we provide only a brief overview of the technique. Given data $X = \{x_1, x_2, \ldots, x_N\} \subset R^D$ one can construct a "similarity" graph and the associated kernel matrix (K) using some measure of similarity and a given kernel. We use the Euclidean distance as the measure of similarity between data points, but any symmetric, non-negative distance function can be utilized. The second choice is to select a kernel to construct the kernel matrix. For simplicity we use the Gaussian kernel, but the choice of kernel is application dependent and different kernels may lead to different results. The Gaussian kernel has proven to be a good choice having been used in a number of applications from gender classification to vehicle classification. Given the previous assumptions the kernel matrix is given by $$K_{ij} = K(x_i, x_j) \qquad \text{(Eqn. 41)}$$

$$= \exp\left(\frac{\|x_i - x_j\|^2}{\sigma}\right)$$

$$P_{ij} = \frac{K_{ij}}{\sum_j K_{ij}} \qquad \text{(Eqn. 42)}$$

where $\sigma$ is the scale parameter and determines the affinity of the kernel.

Given the kernel matrix one can construct the transition probability matrix (P) for the induced Markov process, where $$P_{ij} = \frac{K_{ij}}{\sum_j K_{ij}} \qquad \text{(Eqn. 43)}$$

The next step is to compute the righthand-side (RHS) eigenvectors $\{\psi_i\}$ and eigenvalues $\{\lambda_i\}$ of the transition probability matrix. Finally, the Diffusion Maps coordinates of the data are computed as $$y_i = [\lambda_1^t \psi_1(x_i) \lambda_2^t \psi_2(x_i) \ldots \lambda_n^t \psi_n(x_i)] \qquad \text{(Eqn. 44)}$$

where t is the number of time steps in the random walk and $n < N$ is the dimension of the subspace.

Notice we must have $$P^t \psi i = \lambda i \psi i \qquad \text{(Eqn. 45)}$$

because $\{\psi_i\}$ and $\{\lambda_i\}$ are the eigenvectors and eigenvalues of P. Therefore, letting $W_{DM}$ be the matrix with the eigenvectors the data in the projected subspace can be equivalently computed using matrix notation as $$Y = P^t W_{DM} \qquad \text{(Eqn. 46)}$$

Manifold Transfer Subspace Learning (MTSL) is one of the new Aided Target Recognition systems introduced in the present disclosure and combines Manifold Learning and Transfer Subspace Learning in a sequential process. In the present disclosure, we use Diffusion Maps (DM) as the Manifold Learning technique and TrFLDA as the Transfer Subspace Learning technique. Intuitively, the basic framework for Manifold Transfer Subspace Learning can be described as a sequential process. In step one the original source and target data are transformed using Diffusion Maps. In step two the TrFLDA enhanced technique is used with the transformed data.

The Manifold Learning Step: In the context of Transfer Subspace Learning, in which we have a "source" dataset and a "target" dataset, an important question is how to extend or compute the Diffusion Maps coordinates of the target data. We use (i) an "out-of-sample extension" technique and (ii) a "merge" technique that combines the source and target data for the diffusion maps analysis.

The out-of-sample extension (OSE) technique is appropriate for situations in which the source and target data cannot be combined for the diffusion maps analysis. The out-of-sample extension technique is based on the Nystrom method. Given the source data $X_S \subset R^D$ compute the transition probability matrix $P^S$ and the matrix$^S$ with the eigenvectors as in the standard Diffusion Maps analysis on the source data described in the previous section. The diffusion maps coordinates for the source data are given by $$X_S^{DM} = P^S W_{DM}^S \quad \text{(Eqn. 47)}$$

Next consider the out-of-sample extension to the target data. Compute the transition probability matrix $P^{TS}$ given by $$P_{ij}^{TS} = \frac{K(x_i^T, x_j^S)}{\sum_j K(x_i^T, x_j^S)} \quad \text{(Eqn. 48)}$$

This is the probability that a target sample moves to any of the source samples. Then the diffusion maps coordinates of the target data based on the Nystrom out-of-sample extension are given by $$X_T^{DM} = P^{TS} W_{DM}^S \quad \text{(Eqn. 49)}$$

The ability to use the out-of-sample extension technique is important because the source and target data do not need to be combined before utilizing this technique. The embedding can simply be extended to newly observed high-dimensional data points. Since these are applications to big data recomputation can be prohibitively expensive. The inclusion of OSE allows for applications to exploit real-time data acquisition.

The merge technique combines the source and target data in the Diffusion Maps analysis. First the data is merged to create the combined data $$X = \begin{bmatrix} X_S \\ X_T \end{bmatrix} \quad \text{(Eqn. 50)}$$

Then compute the transition probability matrix $$P = \begin{bmatrix} P^S & P^{ST} \\ P^{TS} & P^T \end{bmatrix} \quad \text{(Eqn. 51)}$$

and the matrix $W_{DM}$ with the eigenvectors. The diffusion maps coordinates for the source and target data are then given by $$X_S^{DM} = [P^S P^{ST}] W_{DM} \quad \text{(Eqn. 52)}$$

$$X_T^{DM} = [P^{TS} P^T] W_{DM} \quad \text{(Eqn. 53)}$$

The Diffusion Maps coordinates are the new features of the data. The next step is to apply the Transfer Subspace Learning technique to the transformed data.

The Transfer Subspace Learning Step: Given the Diffusion Maps coordinates for the source ($X^{DM}$) and target ($X^{DM}$) data the S T next step is to apply the TrFLDA enhanced technique as described in the previous chapters. In particular compute the subspace projection matrix W* by solving the optimization problem $$\min_{W \in R^{D \times d}} (1-\lambda)F(W, X_S^{DM}) + \lambda D(W, X_S^{DM}, X_{ST}^{DM}) \quad \text{(Eqn. 54)}$$

$$W^T W = 1 \quad \text{(Eqn. 55)}$$

Then the source and target data in the lower-dimensional subspace can be computed as $$Y_S = X_S^{DM} W^* \quad \text{(Eqn. 56)}$$

$$Y_T = X_T^{DM} W^* \quad \text{(Eqn. 57)}$$

Finally the classification rates for the target data are computed.

The key difference between Manifold Transfer Subspace Learning and traditional Transfer Subspace Learning techniques like TrFLDA is the Manifold Learning step. The key idea behind Manifold Learning is that although the data collected may be in a high-dimensional space, the information may actually reside in a lower-dimensional manifold. Therefore the Manifold Learning step represents a nonlinear transformation of the data from the high-dimensional space to a lower-dimensional space which captures the structure of the data. Hence the new representation of the data is in a lower dimensional but very different feature space. For instance, if the data consists of images, the original features are the colors of the different pixels. In a dimensionality reduction technique like Principal Component Analysis (PCA) the new features are linear combinations of the original features. In a Manifold Learning technique like Diffusion Maps the new features are very different and based on how similar the images are to each other. The Manifold Learning step, by learning the structure of the data in a lower-dimensional space, should improve the performance of the Transfer Subspace Learning technique.

Algorithm 2 provides a basic description the Manifold Transfer Subspace Learning technique.

Selection of Parameters: The majority of the MTSL process is spent identifying the correct Diffusion Maps parameters. As part of the MTSL process a coherent method for determining these parameters is included. The question remaining is how to choose the parameters for MTSL, the Diffusion Maps parameters (a, t, and n) and the Transfer Subspace Learning parameters (d and λ). It is important to have a strategy for selecting the appropriate scale parameter a for the Gaussian kernel. The Gaussian kernel maps the Euclidean distance between points to the interval [0, 1]. Therefore the suggested standard methods are based on the distribution of the distances between the points.

The standard methods include (i) the standard deviation of the distances, (ii) the mean of the minimum of the square distances of each point to the other points, (iii) the maximum of the minimum of the square distances of each point to the other points, the mean of the minimum of the distances of each point to the other points, and the maximum of the minimum of the distances of each point to the other points. In addition, we used generally-known graph and optimization methods. We used the previous methods to determine a range of possible values for the scale parameter of the Gaussian kernel. Then we chose the combination of parameters (a, t, and ii) which maximized the classification performance on the source domain data (without applying the Transfer Subspace Learning extension). We utilized the K-fold cross validation method to protect against overfitting.

For the Transfer Subspace Learning parameters (d and $\lambda$) the dimension d of the lower-dimensional subspace is determined by subtracting one from the number of classes since this is a property of TrFLDA. The parameter $\lambda$ is based on the tradeoff involved in Transfer Subspace Learning as increasing the alignment of the distributions generally results in lower classification performance in the source domain. The strategy we suggest is to choose the maximum value of $\lambda$ for which the classification rate for the source domain data does not decrease significantly. It is important to note that the current implementation of MTSL is dependent on the choice of reference point for each class. Points are selected randomly. This introduces a stochastic element to the process so each experiment is run multiple times and only the averages are reported.

Algorithm 2: Manifold Transfer Subspace Learning (MTSL)": Input: $X_S$, $X_T$ $R^D$ (High-dimensional source and target data) Parameters: $\sigma$, t, n, d, and $\lambda$; Output: $Y_S$, $Y_T$ $R^d$ (Lower-dimensional source and target data) Classification rate. (1) Normalize the data and compute the kernel matrix (K) using the Euclidean distance between points and the Gaussian kernel; (2) Manifold Learning Step: Compute the Diffusion Maps coordinates for the source data and the coordinates for the target data using the Nystrom extension: (a) Compute the probability matrix $P^S$ and the matrix $W^S$ with the eigenvectors and compute $$X_S^{DM} = P^S W_{DM}^S \quad \text{(Eqn. 58)}$$

(b) Nystrom Extension: Compute the probability matrix $P^{TS}$ and compute $$X_T^{DM} = P^{TS} W_{DM}^S \quad \text{(Eqn. 59)}$$

(3) Transfer Subspace Learning Step: Compute the projection matrix $W^*$ by solving the optimization problem $$\min_{W \in R^{D \times d}} (1-\lambda) F(W, X_S^{DM}) + \lambda D(W, X_S^{DM}, X_{ST}^{DM}) \quad \text{(Eqn. 60)}$$

$$W^T W = 1 \quad \text{(Eqn. 61)}$$

(4) Compute the source and target data in the lower-dimensional subspace $$Y_S = X_S^{DM} W^* \text{ and } Y^T = X_T^{DM} W^* \quad \text{(Eqn. 62)}$$

(5) Classification Step: Compute the classification rate for the target data

Transfer Diffusion Maps (TrDM): In this chapter, we describe the other new Aided Target Recognition systems introduced in the present disclosure, referred to as Transfer Diffusion Maps (TrDM) which simultaneously combines Manifold Learning and Transfer Subspace Learning. The authors pursued the TrDM algorithm based on the success of diffusion maps in previous work as discussed in the introduction. The TrDM algorithm is a solution to a Transfer Learning problem. Similar to TrFLDA the assumption is that there is a source classification problem and there is a target classification problem. There is only one labeled instance for each of the classes in the target classification problem. The idea is to leverage information from the source classification problem to better classify the instances in the transfer classification problem. Without a Transfer Learning technique, such as TrFLDA or TrDM, the solutions to this problem would be limited to simply 1-labeled kNN (k=1).

Transfer Subspace Learning is based on an optimization framework where the objective function is a liner combination of (i) the basic technique used to separate the source data and (ii) the regularization term measuring the alignment of the distributions. Considerable effort must be employed to reformulate the Diffusion Maps technique as an optimization problem. To simultaneously combine Diffusion Maps and Transfer Subspace Learning it is necessary to obtain the Diffusion Maps coordinates for the data as the solution to an optimization problem.

Eigenvalue Problems and Optimization: The implementation of Transfer Subspace Learning (TSL) requires an optimization framework whereas most dimensionality reduction techniques such as Principal Components Analysis (PCA) and Diffusion Maps (DM) are generally implemented as an eigenvalue problem. This section provides some background material related to eigenvalue problems and optimization.

For any symmetric matrix M consider the problem $$\max_x x^T M x \quad \text{(Eqn. 63)}$$

$$x^T x = 1 \quad \text{(Eqn. 64)}$$

where $x \in R^N$ and $M \in R^{N \times N}$ is a symmetric matrix. The Lagrangian for this problem is given by $$L(x,\lambda) = x^T M x - \lambda(x^T x - 1) \quad \text{(Eqn. 65)}$$

where $\lambda > 0$ is the Lagrange multiplier. The KKT necessary conditions imply $$Mx = \lambda x \quad \text{(Eqn. 66)}$$

If w is a solution to the previous problem, then w is an eigenvector of M and $\lambda$ is the associated eigenvalue.

We can obtain all of the eigenvectors ($w_1, \ldots, w_N$) and eigenvalues ($\lambda_1, \ldots, \lambda_N$) of M by solving a sequence of optimization problems. For each $i \in \{1, \ldots, N\}$, we solve the problem $$\max_x x^T M x \quad \text{(Eqn. 67)}$$

$$x^T x = 1 \quad \text{(Eqn. 68)}$$

$$x^T w_{i-1} = 0 \quad \text{(Eqn. 69)}$$

$$\ldots$$

$$x^T w_1 = 0 \quad \text{(Eqn. 70)}$$

The top constraint is the normalization constraint and the other constraints are the orthogonality constraints. The solution to this problem is the eigenvector $w_i$ and the associated eigenvalue $\lambda_i$ is given by the Lagrange multiplier for the normalization constraint. While the eigenvectors of a symmetric matrix are generally computed using the Singular Value Decomposition (SVD) technique they can equivalently be obtained as a solution to an optimization problem.

Diffusion Maps and Optimization: This section shows how to reformulate the Diffusion Maps technique as an optimization problem. First we introduce some basic notation. Given a datasetX=$\{x_1, x_2, \ldots, x_N\}$ in $R^D$, as in the standard implementation of Diffusion Maps, we can construct a "similarity" graph and the associated kernel matrix (K). Denoting by D the diagonal matrix with diagonal entries $Di=_j k_{ij}$ the transition probability matrix can be computed as $$P = D^{-1}K \qquad \text{(Eqn. 71)}$$

We are interested in obtaining the eigenvectors and eigenvalues of the transition probability matrix (P) as a solution to an optimization problem. There are several ways to do this each with varying computational performance.

First, consider the problem $$\min_x \; -w^T K w \qquad \text{(Eqn. 72)}$$

$$w^T D w = 1 \qquad \text{(Eqn. 73)}$$

The corresponding Lagrangian is given by $$L(W, \lambda) = x^T K w - \lambda(x^T D w - 1) \qquad \text{(Eqn. 74)}$$

where $\lambda \in R+$ is the Lagrange multiplier. The KKT necessary conditions imply $$kw = \lambda D w \qquad \text{(Eqn. 75)}$$

This implies $$D^{-1}(Kw) = D^{-1}(\lambda D w) \qquad \text{(Eqn. 76)}$$

$$Pw = \lambda w \qquad \text{(Eqn. 77)}$$

If w is a solution to the previous problem, then w is an eigenvector of P and $\lambda$ is the associated eigenvalue. We can obtain all of the eigenvectors ($w_1, \ldots, w_N$) and eigenvalues ($\lambda_1, \ldots, \lambda_N$) by solving a sequence of optimization problems, as mentioned previously. If we denote by W the matrix with the eigenvectors, then the Diffusion Maps coordinates are computed as $$Y = PW \qquad \text{(Eqn. 78)}$$

The previous optimization problem is referred to as a "generalized" eigenvalue problem. This problem can be converted into a "regular" eigenvalue problem by using a change of variable technique. If we let $$v = D^{1/2} w \qquad \text{(Eqn. 79)}$$

and substitute into the previous optimization problem the problem can be restated as $$\min_w \; -v^T A v \qquad \text{(Eqn. 80)}$$

$$v^T v = 1 \qquad \text{(Eqn. 81)}$$

where $$A = D^{1/2} K D^{1/2} \qquad \text{(Eqn. 82)}$$

is a symmetric matrix referred to as the "normalized" kernel matrix. In this formulation of the problem the corresponding Lagrangian is given by the expression $$L(W, \lambda) = -V^T A v + \lambda(v^T v - 1) \qquad \text{(Eqn. 83)}$$

Hence, the KKT conditions imply $$Av = \lambda v \qquad \text{(Eqn. 84)}$$

Therefore, this is a regular eigenvalue problem. If v is a solution to the previous problem, then v is an eigenvector of A and $\lambda$ is the associated eigenvalue.

Now assume v is an eigenvector of A where $\lambda$ is the associated eigenvalue. We will show that $$w = D^{-1/2} v \qquad \text{(Eqn. 85)}$$

is an eigenvector of P with the same eigenvalue. Recall we have $$P = D^{-1/2} K = D^{-1/2} A D^{-1/2} \qquad \text{(Eqn. 86)}$$

Hence, we can write $$\begin{aligned} Pw &= (D^{-\frac{1}{2}} A D^{-\frac{1}{2}}) w = \\ &= (D^{-\frac{1}{2}} A D^{-\frac{1}{2}})(D^{-\frac{1}{2}} v) \\ &= D^{-\frac{1}{2}}(Av) \\ &= D^{-\frac{1}{2}}(\lambda v) \\ &= \lambda(D^{-\frac{1}{2}} w) \\ &= \lambda w \end{aligned} \qquad \text{(Eqn. 87)}$$

Therefore if $[V = v_1 \; v_2 \ldots v_N]$ are the eigenvectors of A, then the eigenvectors $[W = w_1 \; w_2 \ldots w_N]$ of P are given by $$W = D^{-1/2} V = \qquad \text{(Eqn. 88)}$$

and the Diffusion Maps coordinates of the data can be computed as before. That is $$\begin{aligned} Y &= PW \\ &= P(D^{-\frac{1}{2}} V) \end{aligned} \qquad \text{(Eqn. 89)}$$

This is the formulation of the problem that we will use for the implementation of Transfer Diffusion Maps. This problem has several desirable properties computationally, as the normalized kernel matrix is symmetric and the optimization problem is a regular eigenvalue problem.

For completeness and to further develop our understanding of the Diffusion Maps technique we present an alternative formulation of the problem. Denote by w: X→R the projection of the data into a one-dimensional subspace. Then, letting $w_i = w(x_i)$, the Diffusion Maps coordinates solve the following problem $$\min_w \sum_i \sum_j K_{ij}(w_i - w_j)^2 \qquad \text{(Eqn. 90)}$$

$$\sum_i m_i w_i^2 = 1 \qquad \text{(Eqn. 91)}$$

where m:X→R is a normalization function to be determined later. The objective function has an intuitive interpretation. If points $x_i$ and $x_j$ are close to each other, the value of $K_{ij}$ will be high. Therefore to minimize the objective function the projections $w_i$ and $w_j$ must be close.

The objective function can be written as $$\frac{1}{2}F(w) = \frac{1}{2}\sum_i\sum_j K_{ij}(w_i - w_j)^2 \qquad (Eqn.\ 92)$$

$$= \frac{1}{2}\sum_i\sum_j K_{ij}(w_i^2 - w_i w_j + w_j^2)$$

$$= \frac{1}{2}\sum_i w_i^2 \sum_j K_{ij} - \sum_i w_i \sum_j K_{ij}w_j +$$

$$\frac{1}{2}\sum_j w_j^2 \sum_i K_{ij}$$

$$= w^T D w - w^T K w$$

If we choose the normalization function such that $m_i = \sum_j K_{ij}$ and do a change of variable substitution with $$W = D^{-1/2}V = \qquad (Eqn.\ 93)$$

the original problem can be stated in terms of the normalized kernel matrix (A) introduced previously:

$$\min_v v^T v - v^T A v \qquad (Eqn.\ 94)$$

$$v^T v = 1 \qquad (Eqn.\ 95)$$

This problem is very similar to the previous formulation of the problem and has several desirable properties. The objective function can be written as $$G(v) = v^T v - v^T A v \qquad (Eqn.\ 96)$$

$$= v^T(I - A)v$$

$$= v^T L v$$

where L=I−A is the Laplacian of the graph determined by the normalized kernel matrix A. If v is an eigenvector of L and λ is the associated eigenvalue, then we have $$Lv = \lambda v$$

$$(I - A)v = \lambda v$$

$$v - Av = \lambda v$$

$$Av = (1 - \lambda)v$$

$$Av = \mu v \qquad (Eqn.\ 97)$$

This means that v is an eigenvector of A and μ=1−λ is the associated eigenvalue.

The different formulations of the problem are theoretically equivalent but they may have different computational properties. For this reason we did extensive testing of the optimization algorithm using the different formulations of the optimization problem. The formulation with the normalized kernel matrix performed best computationally and therefore this is the formulation we will use in the implementation of Transfer Diffusion Maps (TrDM).

A number of experiments were conducted to assess the accuracy of the "optimization-based" implementation of Diffusion Maps as compared to the "standard" implementation of Diffusion Maps using the singular value decomposition (SVD) method. We used the MNIST handwritten digits dataset and the Manifold Transfer Subspace Learning (MTSL) technique introduced in the previous chapter which sequentially combines Diffusion Maps and TrFLDA. We report results for the following techniques: (i) standard Diffusion Maps and TrFLDA which we refer to as the "standard" MTSL technique, and (ii) optimization-based Diffusion Maps and TrFLDA which we refer to as "optimization-based" MTSL. For comparison purposes we report baseline classification rates using kNN (k=1) only.

For the first experiment the source data consists of the handwritten digits "one" and "seven" using only the professional samples. Similarly the target data consists of the handwritten digits "one" and "seven" but using only the student samples. There are 1024 samples for both the professionals and the students with 512 samples per class. Based on the literature the source problem is considered "easy" since there is a 03% confusion rate between the one and the seven. The baseline correct classification rate (CCR) for the target domain is 91.7% using the 1-labeled kNN (k=1) classifier. Using the optimization-based MTSL technique results in a 95.7% correct classification rate for the target domain. Using the standard MTSL technique results in a 95.4% correct classification rate. These results show not only that the MTSL technique is promising but also that the optimization-based implementation of Diffusion Maps generates similar results to the standard implementation of Diffusion Maps using the SVD method.

For the second experiment the source classification problem consists of classifying the handwritten digits "four" and "nine" from the professional subset. Similarly the target classification problem consists of classifying the handwritten digits "four" and "nine" but from the student subset. There are 964 samples for both the professionals and the students with 482 samples in each class. In the literature the source classification problem is considered "hard" since the confusion rate between a four and a nine is 44%. The baseline correct classification rate for the target domain is 72.4% using the 1-labeled kNN (k=1) classifier. Using the optimization-based MTSL technique results in an 85.7% correct classification rate for the target domain. Using the standard MTSL technique results in an 85.7% correct classification rate. These results again show not only that MTSL is promising but also that the optimization-based implementation of Diffusion Maps results in similar results to the traditional implementation.

For the third experiment, the source classification problem is classifying the handwritten digits "three" and "five" using the professional samples. The target classification problem is classifying the "three" and the "five" but using the student samples. Per the literature the problem is considered a hard problem given that there is a 38% confusion rate between a three and a five. The baseline CCR for this transfer challenge is 76.9% using the 1-labeled kNN (k===1) on the target classification problem. Using the optimization-based MTSL technique results in a 91.4% CCR on the target classification problem. Using the standard. MTSL technique results in a 91.4% CCR on the target classification problem. These results again show that (a) the MTSL technique is performing better than the baselines and (b) that the optimization-based and the standard implementation of Diffusion Maps provide comparable results.

Transfer Diffusion Maps: The implementation of Transfer Diffusion Maps (TrDM) is similar to the implementation of TrFLDA but with a different objective function and a different transformation of the data. In addition, because Diffusion Maps is a non-linear dimensionality reduction technique the "out-of-sample extension" technique or the "merge" technique can be employed.

For the out-of-sample extension technique, given the source data $X_S \subset R^D$ and the target data $X_T \subset R^D$, we can compute the transition probability matrix $P^S$ for the source data and the transition probability matrix $P^{TS}$ for the target data, as described previously. The matrices $P^S$ and $P^{TS}$ are the new representation of the source and target data respectively. The optimization problem can be written as $$\min_{W \in R^{D \times d}} F(W, P^S) + \lambda D(W, P^S, P^{TS}) \qquad \text{(Eqn. 98)}$$

$$W^T W = 1 \qquad \text{(Eqn. 99)}$$

In this optimization problem $F(W,P^S)$ is the objective function for DM and given by $$F(W,P^S) = [D_S^{-1/2} K_S D_S^{-1/2}] W \qquad \text{(Eqn. 100)}$$

where $K_S$ is the kernel matrix from the source data and $D_S$ is the corresponding diagonal matrix. The term in brackets is what we previously referred to as the normalized kernel ($A_S$). Given a subspace projection W, the source and target data in the projected subspace are given by $$Y_S = P^S W \qquad \text{(Eqn. 101)}$$

$$Y_T = P^{TS} W \qquad \text{(Eqn. 102)}$$

Hence, the regularization term is given by $$D(W,P^S,P^{TS}) = \int [H_S(y) - H_T(y)]^2 dy \qquad \text{(Eqn. 103)}$$

where $H_S$ and $H_T$ are the probability density functions (PDFs) of the source data ($Y_S$) a t target data ($Y_T$) in the projected subspace.

Given the optimal subspace projection $W^*$ we compute the data in the lower-dimensional subspace $$Y_S = P^S W^* \qquad \text{(Eqn. 104)}$$

$$Y_T = P^{TS} W^* \qquad \text{(Eqn. 105)}$$

Then we compute the classification rates for target data.

For the merge technique, which combines the source and target data in the Diffusion Maps analysis, the data is merged to create the combined data $$X = \begin{bmatrix} X_S \\ X_T \end{bmatrix} \qquad \text{(Eqn. 106)}$$

Given the combined data X we can compute the kernel matrix K, the associated diagonal matrix D, and the corresponding transition probability matrix $$P = \begin{bmatrix} P^S & P^{ST} \\ P^{TS} & P^T \end{bmatrix} \qquad \text{(Eqn. 107)}$$

Given the combined data X we can compute the kernel matrix K, the associated diagonal matrix D, and the corresponding transition probability matrix In this situation $P_M^S = [P^S P^{ST}]$ and $P_M^T = [P^{TS} P^T]$ are the new representation of the original source and target data respectively. Intuitively $P^S$ gives the probability of a source sample moving to another source or target sample and $P^T$ gives the probability of a target sample moving to another source or target sample.

Then the optimization problem can be written as $$\min_{W \in R^{D \times d}} F(W, P) + \lambda D(W, P_M^S, P_M^T) \qquad \text{(Eqn. 108)}$$

$$W^T W = 1 \qquad \text{(Eqn. 109)}$$

Where F (W, P) is the objective function for DM with the merge data and is given by $$F(W,P) = W^T [D^{-1/2} K D^{-1/2}] W \qquad \text{(Eqn. 110)}$$

where K is the kernel matrix from the merge data and D is the corresponding diagonal matrix. The term in brackets is what we previously referred to as the normalized kernel (A). Given a subspace projection W the source and target data in the projected subspace are given by $$Y_S = P_M^S W \qquad \text{(Eqn. 111)}$$

$$Y_T = P_M^T W \qquad \text{(Eqn. 112)}$$

The regularization term is given by $$D(W,P_S,P_{TS}) = \int [H_S(y) - H_T(y)]^2 dy \qquad \text{(Eqn. 113)}$$

where $H_S$ and $H_T$ are the probability density functions (PDFs) of the source data ($Y_S$) and t target data ($Y_T$) in the projected subspace.

G the optimal subspace projection $W^*$, we compute the data in the lower-dimensional subspace $$Y_S = P_M^S W^* \qquad \text{(Eqn. 114)}$$

$$Y_T = P_M^{TS} W^* \qquad \text{(Eqn. 115)}$$

Then, we compute the classification rates for target data.

The key difference between the Transfer Diffusion Maps (TrDM) technique presented in this chapter and the Manifold Transfer Subspace Learning technique presented in the previous chapter is the effect of the Transfer Subspace Learning technique on the Diffusion Maps representation of the data. In the Manifold Transfer Subspace Learning technique the Diffusion Maps representation of the data is not affected by the subsequent application of the Transfer Subspace Learning technique. In the Transfer Diffusion Maps technique Manifold Learning and Transfer Subspace Learning are integrated simultaneously which allows the Diffusion Maps representation of the data to be affected by the Transfer Subspace Learning technique. The Diffusion Maps coordinates are computed taking into account the alignment of the distributions of the source and target data in the projected lower-dimensional subspace.

Algorithm 3 describes the implementation of Transfer Diffusion Maps (TrDM) using the Nystrom out-of-sample extension technique. Input: $X_S$, $X_T \subset R_D$ (High-dimensional source and target data) Parameters: $\sigma$, t, d, and $\lambda$; Output: $Y_S$, $Y_T \subset R_D$ (Lower-dimensional source and target data) Classification rate: (i) Normalize the source and target data; (ii) Nonlinear Transformation Step: Compute the transition probability matrices $P^S$ and $P^{TS}$. This is the new representation of the source and target data, respectively; and (iii) Transfer Subspace Learning Step: Compute the projection matrix W* by solving the optimization problem.

$$\min_{W \in R^{D \times d}} (1-\lambda)F(W, P^S) + \lambda D(W, P^S, P^{TS})$$ (Eqn. 116)

$$W^T W = 1$$ (Eqn. 117)

(iv) Compute the source and target data in the lower-dimensional subspace $$Y_S = P^S W^*$$ (Eqn. 118)

$$Y_T = P^{TS} W^*$$ (Eqn. 119)

(v) Classification Step: Compute the classification rate for the target data.

Datasets and Experimental Design: In this chapter, we describe the datasets used to test the performance of the new Aided Target Recognition systems introduced in the present disclosure as compared to the existing techniques. We also describe the general outline for the experiments.

Description of Datasets: In this section, we describe the different datasets used in the experiments performed herein. The datasets include synthetic electro-optical images of geometric shapes, synthetic electro-optical images of civilian vehicles, measured electro-optical images of handwritten digits, measured microarray gene expressions, and measured infrared images of military vehicles. The different datasets are summarized in TABLE 1.

The algorithms are tested thoroughly on measured and synthetic data and three different modalities—EO, IR, and numerical gene expressions. In future efforts these datasets can be expanded to include cross-modality transfer challenges. An ideal dataset would be multi-modal of the same objects so that one modality can be utilized as the source domain while the other is utilized as the target domain.

TABLE 1 provides datasets utilized in the present disclosure:

TABLE 1

| Name of Dataset | Modality | Type |
| --- | --- | --- |
| Geometric Shapes | EO Images | Synthetic |
| Handwritten Digits | EO Images | Measured |
| Gene Expressions | Numerical Vector | Measured |
| Military Vehicles | IR Images | Measured |
| Civilian Vehicles | EO Images | Synthetic |

The Electro-Optical (EO) Synthetic Civilian Vehicle Data Domes (EO-SCVDD) dataset is maintained by the Air Force Research Laboratory (AFRL) Sensors Directorate. The unique vehicles in this dataset are derived from three-dimensional (3D) point clouds of physically accurate vehicle models. Hence although the data is synthetic, the models used for the vehicles were all derived from physically accurate dimensions. The complete dataset consists of ten vehicle types.

We discovered some inconsistencies in the data which at the start of this research limited the use of this data set to four of the vehicles—Toyota Avalon, Jeep Cherokee, Honda Civic, and Nissan Sentra. However, since then the developers of the dataset have corrected these errors. Images were generated using 17 different lighting conditions resulting in 3601 different poses with physically accurate shadows. Each sample is rendered as a 480×640 resolution color image. The scenes were systematically captured every three degrees in azimuth and elevation—hence for a given elevation there are 120 scenes.

Figure 2A:
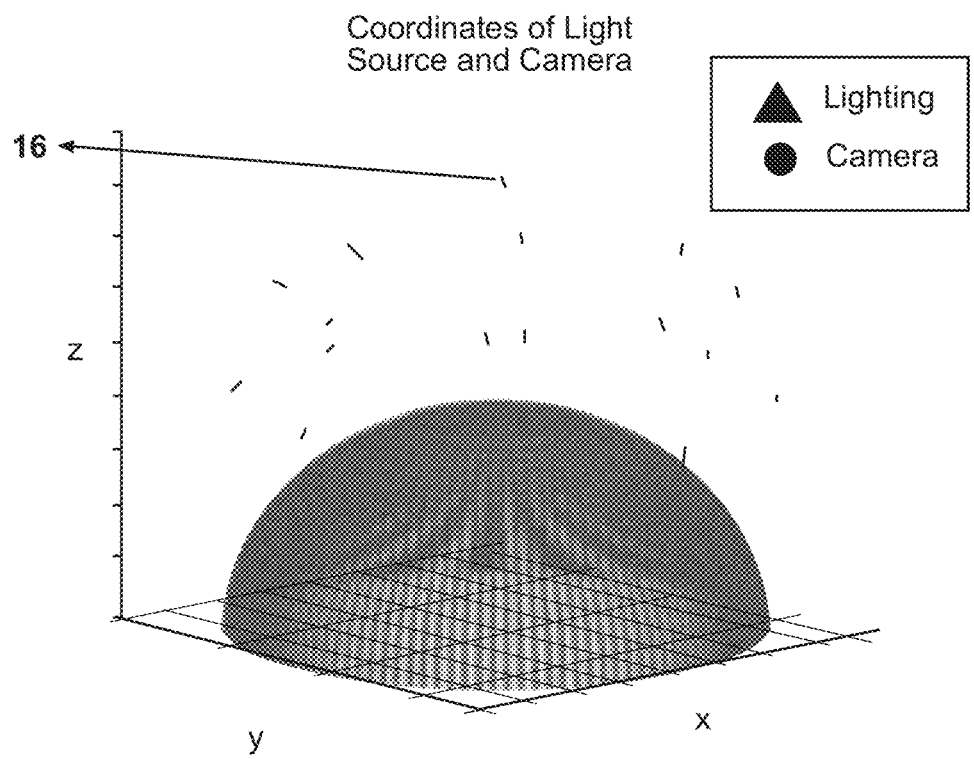
FIG. 2A illustrates a graphical plot of coordinates of light source and camera, according to one or more embodiments.
Figure 2B:
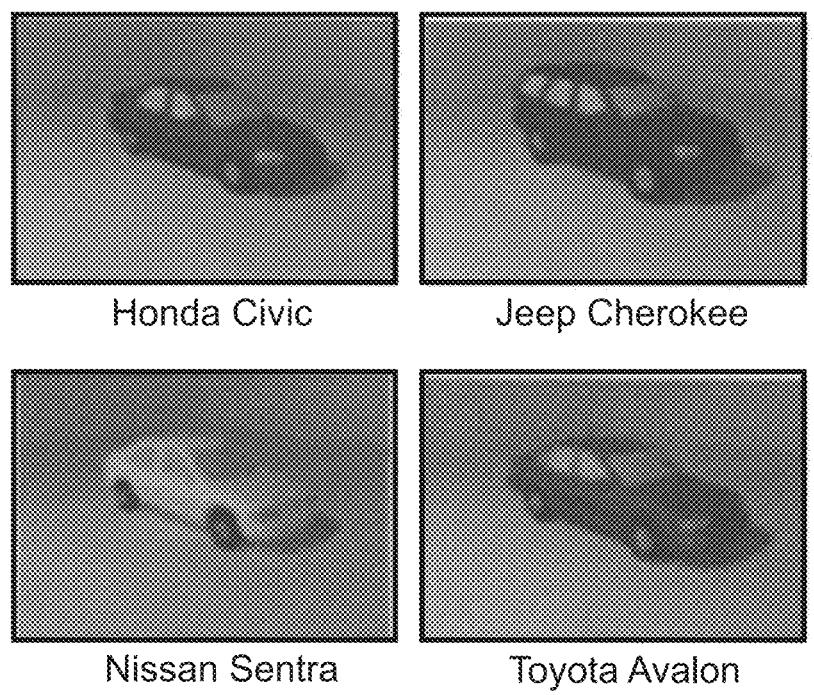
FIG. 2B illustrates sample vehicle images, according to one or more embodiments.

FIG. 2A illustrates a graphical plot of coordinates of light source and camera. The distribution of lighting positions in blue triangles and camera positions in red circles; lighting condition 16 is highlighted as it is the nadir position at (0, 0, 41). FIG. 2B illustrates sample vehicle images.

To reduce computational time, the images were down sampled from 480×640 to a resolution of 160×213 by using a bi-cubic down sampling scheme and were converted from color to greyscale images.

We calculate the RMSE between the different vehicles shapes in TABLE 2. The vehicles images are aligned in pose and so the difference in the images is in the shadow. Given the RMSE calculations, we expect the corresponding vehicles to align. A reasonable technique should be able to recognize the different vehicles and align them under the different operating conditions.

TABLE 2 provides Average Root Mean Squared Error (RMSE) In Pixel Intensity Between Source and Target Datasets:

TABLE 2

| Source | Target | Average RMSE |
| --- | --- | --- |
| Avalon LC-1 | Avalon LC-9 | $3.87 \times 10^{-2}$ |
| Sentra LC-1 | Sentra LC-9 | $3.51 \times 10^{-2}$ |
| Avalon LC-1 | Avalon LC-10 | $5.79 \times 10^{-2}$ |
| Sentra LC-1 | Sentra LC-10 | $5.44 \times 10^{-2}$ |
| Sentra LC-1 | Lancer LC-1 | $7.24 \times 10^{-2}$ |

Figure 3A:
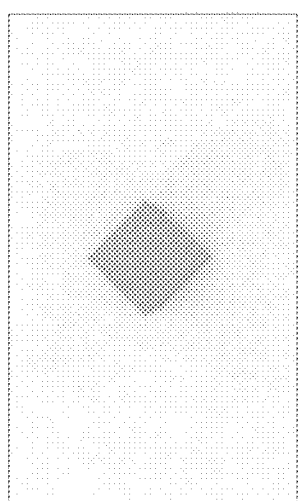
FIG. 3A illustrates an isometric view of a cube with dimensions (1, 1, 1), according to one or more embodiments.
Figure 3B:
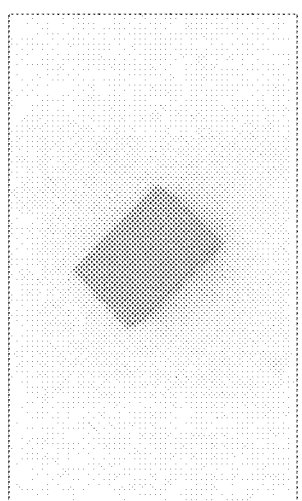
FIG. 3B illustrates an isometric view of a box (1, 1.5, 1), according to one or more embodiments.
Figure 3C:
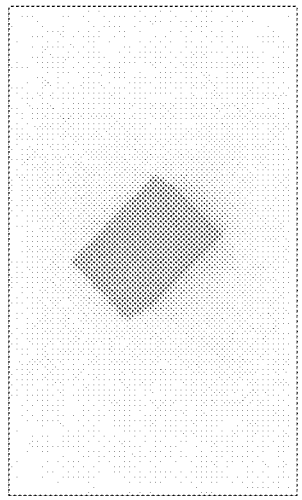
FIG. 3C illustrates an isometric view of a longer box (1, 2, 1), according to one or more embodiments.
Figure 3D:
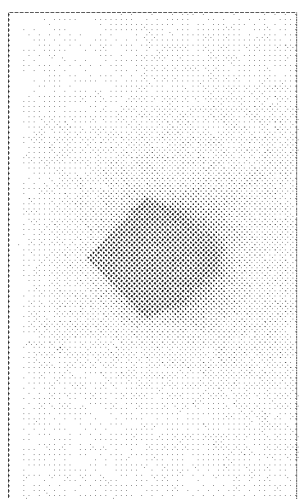
FIG. 3D illustrates an isometric view of a tall box (1, 1, 1.5) according to one or more embodiments.
Figure 3E:
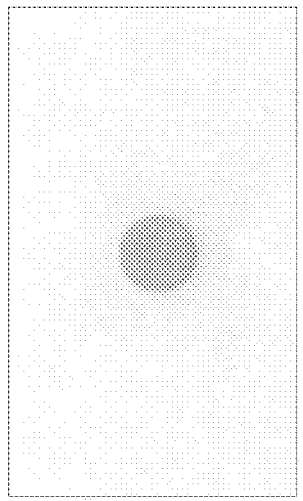
FIG. 3E illustrates an isometric view of a sphere (1, 1, 1), according to one or more embodiments.
Figure 4:
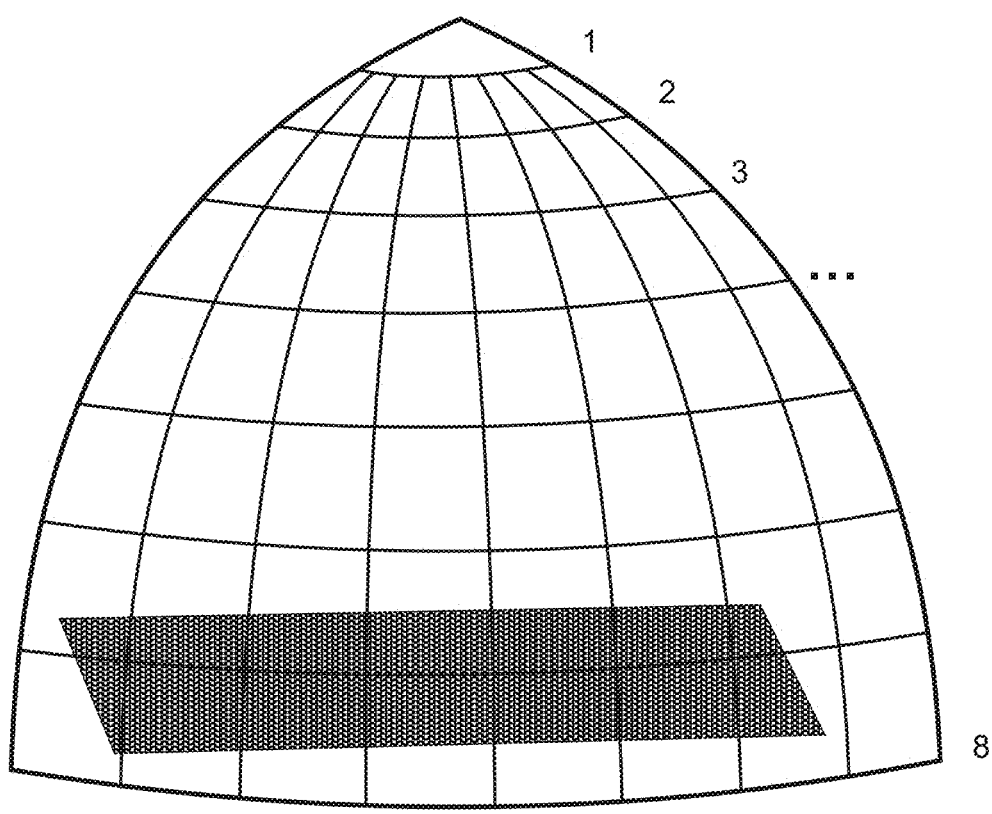
FIG. 4 illustrates a graphical depiction of mesh in Blender, according to one or more embodiments.

FIG. 4 illustrates a graphical depiction of mesh in Blender. The Geometric Shapes dataset was generated using the Blender 3D computer graphics software similar to the way in which the Civilian Vehicles dataset was generated. The dataset contains five geometric shapes: a cube with dimensions (1.0, 1.0, 1.0), a box with dimensions (1.0, 1.5, 1.0), a longer box with dimensions (1.0, 2.0, 1.0), a tall box with dimensions (1.0, 1.0, 2.0), and a sphere of radius one. Examples of five shapes in the geometric shapes dataset are shown in FIG. 3A E. FIG. 3A illustrates an isometric view of a cube with dimensions (1, 1, 1). FIG. 3B illustrates an isometric view of a box (1, 1.5, 1). FIG. 3C illustrates an isometric view of a longer box (1, 2, 1). FIG. 3D illustrates an isometric view of a tall box (1, 1, 1.5) FIG. 3E illustrates an isometric view of a sphere (1, 1, 1).

Figure 5A:
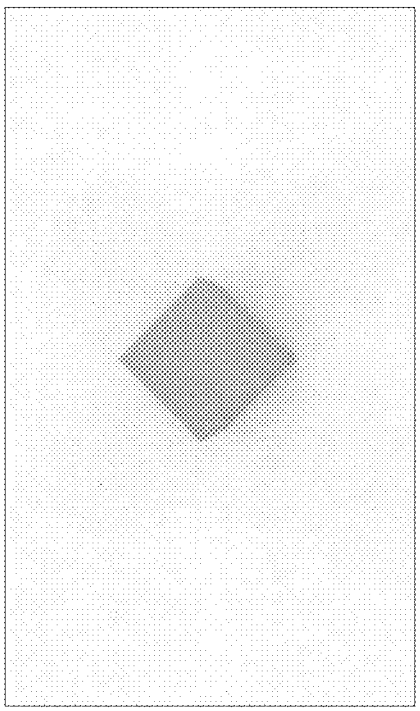
FIG. 5A D illustrate isometric views of the cube under the three different lighting conditions, respectively: (a) light source directly above, (b) light source 10 units to the right of the object, and (c) light source 10 units the left of the object with (d) illustrating the subtle differences between images (b) and (c), according to one or more embodiments.
Figure 5B:
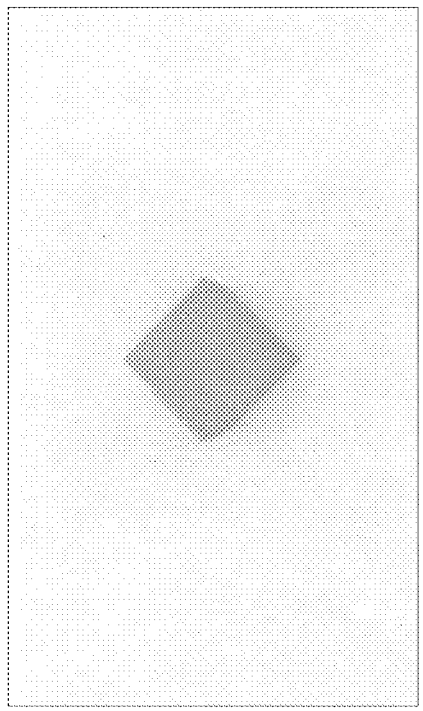
Figure 5C:
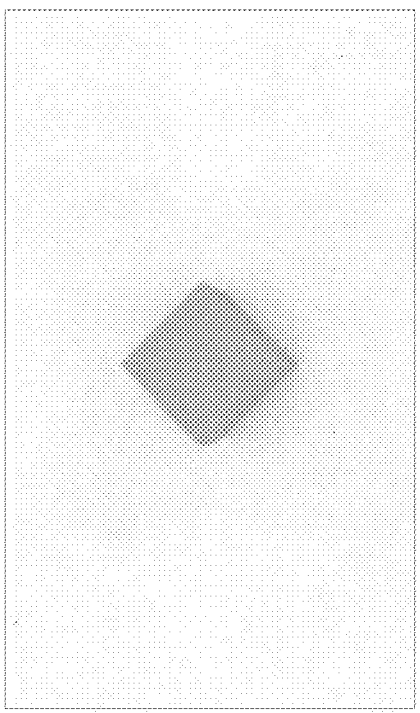
Figure 5D:
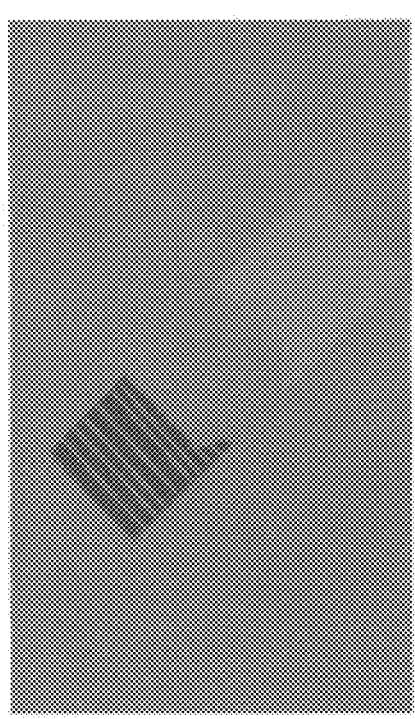

The shapes were placed in the middle of the scene and rendered with three different lighting conditions (LC): (1) The light source directly above the object, (2) the light source to the right of the object, and (3) the light source to the left of the object. Furthermore, the objects were rendered from different camera positions that covered 90° in elevation and 90° in azimuth. For each of the three lighting conditions, there are 73 different camera positions, resulting in a total of 219 different images for each of the shapes. Each image is 960×540 pixels. There is a clear contrast between the shapes and the background, but the images do have variations in shadow from the three different lighting conditions. The difference in shadows is subtle but can be seen in the images. To quantify the shadow, we calculated the average RMSE pixel difference for each shape under the three different lighting conditions. TABLE 3 and FIG. 5A D present the results for the cube. FIG. 5A D illustrate isometric views of the cube under the three different lighting conditions, respectively: (a) light source directly above, (b) light source 10 units to the right of the object, and (c) light source 10 units the left of the object with (d) illustrating the subtle differences between images (b) and (c). The results for the other shapes are similar.

TABLE 3 provides Average Root Mean Squared Error (RMSE) Between Images of Cube Under the Three Different Lighting Conditions:

TABLE 3

| First Lighting Condition | Second Lighting Condition | RMSE (pixels) |
|---|---|---|
| LC-1 (directly above) | LC-2 (to the right) | 0.0015 |
| LC-1 (directly above) | LC-3 (to the left) | 0.0015 |
| LC-2 (to the right) | LC-3 (to the left) | 0.0000 |

Figure 6:
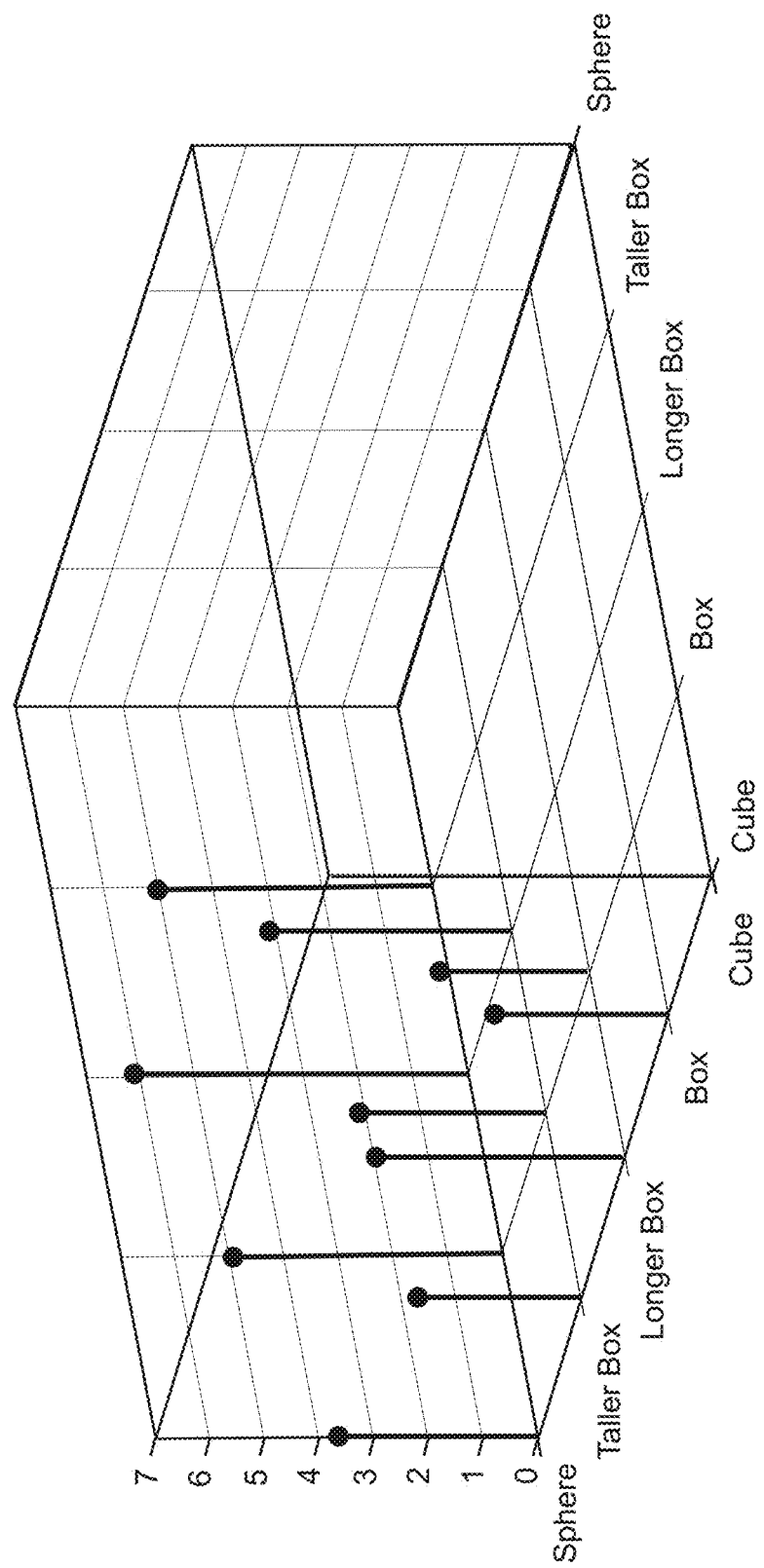
FIG. 6 illustrates a graphical view of average root mean square error (RMSE) for the geometric shapes, according to one or more embodiments.

In TABLE 4 and FIG. 6 we compute the average RMSE between the different geometric shapes. The average RMSE across different shapes is demonstrated to be an order of magnitude larger than the average RMSE for a given geometric shape across different lighting conditions. The shadow from the different lighting conditions and camera positions may be a source of confusion but the difference in the shapes is considerably more substantial. Therefore, a reasonable technique should be able to recognize the different geometric shapes.

TABLE 4 provides Average Root Mean Squared Errors (RMSE) Between Geometric Shapes:

TABLE 4

| Shape One | Shape Two | RMSE (pixels) |
|---|---|---|
| Cube | Box | $3.02 \times 10^{-2}$ |
| Cube | Longer Box | $4.38 \times 10^{-2}$ |
| Cube | Tall Box | $2.83 \times 10^{-2}$ |
| Cube | Sphere | $3.52 \times 10^{-2}$ |
| Box | Longer Box | $2.76 \times 10^{-2}$ |
| Box | Tall Box | $3.37 \times 10^{-2}$ |
| Box | Sphere | $4.95 \times 10^{-2}$ |
| Longer Box | Tall Box | $4.43 \times 10^{-2}$ |
| Longer Box | Sphere | $6.03 \times 10^{-2}$ |
| Tall Box | Sphere | $4.91 \times 10^{-2}$ |

Cancer Data: A gene expression is a process. The input to the process is DNA and the output is a protein. A gene expression genome is the sum total of an organisms heritable information that can be passed from one generation to the next. With the determination of the sequence of roughly three billion nucleotides that comprise the human genome nearly complete, there are new opportunities to explore problems in health informatics. One such problem is recognizing cancerous gene expressions among healthy gene expressions.

For our efforts we utilized the mRNA microarray gene expressions dataset from the Biomedical Knowledge Repository (BKR) developed at the National Library of Medicine (NLM). Specifically we used Lung Adenocarcinoma (LUAD) and the Breast Invasive Carcinoma (BRCA) data. In the original dataset, each sample in both domains contain 60, 484 different genes (features). The breast cancer data contains 112 positive samples and 117 negative samples. For the lung cancer data, there are 49 positive samples and 49 negative samples. For our purposes, we view this as a 60, 484 dimensional vector per subject. The 60, 484 dimensions are not the same for breast and lung cancer. For the transfer learning techniques, the attributes do need to be the same for the source and target data. The first step for working with the breast and lung cancer data is to match the features.

The features that were in the intersection of both the breast and lung cancer data were retained and the rest were discarded. For EO this is analogous to first ensuring that the images are of equivalent size.

There is interest in understanding how the transfer learning techniques perform using the non-PCA data. Hence, the experiments are redone using the overlapping dimensions of 22, 622. The average RMSE using the full dataset between the different classes are shown in TABLE 5. Notice that again the positive and negative samples align the best between the four possibilities.

TABLE 5 provides Average RMSE between cancer classes:

TABLE 5

| First Class | Second Class | Average RMSE |
|---|---|---|
| Positive lung cancer samples | Positive breast cancer samples | 0.226 |
| Negative lung cancer samples | Negative breast cancer samples | 0.226 |
| Positive lung cancer samples | Negative breast cancer samples | 0.267 |
| Negative lung cancer samples | Positive breast cancer samples | 0.612 |

The MNIST dataset consists of electro-optical (EO) images of isolated handwritten digits from the Modified National Institute of Standards and Technology (MNIST) database available to the public from the National Institute of Standards and Technology (NIST). The handwritten digits range from zero to nine and have at least 436 samples per digit. The original data consists of 28×28 resolution grayscale images. The dataset can be divided into two subsets: 1) digits handwritten by professionals and 2) digits handwritten by students. The number of samples from each subset varies per handwritten digit but approximately half of the samples are from professionals and the other half are from students.

Some of the experiments performed with the data focus on classifying different digits using professionals as the source and students as the target. The professional samples are observed to be more uniform while the student samples varied widely as one would expect. The average RMSEs for this dataset are provided in TABLE 23 below. Notice that the RMSEs suggest a clear alignment so a reasonable technique should be able to recognize the different handwritten digits.

TABLE 6 provides Average RMSE between MNIST Handwritten Digits:

TABLE 6

| First Handwritten Digit | Second Handwritten Digit | Average RMSE |
|---|---|---|
| Nine | Four | 0.313 |
| Three | Five | 0.357 |
| Nine | Five | 0.364 |
| Three | Four | 0.388 |

To increase the complexity of the transfer challenge the target images were rotated by 90°. The average RMSE for the rotated images are shown below in TABLE 7. Notice that the RMSE have increased and so the transfer problem will be more difficult but we still expect that a reasonable approach will be able to classify the different handwritten digits.

TABLE 7 provides Average RMSE between rotated MNIST Handwritten Digits:

TABLE 7

| First Handwritten Digit | Second Handwritten Digit | Average RMSE |
| --- | --- | --- |
| Rotated Nine | Four | 0.357 |
| Rotated Three | Five | 0.401 |
| Rotated Nine | Five | 0.405 |
| Rotated Three | Four | 0.421 |

The Comanche dataset is a measured military vehicles dataset provided by the U.S. Army, Army Research Laboratory (ARL). The dataset was collected by a forward looking infrared (FLIR) sensor simulating a circular flight path around each vehicle. This data set contains 10 military ground vehicles viewed from a ground-based second generation FLIR. The targets are viewed from arbitrary aspect angles. The images contain cluttered backgrounds and partially obscured targets. The target signatures vary greatly as portions of the imagery were collected at different times of day, at different locations (Michigan, Arizona, and California), in different seasons, and under varying weather conditions. Examples of target chips for the vehicles at the viewing angle of 90° are shown in FIG. 30.

We refer to this dataset as the ARL Dataset. For instructions on obtaining the database please contact ARL.

The average RMSE for the four classes are shown in TABLE 8. This is an interesting table as it goes against intuition, Tank 7 is aligning to Tank 1 but the six wheel large truck (Target 4) isn't aligning best with the Four wheel small truck (Target 1). Based on this RMSE table, the prediction is that the transfer learning will not perform well in this experiment.

TABLE 8 provides Average RMSE between Comanche classes:

TABLE 8

| First Class | Second Class | Average RMSE |
| --- | --- | --- |
| Six wheel large Truck (Target 4) | Four wheel small truck (Target 1)) | 0.143 |
| Tank (Target 7) | Tank (Target 5) | 0.122 |
| Six wheel large Truck (Target 4) | Tank (Target 5) | 0.133 |
| Tank (Target 7) | Four wheel small truck (Target 1) | 0.157 |

A cross-operating conditions transfer challenge can also be performed on the ARL dataset. The source classification problem is the Vehicle Target 4 vs. the Vehicle Target 7 both at approximately 2000 meters with 152 and 157 samples, respectively. Since there are a few number of samples per range, the samples spanned a range of 1900-2184 meters. The target classification problem is the same vehicles but now at approximately 3000 meters with 151 and 144 samples respectively. The average RMSE for these classes can be seen below in TABLE 9. This is a more intuitive RMSE table since it makes sense that the Six wheel large truck at 2,000 meters aligns with the six wheel large truck at 3,000 meters, and similarly for the tank. The results for this experiment should outperform the previous Comanche experiment.

TABLE 9 provides Average RMSE between Comanche classes utilized in the cross-operating conditions transfer challenge:

TABLE 9

| First Class | Second Class | Average RMSE |
| --- | --- | --- |
| Six wheel large Truck (Target 4) at 2000 meters | Six wheel large Truck (Target 4) at 3000 meters | 0.1781 |
| Tank (Target 7) at 2000 meters | Tank (Target 7) at 3000 meters | 0.2077 |
| Six wheel large Truck (Target 4) at 2000 meters | Tank (Target 7) at 3000 meters | 0.2614 |
| Tank (Target 7) at 2000 meters | Six wheel large Truck (Target 4) at 3000 meters | 0.2160 |

Experimental Design: This section describes the experimental design for the transfer learning challenges examined in this work.

TABLE 10 provides Cancer Data; Average percent accuracy of transfer learning classification methods over 10 validation trials utilizing 99% of the database, the merge method for diffusion map (DM) construction, and randomly selected labeled target samples; includes associated

TABLE 11

| Num. Of Random Pts. Per Class | Source CCR Range | Source CCR Avg | Target CCR Range | Target CCR Avg | Transfer Boost Avg From 83.6 | Transfer Boost Range |
| --- | --- | --- | --- | --- | --- | --- |
| One | [92.9-98.9] | 98.6 | [64.6-97.8] | 91.1 | 7.5 | [−19.0-14.2] |
| Two | [93.9-99.0] | 98.6 | [54.6-97.8] | 93.0 | 9.4 | [−38.4-14.2] |
| Three | [90.8-99.0] | 98.6 | [79.5-97.8] | 95.0 | 9.4 | [−15.5-14.2] |
| Four | [89.8-99.0] | 98.4 | [76.9-97.8] | 95.4 | 11.8 | [−6.7-14.2] |
| Five | [89.8-99.0] | 98.4 | [87.8-97.8] | 95.3 | 11.6 | [4.2-14.2] |
| Six | [93.9-99.0] | 98.6 | [90.4-97.8] | 95.8 | 12.2 | [92.9-98.9] |

First the transfer challenge must be determined; identifying whether the experiment is cross-operating conditions, partial cross-domain, or cross-domain. The challenge problem includes the statement of the source and target classification problems. The average RMSEs are also reported which may provide insight as to which class in the target domain will most likely align to which class in the source domain.

The next process is the random selection of a sample to serve as the one-labeled sample per class of the target data. To overcome the combinatorics rather than using a randomly selected sample the sample closest to the mean of the classes in the target domain are selected. In a real-world application data is sparsely labeled and may result in selections far from the mean. Hence, there is strong interest in understanding how the performance of the transfer learning techniques degrade when a sample other than the sample closest to the midpoint is selected as the labeled target sample. TrDM is applied to the Cancer dataset using randomly selected samples as the labeled class sample in the target set. The results can be seen in TABLE 10.

The results of this experiment are very promising. In Section 7 below when the TrDM and MTSL experiments are explained, the TrDM for the target domain with 1) randomly selected subsets utilizing 99% of the original database and 2) utilizing the sample closest to the midpoint as the one-labeled sample, results in a 95.2% correct classification rate (CCR). Notice in order to reach that CCR utilizing randomly selected samples, the TrDM technique would need four labeled samples per class. Furthermore, notice that with only five or six labeled samples per class, the CCR utilizing the mean point can actually be surpassed at 95.3% and 95.8%, respectively. This result means that utilizing the midpoint is actually not resulting in the best performance but is also a reasonable starting point.

To provide further confidence that the sample closest to the mean is a reasonable choice, the experiment above is repeated for the MNIST data. For this dataset the target CCR when using TrDM and the sample closest to the mean is 93.2% as described below. To match that CCR utilizing randomly selected points only three points are needed resulting in a target CCR (average) of 93.4%. Given these results, for all the experiments in this work the sample closest to the midpoint is utilized as the one-labeled sample with the note that in real-world applications the algorithms would need closer to three to four labeled samples.

After selecting the labeled samples, focus is given to the parameter search to find the appropriate parameters for the diffusion map. This can be a tedious process. The present disclosure provides a relatively succinct process as outlined herein. The diffusion map construction method needs to be chosen as either the merge method or the out-of-sample extension (OSE). It is reasonable to use the merge method for transfer learning since both the source domain and the target domain exist at the same time. The experiments in Chapter 7 use the merge method unless otherwise stated.

The next step of the process is to integrate statistical robustness since all the transfer techniques are stochastic. Each experiment is conducted at least 10 times and only the averages are reported. In addition, for most of the experiments, to add more statistical variation, a minimum of eight random subsamples of the target database are created utilizing 90-97% of the original database and the experiments are then repeated on those subsamples. The average classification rates across all the subsamples are then reported. To better quantify the results, the confidence intervals are calculated.

The experimental results presented in the following chapter will report results for four different techniques, as follows:

DM->TrFLDA Original Implementation: This is a two-step technique which combines Diffusion Maps with TrFLDA. In step one, the data is transformed using Diffusion Maps and in step two TrFLDA is applied to the transformed data. This technique uses the original code for TrFLDA as described previously in Algorithm 1 and uses a fixed transfer rate ($\lambda$) as in the original implementation DM->TrFLDA: As in the previous technique, this is a two-step technique which combines Diffusion Maps with TrFLDA. In step one, the data is transformed using Diffusion Maps and in step two TrFLDA is applied to the transformed data. This technique uses the original code for TrFLDA as described previously in Algorithm 1 but the transfer rate is selected optimally by choosing the transfer rate that maximizes the source data classification rate. For all techniques if there is a range of values for which the maximum is achieved, then the midpoint of the range is selected.

MTSL: As the previous techniques, this is a two-step technique which combines Diffusion Maps with TrFLDA. In step one, the data is transformed using Diffusion Maps and in step two TrFLDA is applied to the transformed data. However, this technique uses the improved implementation for TrFLDA as described previously in Chapter 3 and summarized in Algorithm 2 and the transfer rate is selected optimally by choosing the transfer rate $\lambda$ that maximizes the source data classification rate.

TrDM: Unlike the previous techniques, this technique integrates Diffusion Maps and Transfer Subspace Learning simultaneously in one step, as described herein and summarized in Algorithm 4. The transfer rate is selected optimally by choosing the transfer rate that maximizes the source data classification rate.

Experimental Results: In this chapter, we present the results of several experiments utilizing several different and diverse databases. The chapter is organized in three sections. The experiments in Section 7.1 help to validate the efficacy of diffusion maps and the TrFLDA baseline transfer technique. Section 7.2 presents different experiments using MTSL and TrDM. These approaches are compared to the TrFLDA technique. Section 7.3 addresses potential performance predictors for the techniques.

Verification of the Efficacy of Diffusion Maps and TrFLDA: In this section, the efficacy of Diffusion Maps and Transfer Fisher's Linear Discriminative Analysis (TrFLDA) is explored in a series of experiments utilizing the Geometric Shapes database and the Electro-Optical Data Domes database.

Geometric Shapes using Diffusion Maps and TrFLDA: Results for diffusion maps and TrFLDA (original implementation) are shown on a simulated dataset of geometric shapes. In the following we review the dataset described in detail in Section 6.1 and describe the initial experiments conducted with the dataset. The average RMSE for shapes are shown in TABLE 4 and in FIG. 6.

Figure 7A:
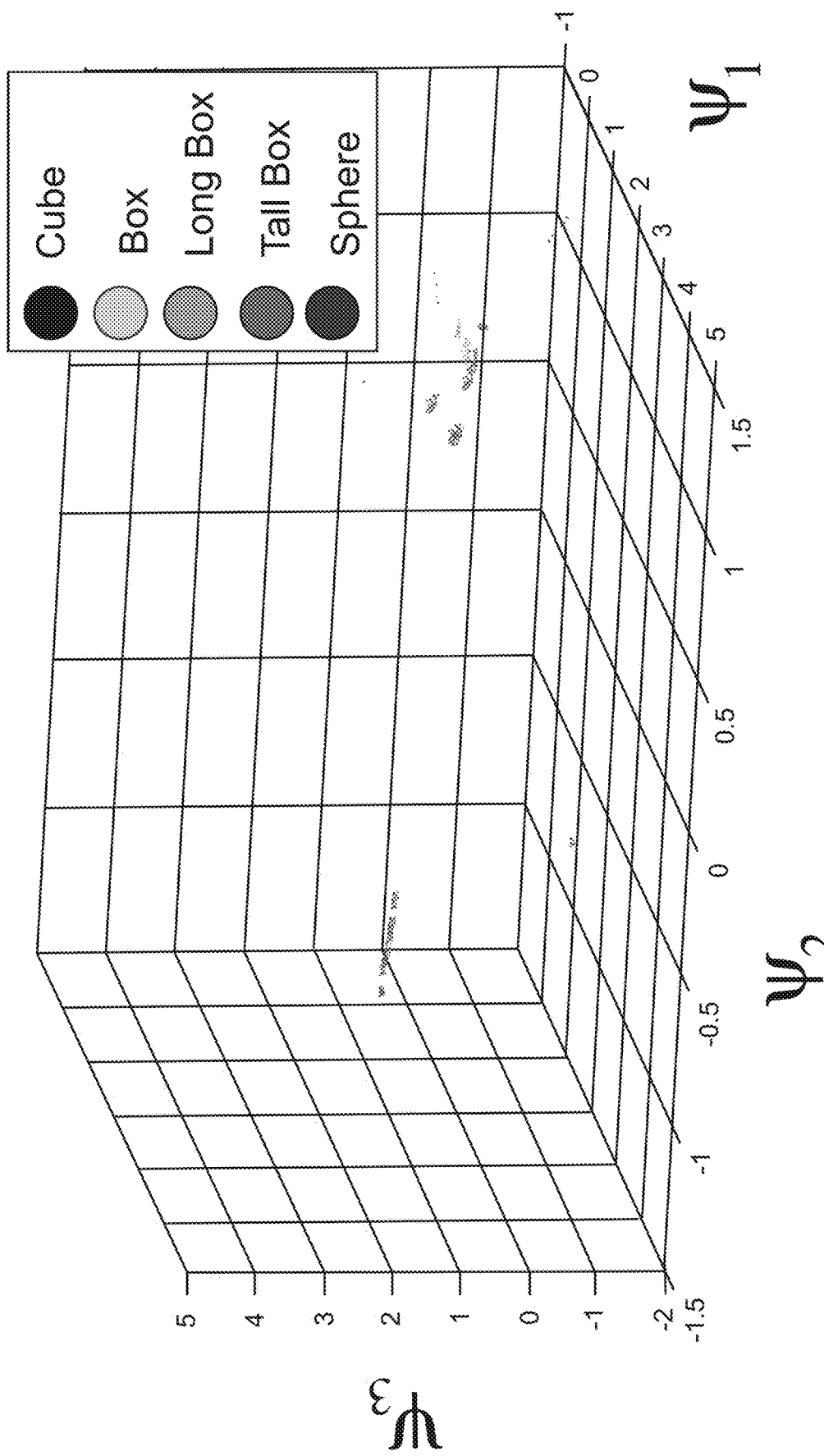
FIG. 7A C illustrate three dimensional graphical representation under a particular lighting condition of diffusion maps for all five shapes: (i) cube; (ii) box; (iii) long box; (iv) tall box; and (v) sphere, according to one or more embodiments.
Figure 7B:
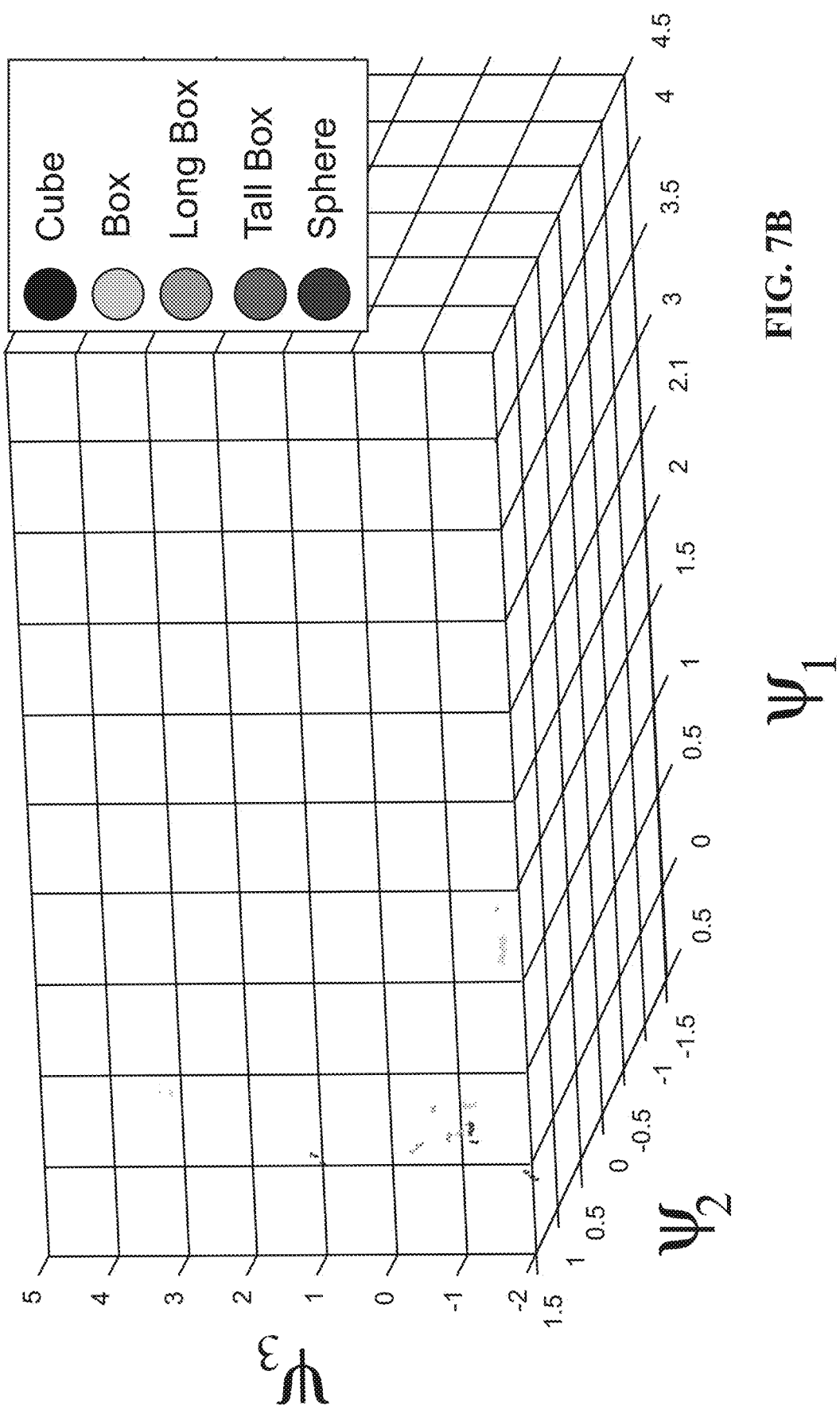
Figure 7C:
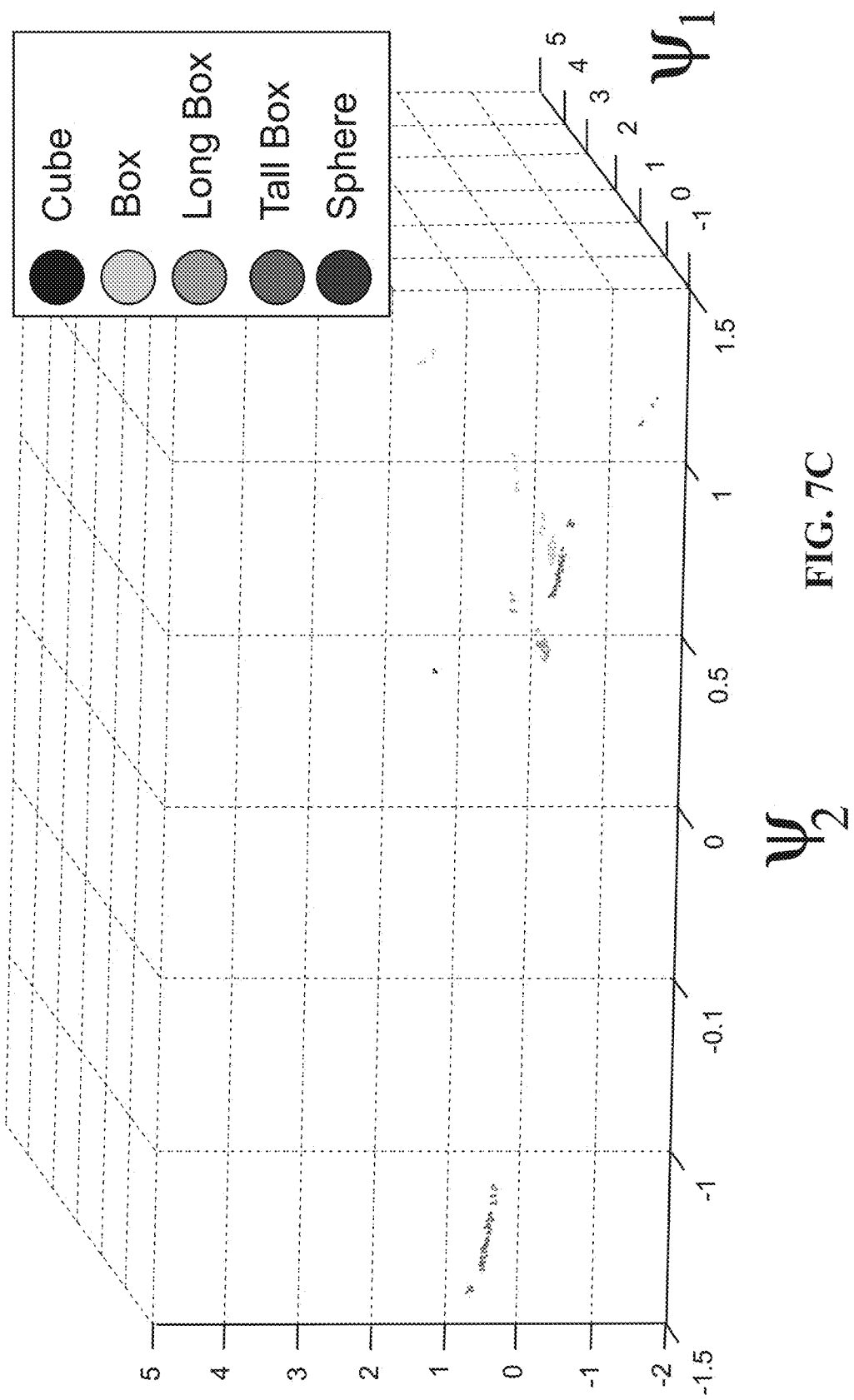

We applied the diffusion map technique to the geometric shapes dataset to reduce the data from 518400 (960×540) original dimensions to 45 dimensions. The diffusion map parameters were set to t=1 and $\sigma$=7 for consistency with prior work. The first three dimensions of the resulting diffusion map are shown in FIG. 7. Note the resulting diffusion map is able to capture the structure of the data. The order of elevation and azimuth are maintained and the manifolds of closer shapes are closer together. For example the manifold of the box (pink) and the longer box (green) are so close that they appear to be on top of one another.

Figure 8:
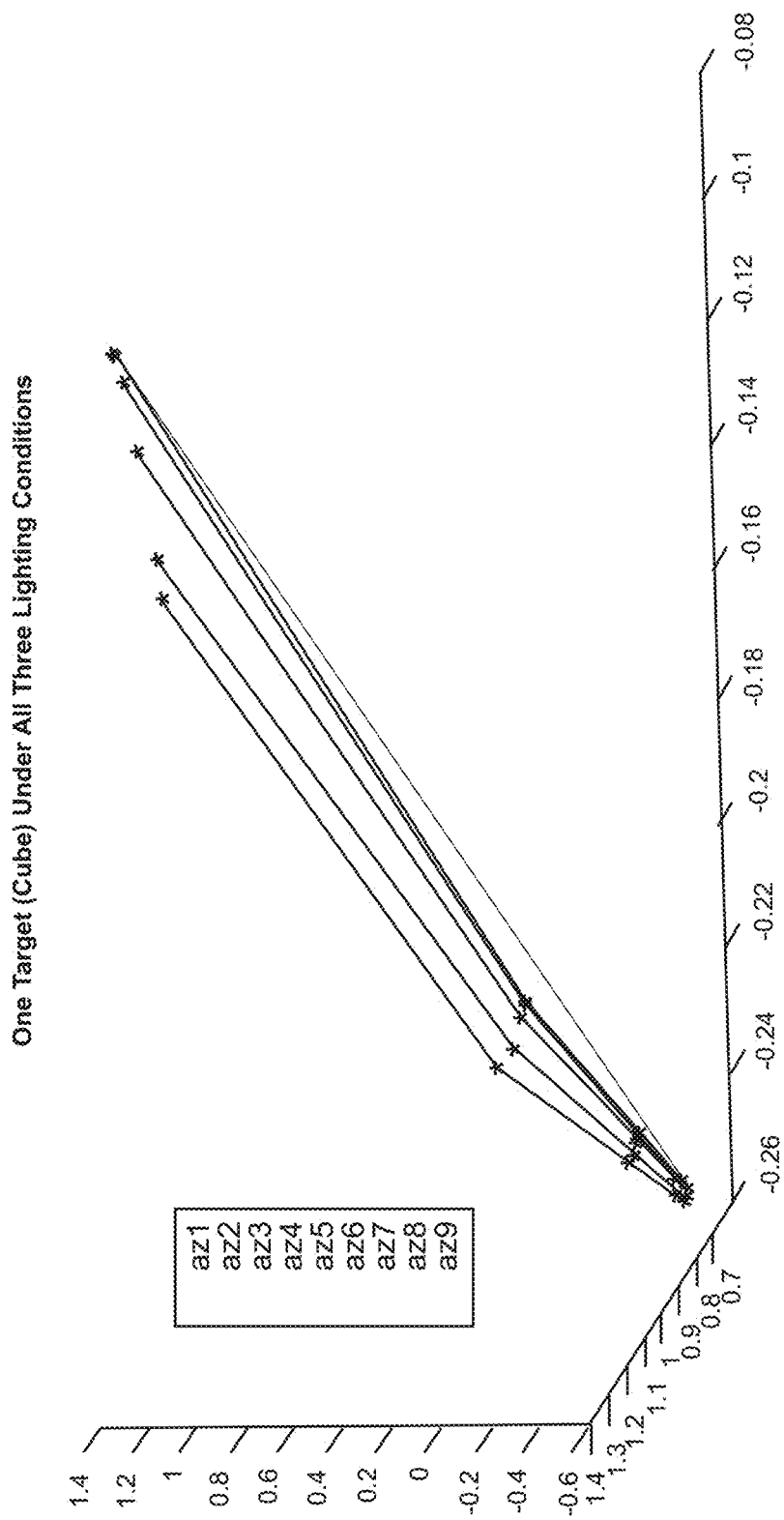
FIG. 8 illustrates a graphical view of diffusion maps for a cube under all three lighting conditions, according to one or more embodiments.
Figure 9:
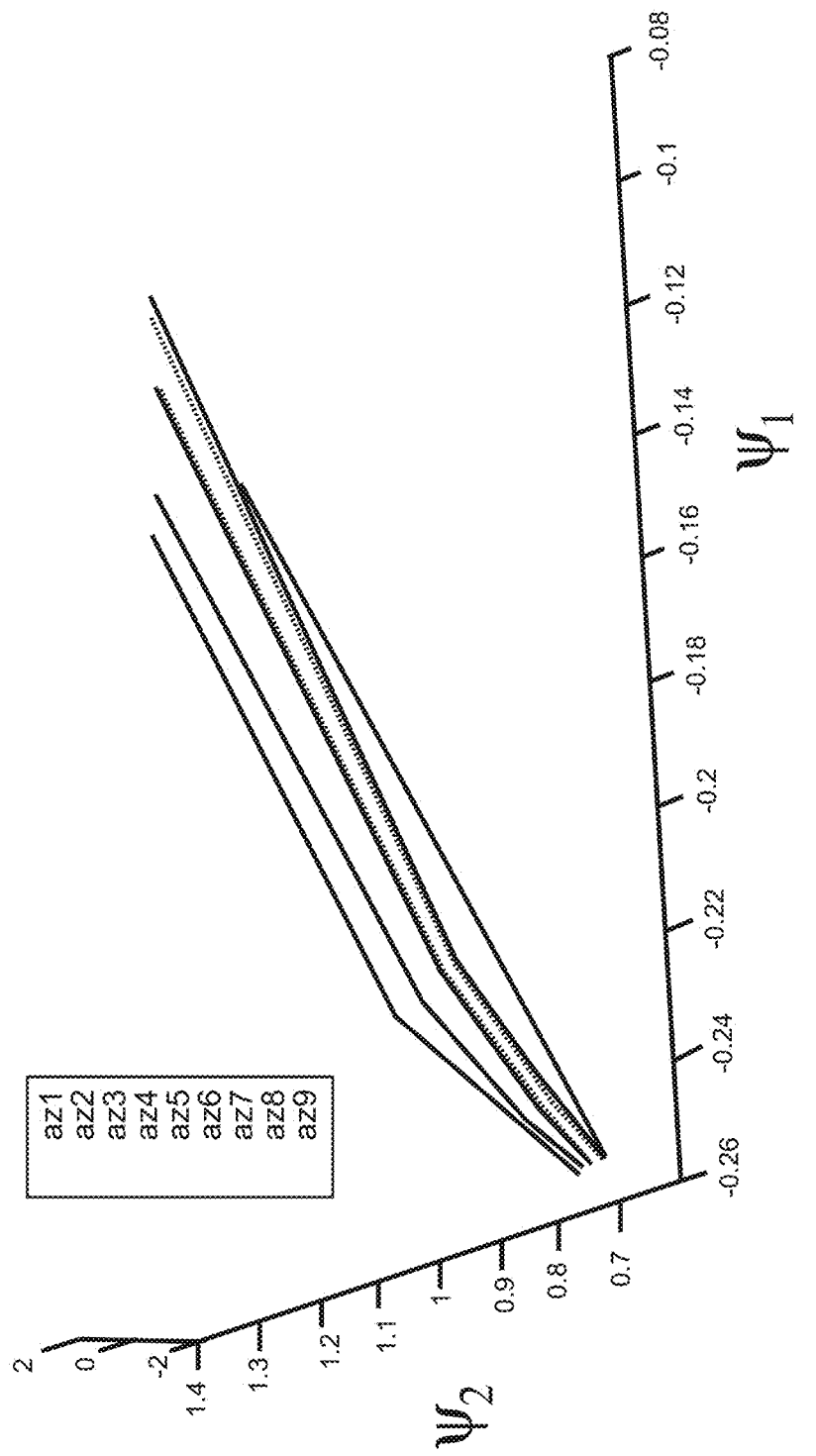
FIG. 9 illustrates a graphical view of the first three dimensions of the diffusion map for the cube under the first lighting condition, according to one or more embodiments.
Figure 10:
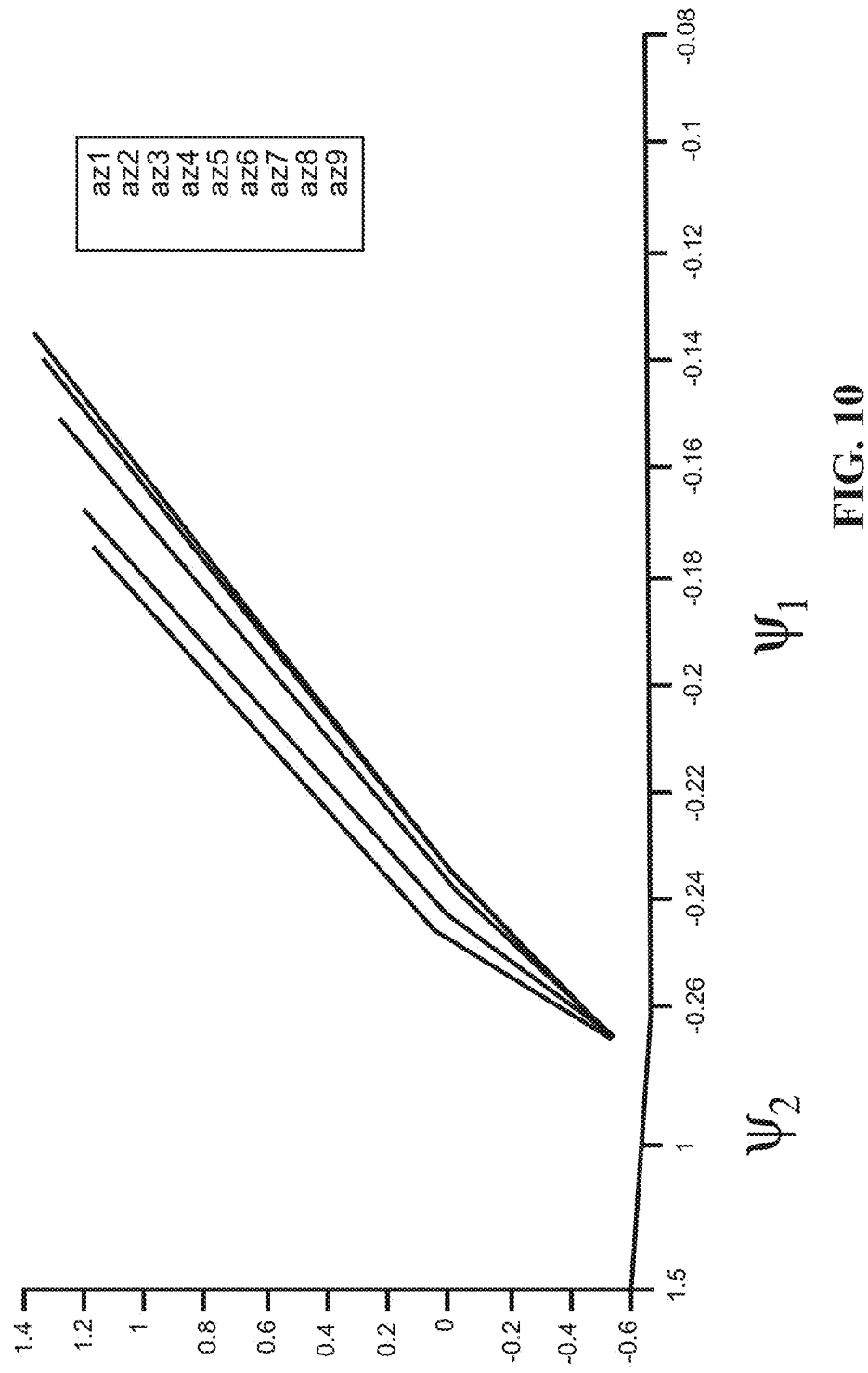
FIG. 10 illustrates a graphical view of the first three dimensions of the diffusion map for the cube under the second lighting condition, according to one or more embodiments.
Figure 11:
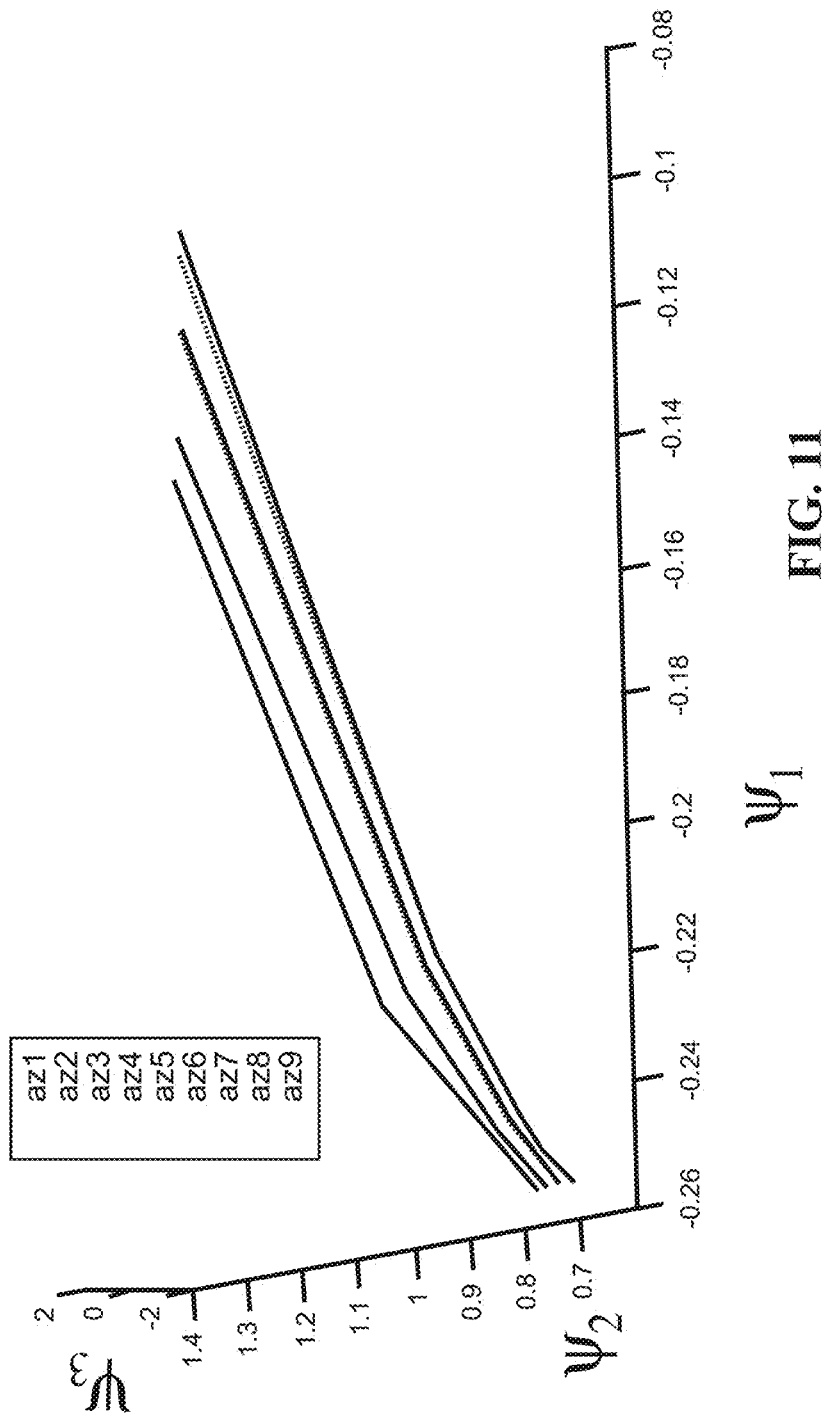
FIG. 11 illustrates a graphical view of the first three dimensions of the diffusion map for the cube under the third lighting condition, according to one or more embodiments.

The diffusion map for the cube combining all three lighting conditions is shown in FIG. 8. For comparison the diffusion maps for single lighting conditions are shown in FIGS. 9-11, respectively. Notice that the shape of the manifold is consistent for all three lighting conditions. The diffusion map is thus identifying structure in the data independent of lighting condition.

Figure 12:
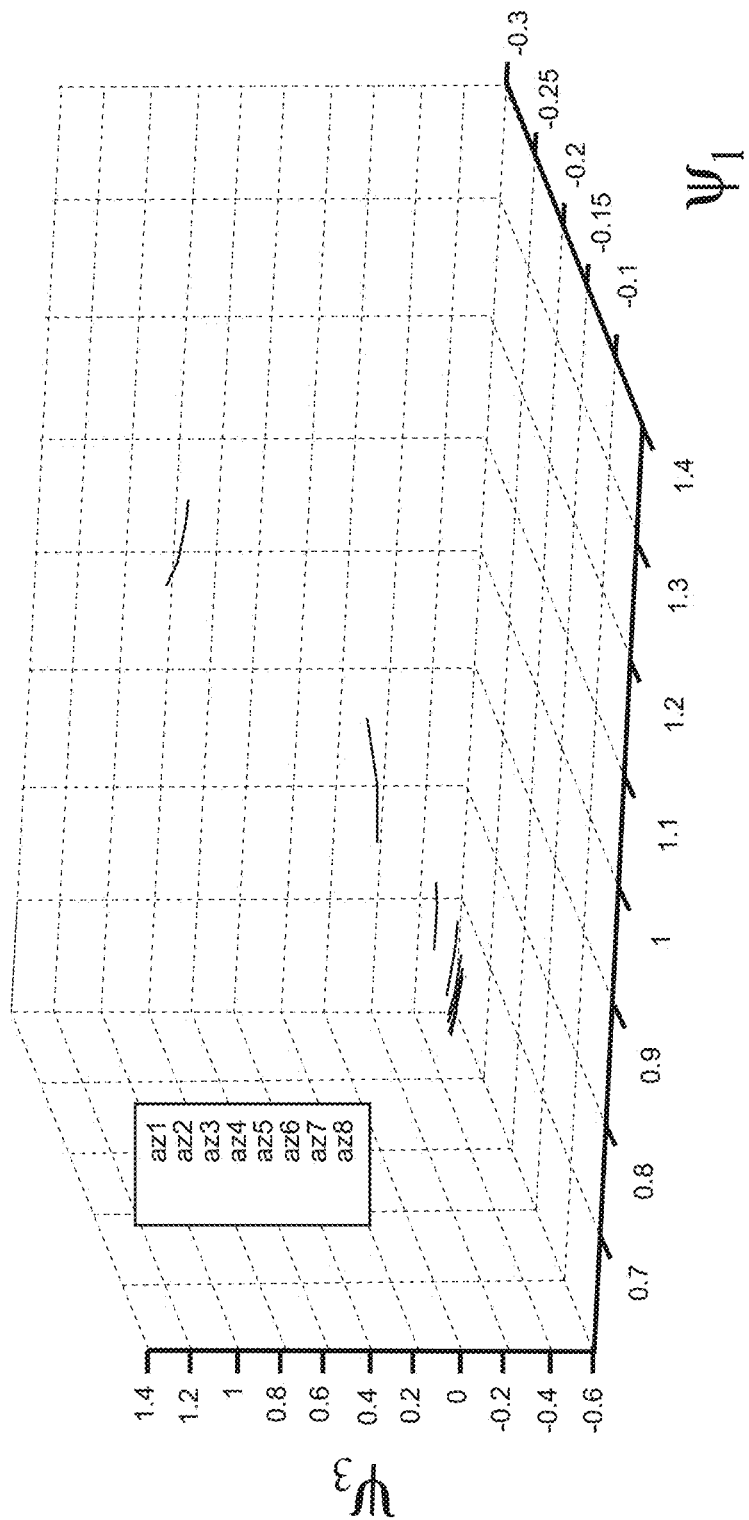
FIG. 12 illustrates a graphical view of the different elevations shown in the diffusion map for the cube under the first lighting condition.
Figure 13:
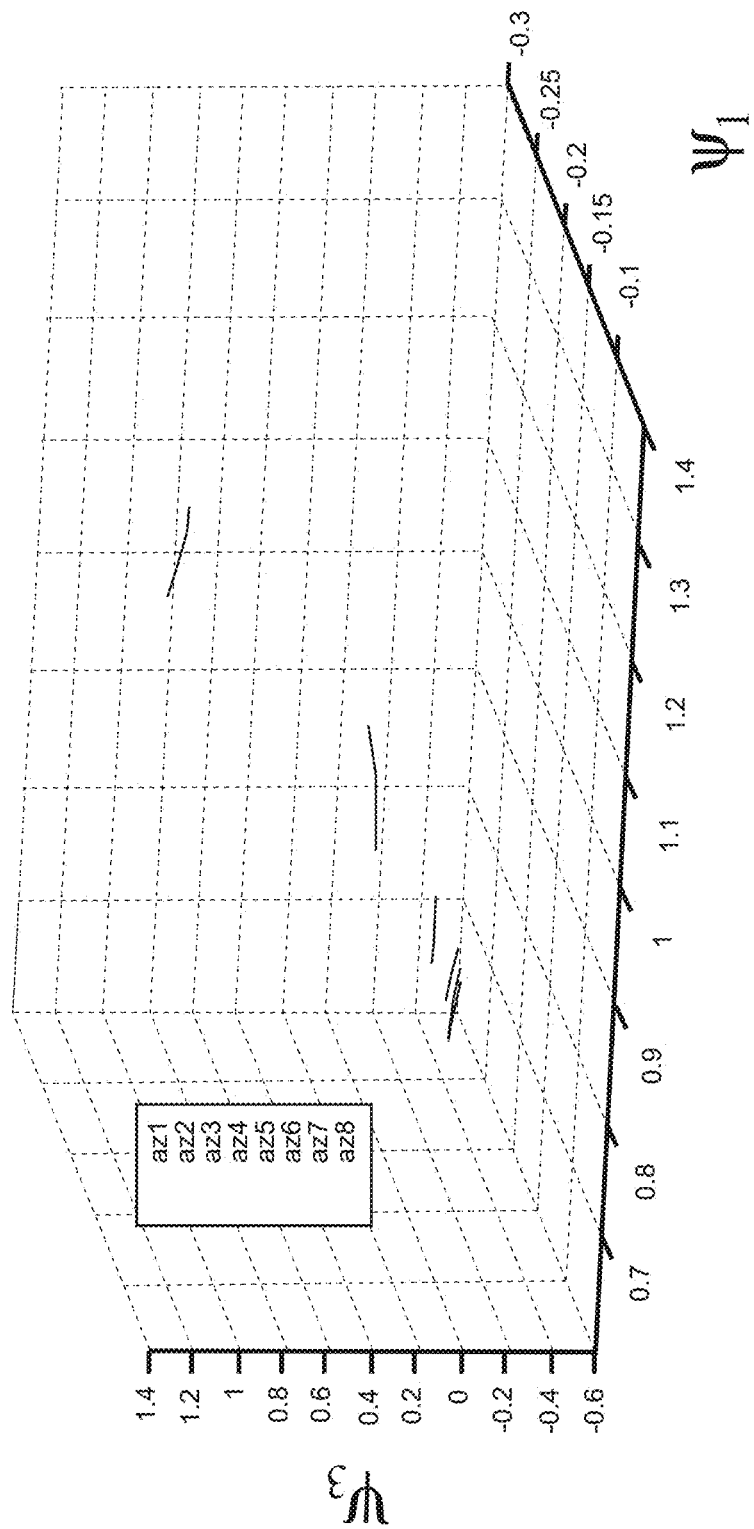
FIG. 13 illustrates a graphical view of the different elevations shown in the diffusion map for the cube under the second lighting condition, according to one or more embodiments.
Figure 14:
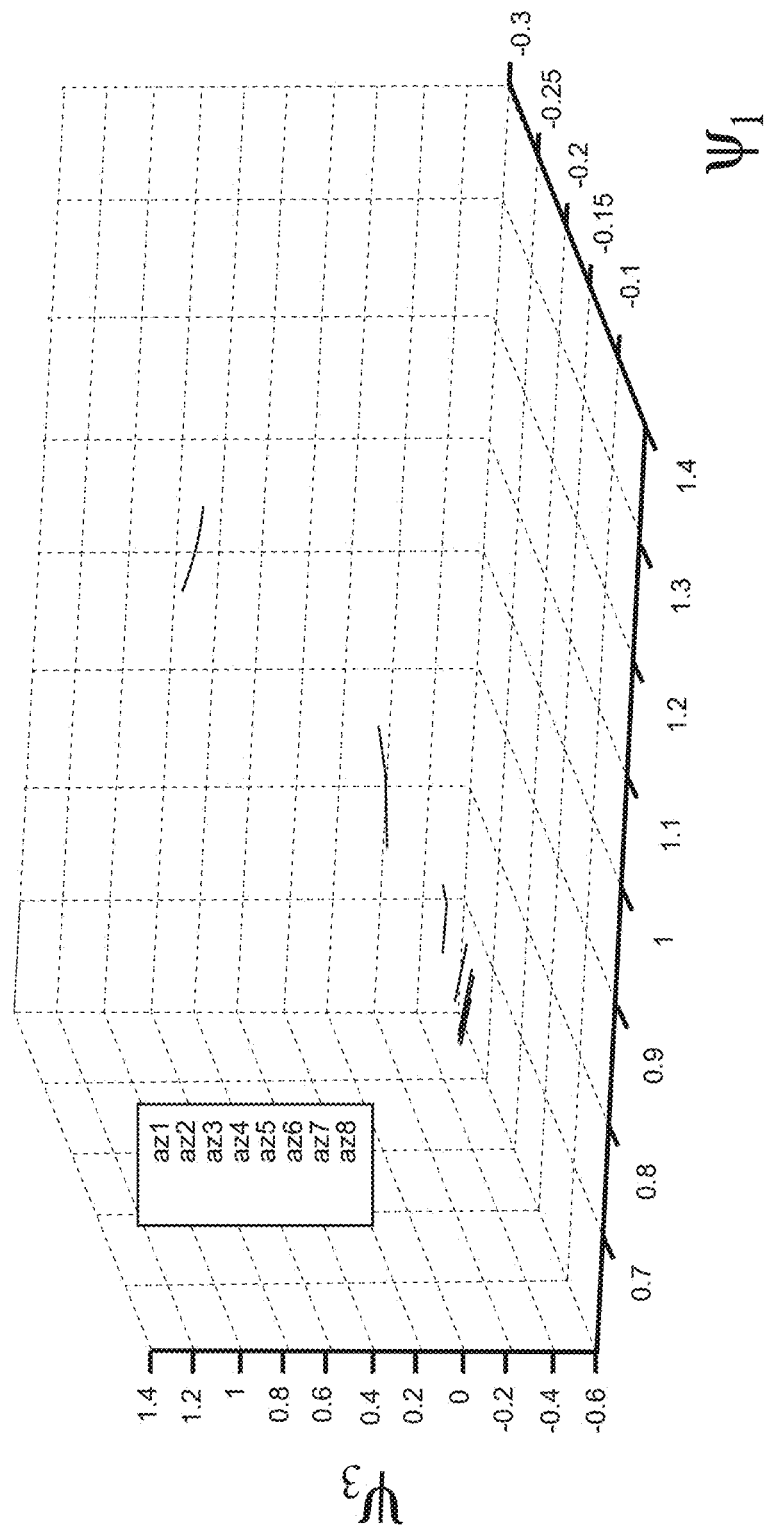
FIG. 14 illustrates a graphical view of the different elevations shown in the diffusion map for the cube under the third lighting condition, according to one or more embodiments.

Next we analyzed the diffusion map based on elevations for the three different lighting conditions. The results are shown in FIGS. 12-14 for lighting conditions one, two, and three, respectively. The shape of the manifolds observed are again consistent though generated under different lighting conditions, thereby illustrating the ability of the technique to extract underlying structure under varying conditions.

Figure 15:
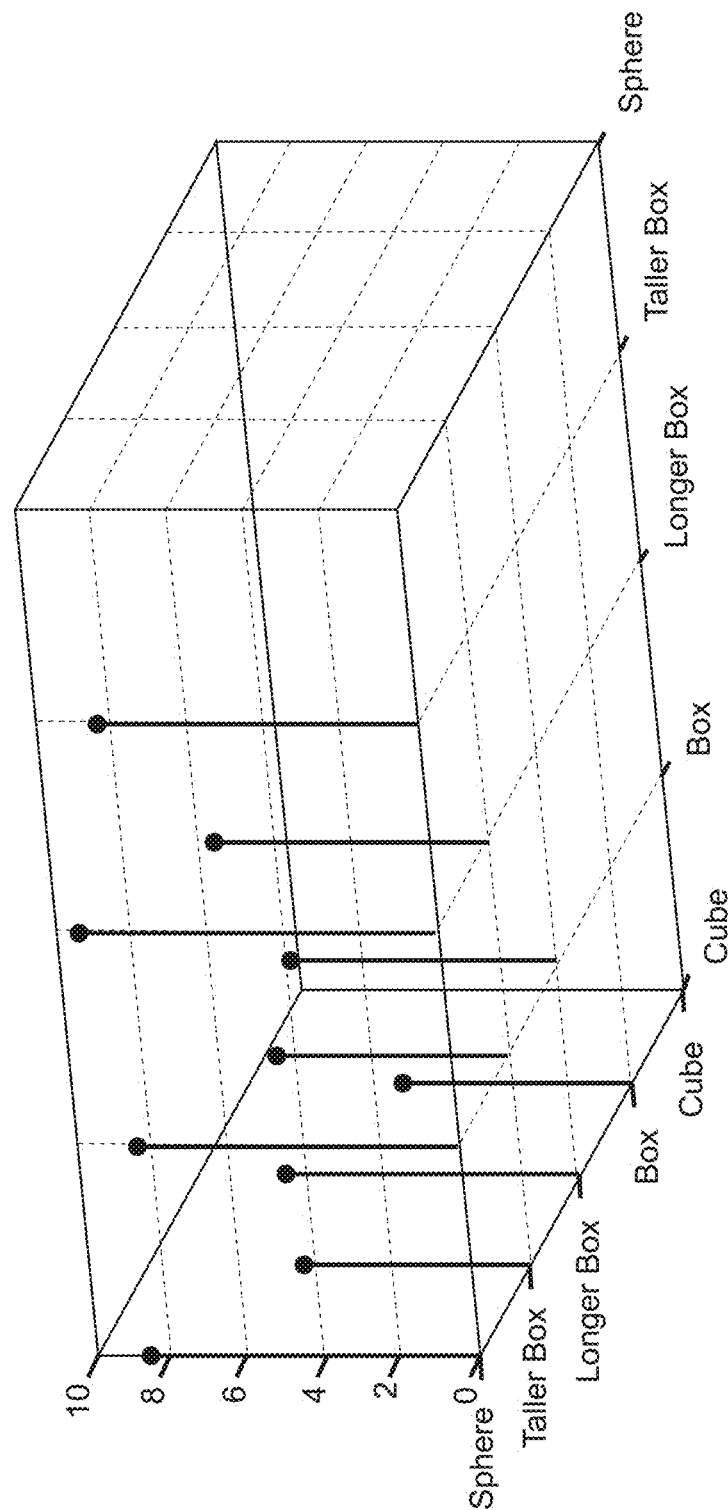
FIG. 15 illustrates a graphical view of Hausdorff distance for the geometric shapes, according to one or more embodiments.
Figure 16:
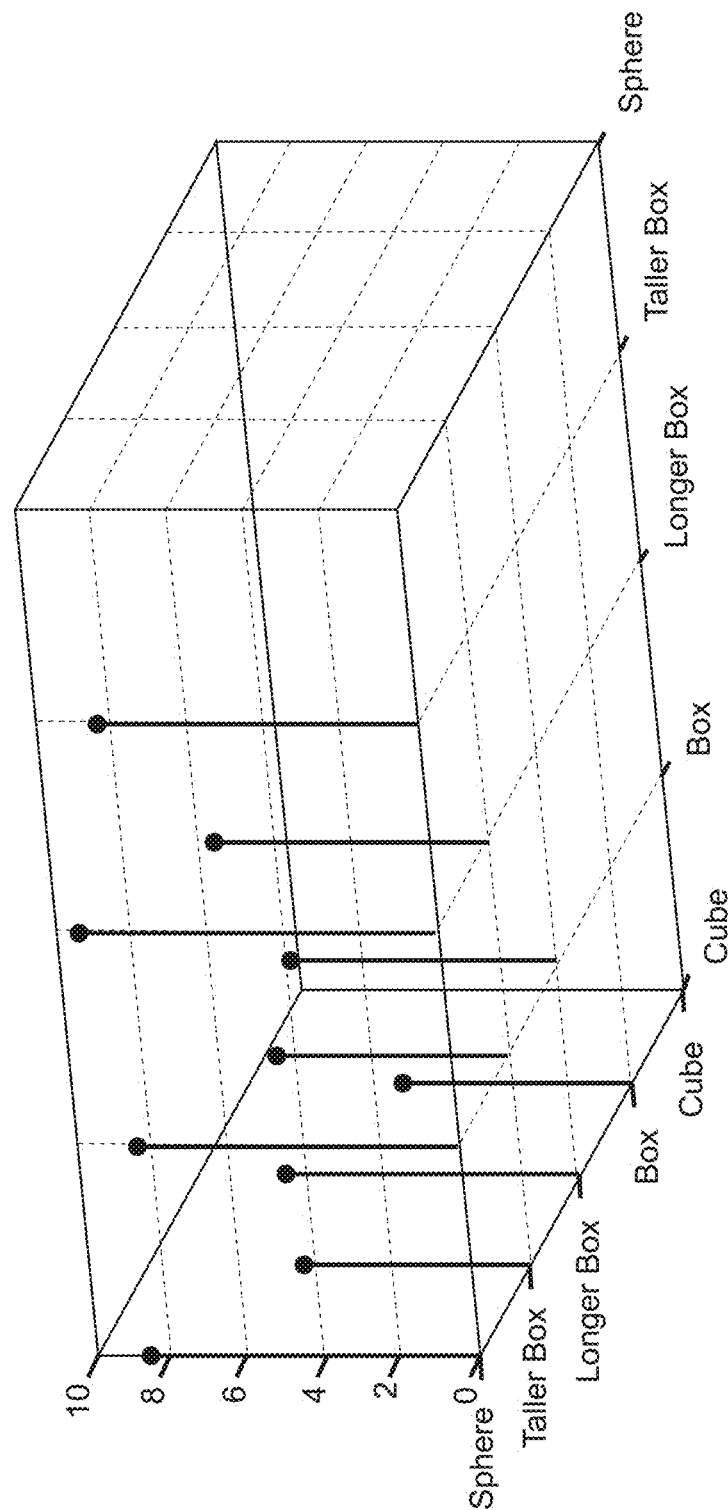
FIG. 16 illustrates a graphical view of modified Hausdorff distance for the geometric shapes, according to one or more embodiments.

Moving beyond visual inspection of the manifolds, we calculated the Hausdorff and Modified Hausdorff distances between the manifold of the shapes. TABLES 11 and 12 show the resulting distances and FIG. 15 and FIG. 16 show a graphical view of the results. The Hausdorff distance does a better job than the RMSE at identifying similar shapes. TABLE 11 provides Hausdorff Distances Between Shapes:

TABLE 11

| Shape One | Shape Two | Hausdorff Distance |
| --- | --- | --- |
| Box | Longer Box | 13.34 |
| Box | Sphere | 12.43 |
| Box | Tall Box | 13.72 |
| Cube | Box | 11.20 |
| Cube | Longer Box | 13.32 |
| Cube | Sphere | 12.66 |
| Cube | Tall Box | 13.70 |
| Longer Box | Sphere | 14.37 |
| Longer Box | Tall Box | 13.83 |
| Tall Box | Sphere | 14.72 |

TABLE 12 provides Modified Hausdorff Distances Between Shapes:

TABLE 12

| Shape One | Shape Two | Modified Hausdorff Distance |
| --- | --- | --- |
| Box | Longer Box | 7.14 |
| Box | Sphere | 8.35 |
| Box | Tall Box | 6.17 |
| Cube | Box | 6.00 |
| Cube | Longer Box | 7.63 |
| Cube | Sphere | 8.33 |
| Cube | Tall Box | 5.78 |
| Longer Box | Sphere | 9.39 |
| Longer Box | Tall Box | 7.21 |
| Tall Box | Sphere | 8.29 |

Transfer learning on geometric shapes dataset: Next we performed Transfer Learning on the geometric shapes dataset. In our preliminary experiment the source data is the cube and tall box while the target data is the tall box and the cube. The original 45 dimensional diffusion maps were classified using Weka and the k-Nearest-Neighbors (k–NN) algorithm to provide a baseline for comparison. As expected, this resulted in 100% correct classification and a kappa statistic of 1. The results for Transfer Learning via Fishers Linear Discriminant Analysis (FLDA) is 99% correct classification using the nearest-neighbors classifier for all values of $\lambda$. The tall box aligned with the tall box while the cube aligned with the cube as expected.

Figures 17A, 17B:
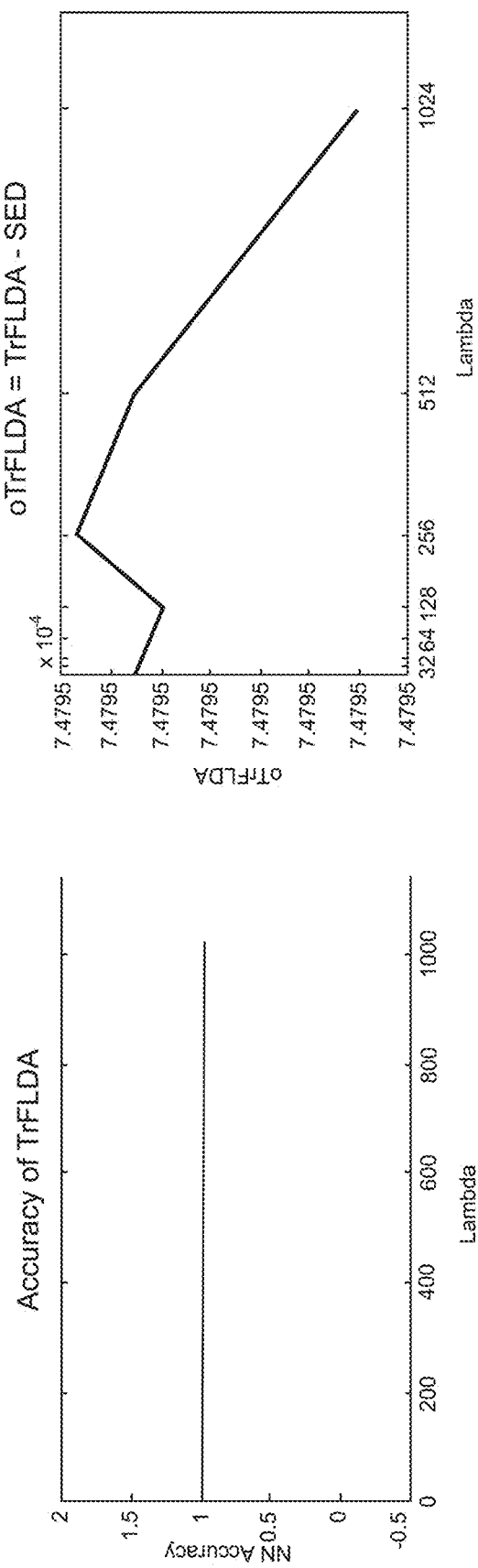
FIG. 17A illustrates a graphical plot representation of the k-nearest-neighbors (kNN) accuracy for the validation experiment, according to one or more embodiments.
FIG. 17B illustrates a graphical plot representation of the objective function TrFLDA results for the validation experiment, according to one or more embodiments.
Figure 18A:
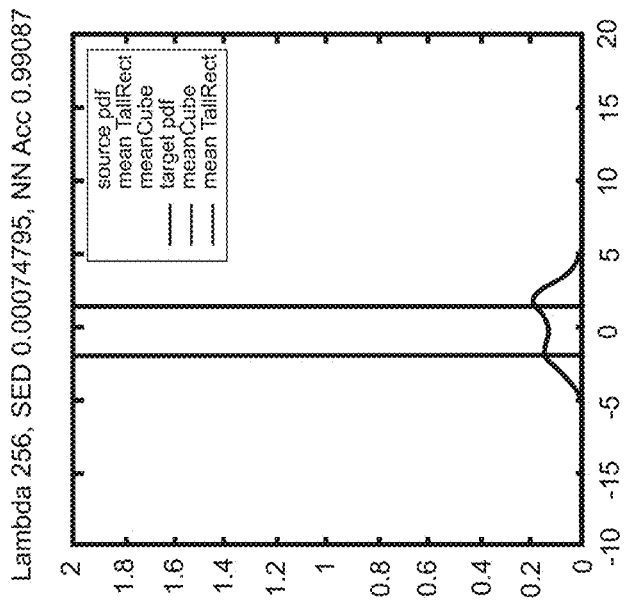
FIG. 18A illustrates a graphical representation for Transfer Fisher's Linear Discriminant Analysis (TrFLDA) results for $\lambda=256$ for the validation experiment, according to one or more embodiments.
Figure 18B:
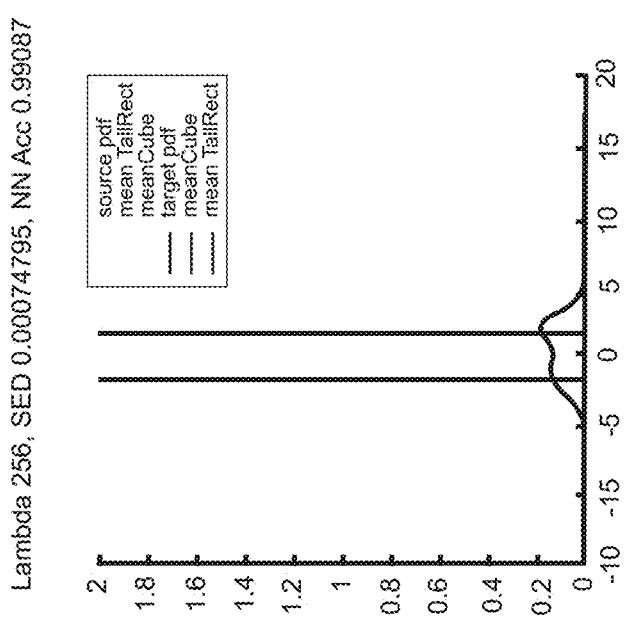
FIG. 18B illustrates a graphical representation of the TrFLDA results for $\lambda=256$ for the validation experiment when shapes are inverted, according to one or more embodiments.

The experiment was also repeated with the order of the shapes reversed: source data is the cube and the tall box, target data is the tall box and the cube. The results proved invariant to order. The best alignment occurs at the value of 256 for $\lambda$. These results are illustrated in FIG. 17A and FIG. 18B. FIG. 18A illustrates a graphical representation for the TrFLDA results for $\lambda=256$ for the validation experiment. FIG. 18B illustrates the TrFLDA results for $\lambda=256$ for the validation experiment when shapes are inverted. As a baseline the original 45 dimensional diffusion maps were classified using Weka and the kNN algorithm. This results in a 50% correct classification accuracy with a Kappa Statistic of 0.

Figure 19:
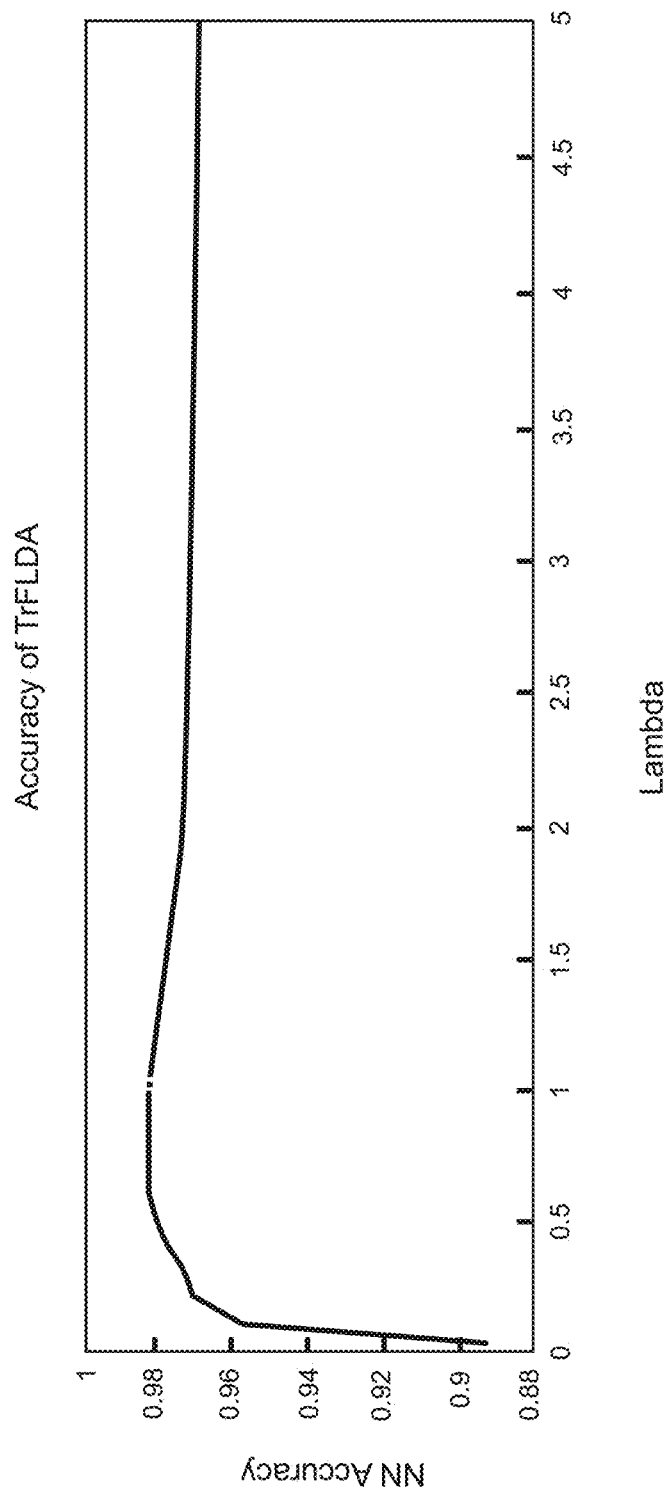
FIG. 19 illustrates a graphical representation for nearest neighbors accuracy for the first experiment where the source data is the cube and the tall box while the target data is the sphere and the tall box, according to one or more embodiments.

The second experiment employed the cube and tall box as source data and the sphere and the tall box as target data. Here one expects that the sphere should align with the cube and the tall box should align with the tall box. The results show that the objects do align in this manner. Using the closest point to the mean of the classes, the best k-nearest-neighbors (kNN) accuracy was achieved at $\lambda=0.001$ at 67.12%. The results for the kNN employing randomly selected points can be seen in FIG. 19. FIG. 19 illustrates a graphical representation for nearest neighbors accuracy for the first experiment where the source data is the cube and the tall box while the target data is the sphere and the tall box. These results demonstrate that the best kNN (k=1) accuracy is achieved for values of $\lambda$ ranging from 0.6 to 1 at 98.17% CCR.

Figure 20A:
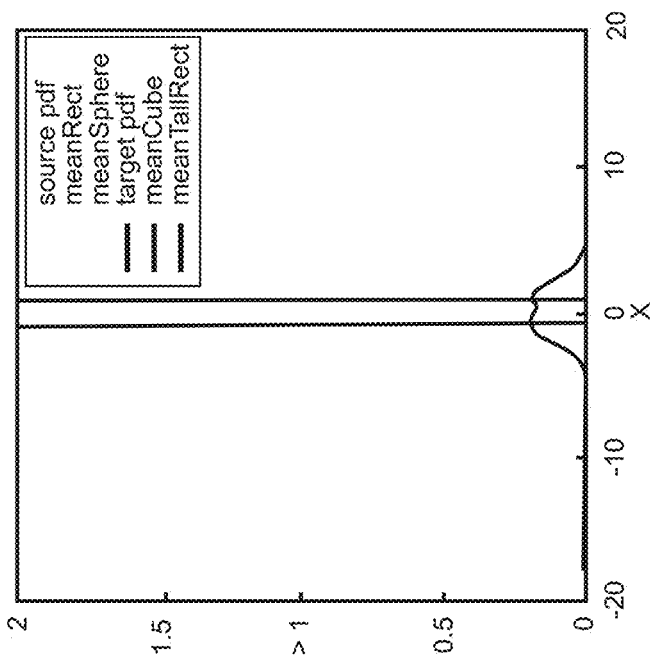
FIG. 20A illustrates a graphical representation for the TrFLDA results for $\lambda=2$ for the cross-domain experiment, according to one or more embodiments.
Figure 20B:
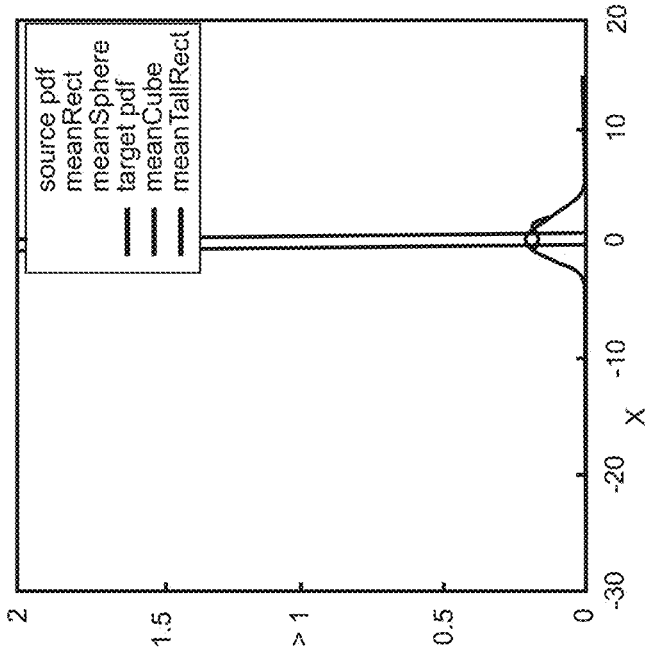
FIG. 20B illustrates a graphical representation for the TrFLDA results for $\lambda=512$ for the cross-domain experiment, according to one or more embodiments.
Figures 21A, 21B:
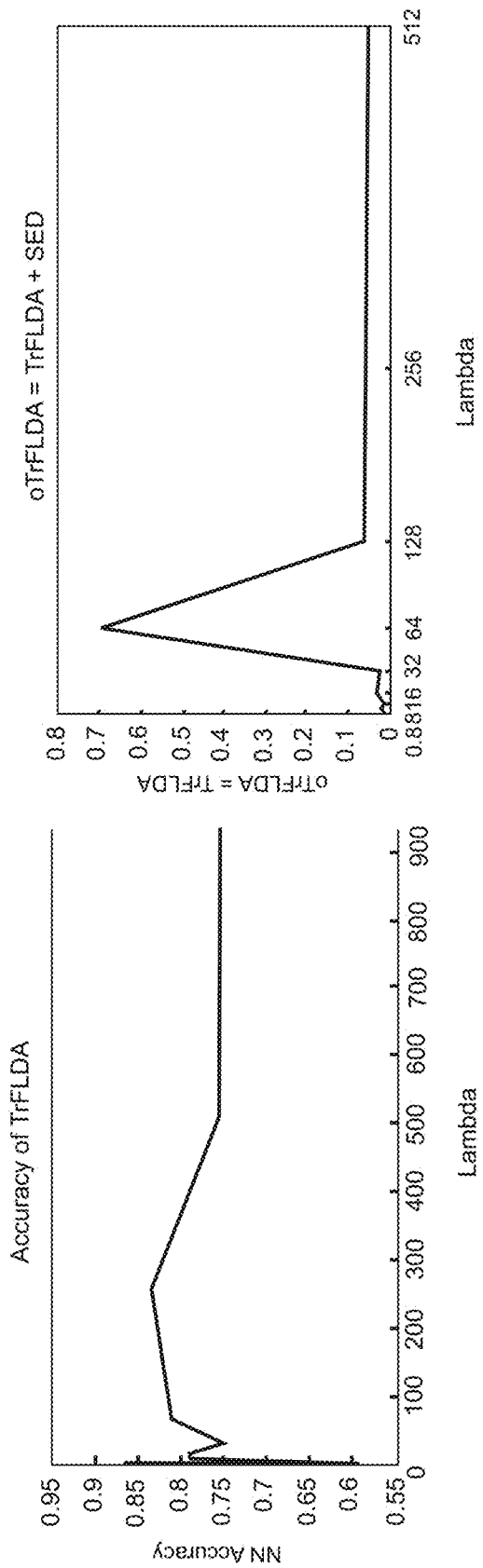
FIG. 21A illustrates a graphical representation for the KNN accuracy for the cross-domain experiment, according to one or more embodiments.
FIG. 21B illustrates a graphical representation for the objective function TrFLDA results for the cross-domain experiment, according to one or more embodiments.
Figure 22A:
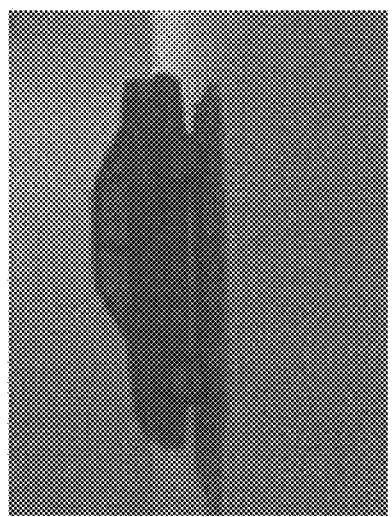
FIG. 22A D illustrate perspective example images from the Toyota Avalon swath used in the study.
Figure 22B:
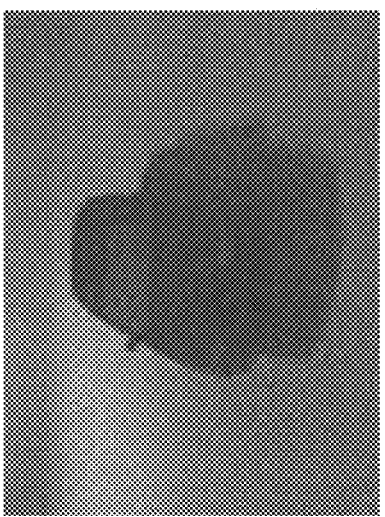
Figure 22C:
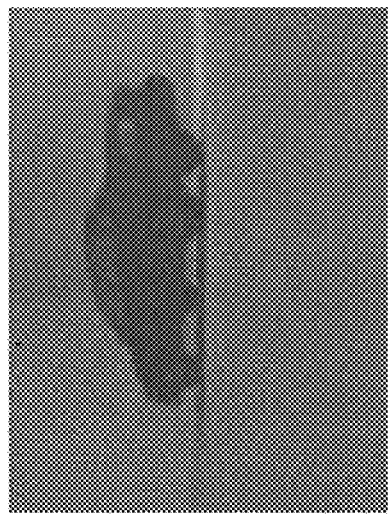
Figure 22D:
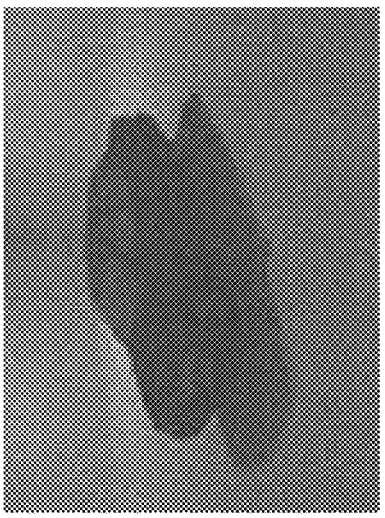

Cross-domain shape recognition: The third experiment examines cross-domain transfer learning and employs the box and sphere as the source data and the cube and the tall box as the target data. The goal here is to classify samples of the cube and tall box given only samples from the box and sphere. For values of $\lambda$ greater than 32 the cube aligned with box and the tall box aligned with the sphere. For smaller values of $\lambda$ the alignment is either unclear or reversed. The graphs of the distributional alignment can be seen in FIG. 20 (a) along with the kNN (k=1) CCR accuracy in FIG. 21 (a). Note that for the large value of $\lambda$ in FIG. 21 (a) distributional alignment is large but not so much for smaller $\lambda$ in FIG. 21 (a). Given the average RMSE calculations in TABLE 4 we expect the tall box to align with the box ($3.37\times10^{-2}$) rather than the sphere ($4.91\times10^{-2}$). Given the alignment for the tall box, we would expect the cube to then align with the sphere. However, if we consider the results from the diffusion maps and look at the Hausdorff Distances show in TABLE 11 we would expect the cube to align with the box (11.20) and the tall box to align with the sphere (14.72). Lastly, if we consider the modified Hausdorff Distance from TABLE 12 we again confirm the expectation from the Hausdorff Distances which is the expectation that the cube to align with box (6.00) and the tall box would align with the sphere (8.29). This suggests the Hausdorff distance may be a better indicator of alignment than RMSE for this dataset. The results of these experiment validate both the diffusion map and TrFLDA implementation.

Electro-optical synthetic civilian vehicle data domes (EO-SCVDD): In this section, diffusion maps and TrFLDA are applied to the EO-SCVDD database. The data used in the experiments are from three different camera positions entitled Lighting Condition (LC) One, Nine, and 10 henceforth referred to as LC-1, LC-9, and LC-10. Data from LC-1, at coordinates (14.142, 14.142, 21), are used as source domain data while data from LC-9 (12.247, 12.247, 31) and LC-10 (0, 17.321, 31) are employed as target domain data. The Toyota Avalon and the Nissan Sentra data are utilized for cross-dataset experiments while the Toyota Avalon, Nissan Sentra, and the Mitsubishi Lancer data are utilized for cross-domain experiments.

Diffusion maps are created for the different LCs using a swath of the EO synthetic vehicle data domes data. Recognition rates for the full data dome are near 50% which is unacceptable as a baseline for a transfer learning study. The data swath of azimuth 141°-261° and elevation 0°-36° is utilized for all experiments resulting in a dataset of 533 images. Example images are shown in FIG. 22. Note the large variability in the poses and shadow in the swath. To quantify the difference between image swaths for the three different lighting conditions used in this study we utilize the average RMSE and give the results in TABLE 13.

TABLE 13 provides Average Root Mean Squared Error (RMSE) In Pixel Intensity Between Source and Target Datasets:

TABLE 13

| Source | Target | Average RMSE |
|---|---|---|
| Avalon LC-1 | Avalon LC-9 | $3.87 \times 10^{-2}$ |
| Sentra LC-1 | Sentra LC-9 | $3.51 \times 10^{-2}$ |
| Avalon LC-1 | Avalon LC-10 | $5.79 \times 10^{-2}$ |
| Sentra LC-1 | Sentra LC-10 | $5.44 \times 10^{-2}$ |
| Sentra LC-1 | Lancer LC-1 | $7.24 \times 10^{-2}$ |

Figure 23A:
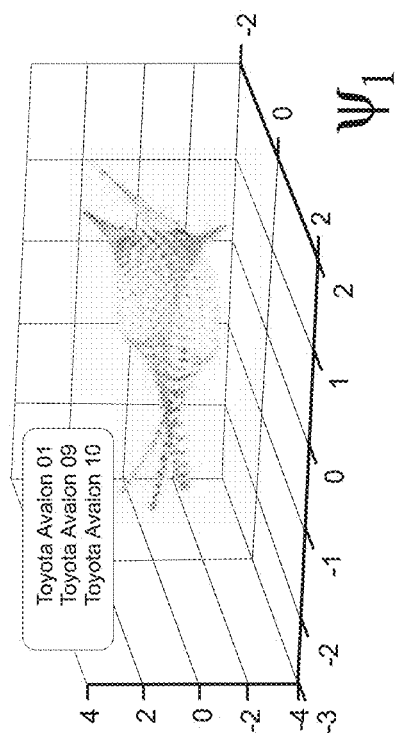
FIG. 23A illustrates a graphical representation for diffusion maps for the Toyota Avalon and Nissan Sentra in three different lighting conditions.
Figure 23B:
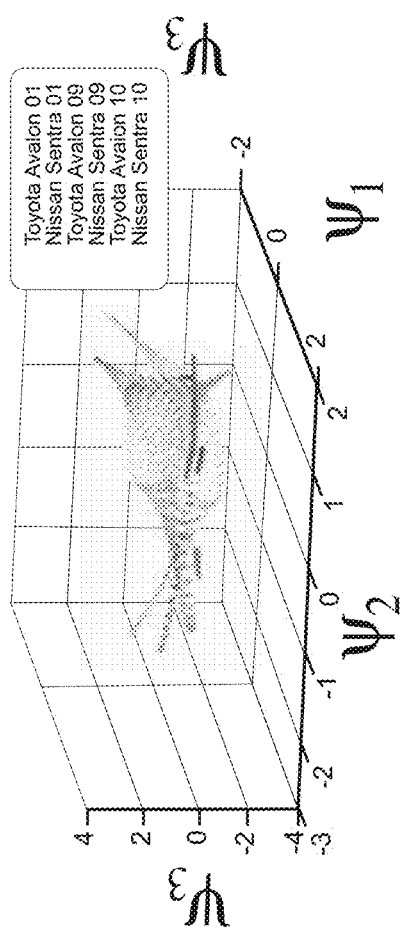
FIG. 23B illustrates a graphical representation for diffusion maps for the Toyota Avalon in three different lighting conditions.
Figure 23C:
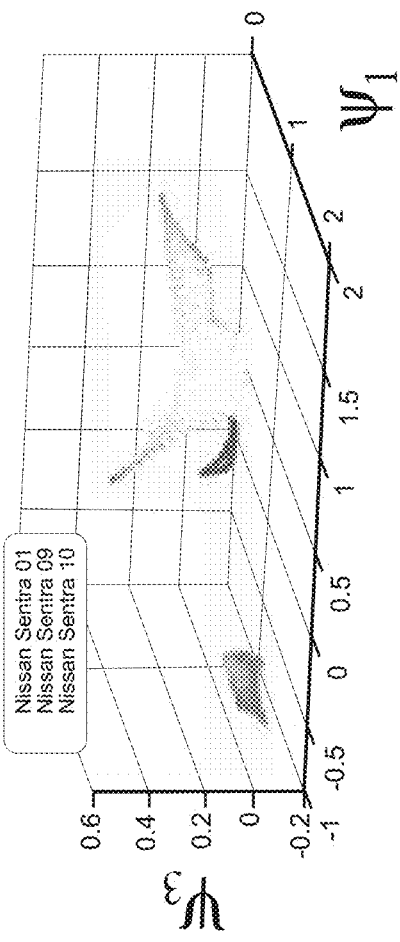
FIG. 23C illustrates a graphical representation for diffusion maps for the Nissan Sentra in three different lighting conditions.

The first three dimensions of the diffusion maps for LC-1, LC-9, and LC-10 are given in FIG. 23. Note the diffusion maps for LC-1 and LC-10 are closer in shape than the diffusion maps for LC-1 and LC-9. Although FIG. 23 displays only the first three dimension, the data from all the dimension of the diffusion maps is input to the Transfer Learning process. The diffusion maps are well-behaved in the sense that the first few dimensions can be easily explained by noting that the minor axes of the manifolds correspond to the elevation angle while the major axes of the manifold correspond to the azimuth angle.

Cross-dataset vehicle recognition: For the cross-dataset vehicle recognition experiment the tuning parameters consistent with our previous work occur when the kernel width parameter, σ, is set to seven and the diffusion time parameter t is set to one. For the number of dimensions we selected M as 45 to be able to compare our results to the previous work which identified M=45 as having the highest classification rates.

Figure 24B:
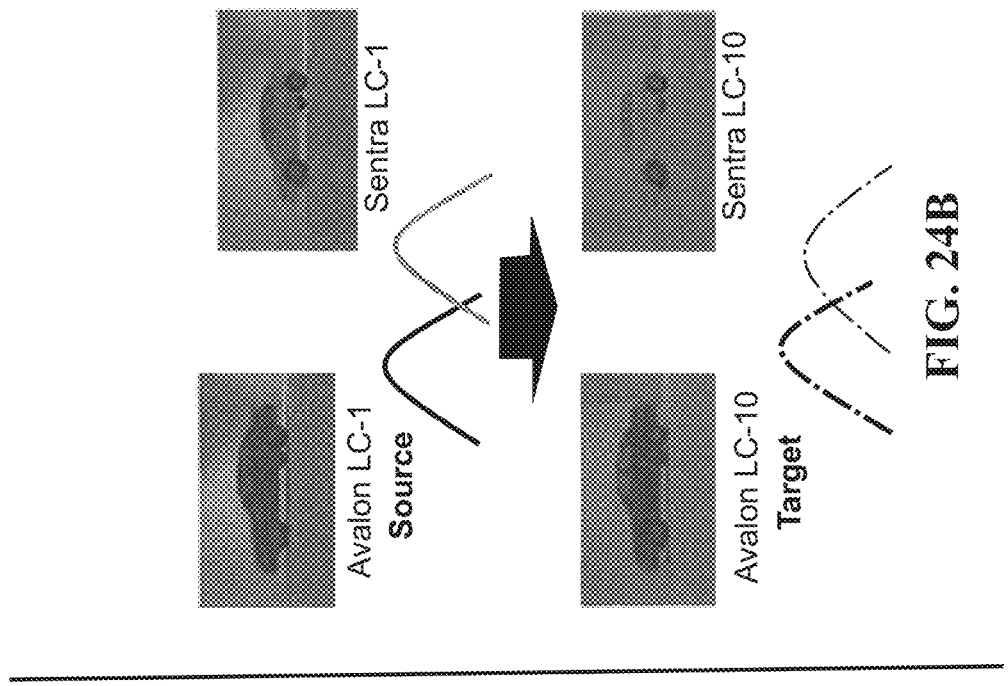
FIG. 24B illustrates a conceptual flow chart for cross-dataset experiments TrFLDA for Avalon and Sentra from LC-1 to LC-10 with solid lines indicating notional probability distribution functions (PDFs) for source data and dashed lines indicating notional PDFs for target data.
Figure 24A:
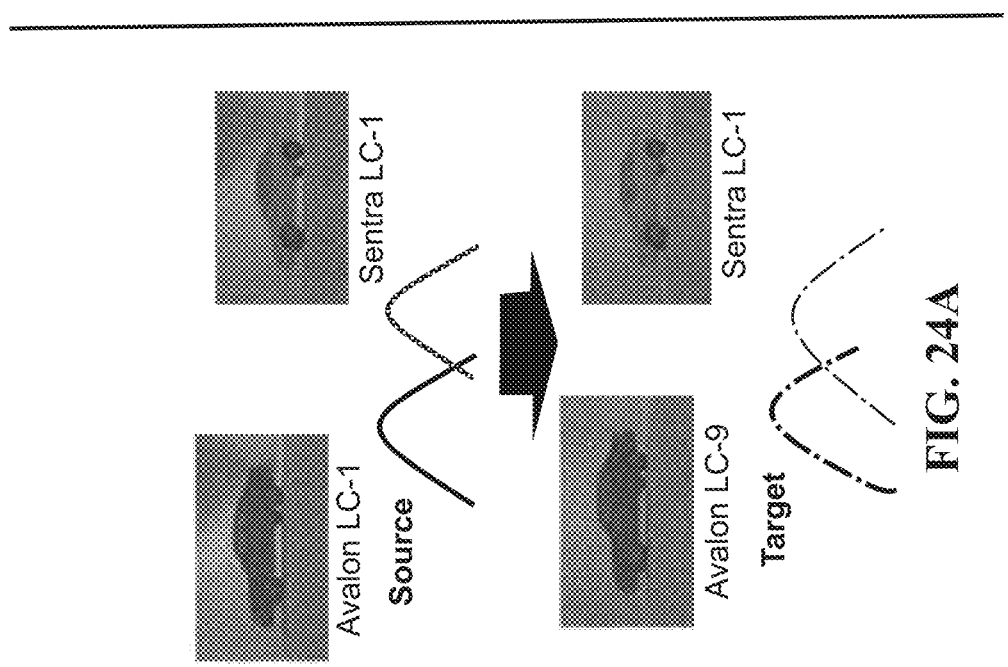
FIG. 24A illustrates a conceptual flow chart for cross-dataset experiments TrFLDA for Avalon and Sentra from LC-1 to LC-9 with solid lines indicating notional probability distribution functions (PDFs) for source data and dashed lines indicating notional PDFs for target data.

The first experiment investigates the performance of TrFLDA for cross-dataset vehicle recognition. We seek high recognition rates of a Toyota Avalon and a Nissan Sentra under different lighting conditions. The source domain is LC-1 and the target domain is LC-9. The TrFLDA assumption is satisfied, as the number of samples (533) is greater than the number of dimensions (45) plus the number of classes (2). A flow diagram for the cross-dataset experiments is depicted in FIG. 24.

The baseline recognition rate for this experiment is 57.04% realized using FLDA on the source data, training the reference points, and then using the reference points to classify the target data. In this experiment since the labels are the same for both source and target domains, another baseline is calculated by utilizing the K-nearest neighbors classifier and training with LC-1 and testing with LC-9. Using k=1 the KNN results in a recognition rate of 75.7036% correctly classified instances, 167 missed Avalons, 92 missed Sentras, and a 0.5141 Kappa Statistica measure of how much better the classification is over random chance. TrFLDA results are compared to these baseline results. Recognition rates, the regularization term (i), and the convergence iteration number for which the optimization converges for TrFLDA are given in TABLE 14. For all three experiments described in Section 7.1.1, the number of maximum iterations (K) was set at 2000, the learning rate (η) was set at 0.05, and the threshold (h) was set at 0.00001. At each iteration, the recognition rate is calculated using the resulting projection and the kNN (k=1) classifier. An exhaustive search was utilized for λ values ranging from [0.00-1.00] at two decimal point increments. The best recognition rate of 74.2026% were found for values of λ varying from [0.2-0.3]. A selection of the results is shown in TABLE 14.

TABLE 14 provides Transfer Fisher's Linear Discriminative Analysis (TrFLDA) Results for Toyota Avalon and Nissan Sentra in LC-1 and LC-9:

TABLE 14

| λ | Convergence Iteration | Classification Rate |
|---|---|---|
| 0 | 4 | 57.04% |
| 0.1 | 112 | 74.02% |
| 0.2 | 88 | 74.20% |
| 0.3 | 78 | 74.20% |
| 0.4 | 69 | 74.20% |
| 0.5 | 62 | 74.11% |
| 0.6 | 57 | 74.11% |
| 0.7 | 52 | 74.11% |
| 0.8 | 48 | 74.11% |
| 0.9 | 45 | 74.11% |
| 1 | 42 | 74.11% |
| ... | ... | ... |
| 0.21 | 87 | 74.20% |
| 0.22 | 86 | 74.20% |
| 0.23 | 85 | 74.20% |
| 0.24 | 84 | 74.20% |
| 0.25 | 83 | 74.20% |
| 0.26 | 82 | 74.20% |
| 0.27 | 80 | 74.20% |
| 0.28 | 79 | 74.20% |
| 0.29 | 79 | 74.20% |

The second experiment is similar to the first, but the source domain is LC-1 and the target domain is LC-10. The baseline for this experiment is a recognition rate of 93.996% realized using FLDA on the source data, training the reference points, then using the reference points to train the target data. Again, since the classes for the source and target domain are the same an additional baseline outside the transfer learning paradigm is calculated. That baseline performance for this experiment using KNN (k=1) results in a recognition rate of 94.65% correctly classified instances, 0.89 kappa statistic, 57 missed Avalons, 0 missed Sentras. TrFLDA recognition rates, the regularization term (λ), and the convergence iteration number for which the optimization converges are given in TABLE 15. An exhaustive search was utilized for λ values ranging from [0.000-1.000] at three decimal point increments. The best recognition rate of 96.34% was found for the value of λ of 0.01. A selection of the results is shown in TABLE 15.

Cross-domain vehicle recognition: The third experiment is a cross-domain experiment using diffusion maps and TrFLDA as in the cross-dataset experiments in Section 7.1.2. The source domain is the Toyota Avalon and the Nissan Sentra under LC-1 and the target domain is the Toyota Avalon and Mitsubishi Lancer also under LC-1. The baseline for this experiment is a recognition rate of 50% realized using FLDA on the source data, training the reference points, then using the reference points to train the target data. Since the classes for the source and target domains differ, a baseline recognition rate outside the transfer learning paradigm cannot be calculated unlike the first two experiments. The regularization term, λ, the number of iterations it took to converge, and TrFLDA recognition rates are given in TABLE 16. An exhaustive search was utilized for λ values ranging from [0.0-1.0] at one decimal point increments. Given those results λ values of 0.85 and 0.95 were also explored. The best recognition rate of 65.1% was found for values of λ at 0.9 and 0.95. This recognition rate greatly outperforms the baseline by 15.1%. Future efforts will continue the exhaustive search and explore more efficient search methods to determine the optimal setting for λ.

The results indicate that the Transfer Subspace Learning (TSL) techniques are sensitive to tuning parameters. The modification we propose to the implementation of Transfer Fishers Linear Discriminative Analysis (TrFLDA) in Section 3.2.1 proves to be an improvement since the search space for $\lambda$ is now bounded where $\lambda \in [0, 1]$. Note that there is not a guarantee that the search spaces for $\lambda$ and $\eta$ are convex respectively so in certain applications an exhaustive search of the space would be necessary. A study examining alternatives for these tuning parameters is a good candidate for future research.

For all three experiments the recognition rates using TrFLDA outperforms the baseline recognition rates using FLDA. Similarly, for the cross-dataset experiments the recognition rates using TrFLDA either outperform or match the recognition rates using KNN. In the case where TrFLDA doesnt outperform, for real-world applications TrFLDA would be preferred to KNN since the TrFLDA method only requires one labeled sample per class.

Labeling data for use in recognition algorithms is expensive and manually intensive. A technique with one labeled instance per class that is capable of matching the performance of a technique where all instances are labeled is a significant contribution towards a robust and sustainable Aided Target Recognition (AiTR) system.

The combination of TrFLDA with diffusion maps proved to be useful. One of the immediate benefits of the diffusion maps is first evident in the experimental design. Notice how large the data swath is—the swath covers a span of 120 degrees in azimuth and 39 degrees in elevation. FIG. 22 displays four static images to help gain an appreciation for the variability in shadow and pose encompassed in the data swath. It is difficult to find a reference to other recognition systems that can handle such a diversity of target pose and still result in high recognition rates. As a comparison the original TrFLDA study utilized faces that varied in pose by 90 degrees in azimuth and zero degrees in elevation. Another benefit to the combination is the ability to explain the performance of TrFLDA based on the shape and scale of the diffusion maps. If the raw pixels were only considered then based on TABLE 13 a valid prediction would be that TrFLDA recognition rates would be higher for LC-1 and LC-9 than for LC-1 and LC-10. This is because LC-1 and LC-9 have a smaller difference in their RMSE measures and may be considered more similar. However, the opposite result is observed as shown in TABLE 14 and TABLE 15—the TrFLDA recognition rates for LC-1 and LC-10 outperform the recognition rates for LC-1 and LC-9. This result is consistent with the visual inspection of the manifolds shown in FIG. 23 and the calculations of the Hausdorff Distance and Modified Hausdorff Distances show in TABLE 17 and TABLE 18, respectively. The diffusion map for LC-1 and LC-10 are actually closer in shape and proximity than the diffusion maps for LC-1 and LC-9. Based on the diffusion maps LC-1 and LC-10 are actually more similar than LC-1 and LC-9. Exploiting this observation and assessing its repeatability in other cross-dataset and cross-domain scenarios is the focus of the next stage of this research. The results explained in this Section confirm the efficacy of both the diffusion map method and the TrFLDA method.

Performance of MTSL and TrDM: In this section, the recognition performance of MTSL and TrDM are compared to the TrFLDA baseline technique. The three algorithms are applied to seven datasets—EO-SCVDD, MNIST Handwritten Digits, gene expressions, and Comanche IR data. The databases include a diversity of: 1) modality type (EO, IR, and gene expressions), 2) object type (human and vehicles), and 3) data type (synthetic and measured). These databases were selected to provide a broad spectrum and evaluate how MTSL and TRDM perform as compared to TrFLDA.

Figure 25:
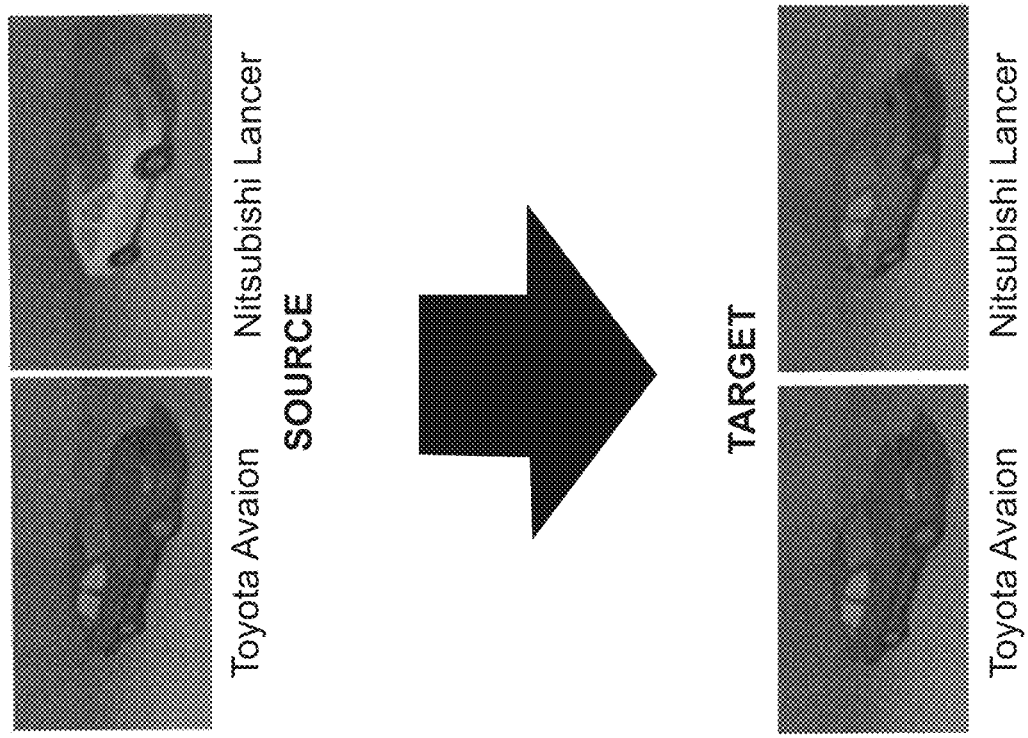
FIG. 25 illustrate a graphical depiction of an experimental setup for the partial cross-domain experiment using the Air Force electro-optical (EO) Vehicle Data Domes.

(Electro-optical synthetic civilian vehicle data domes (EO-SCVDD): In Section 7.2.1 experiments were conducted utilizing the Electro-optical synthetic vehicle data domes (EO-SVDD) to verify the efficacy of TrFLDA. In this section, the partial cross-domain experiment is reexamined with the new MTSL and TrDM techniques. Recall this transfer challenge includes the source classification problem of Toyota Avalon vs. Nissan Sentra and the target classification problem of Toyota Avalon vs. Mitsubishi Lancer. Since the Avalon is in both the source and target domains, this problem is considered a partial cross-domain transfer challenge. The flow chart for this experiment is shown in FIG. 25.

Recall that there are 533 samples of each vehicle and the images are 160×213 for a total of 34080 dimensions. The average RMSE between the different datasets for this experiment are 0, 15.78, 18.46, and 22.32, for Avalon-Avalon, Sentra-Lancer, Avalon-Lancer and Sentra-Avalon, respectively. Notice that based on the RMSE values, the Avalon should align with the Avalon and the Sentra with the Lancer. The 10-fold cross-validation technique was utilized for training on the source data. The parameters for the diffusion map process results in $\sigma=3$, $d=4$, and $t=1$.

The CCR for the partial cross-domain experiment using the TrFLDA method is 65.1% and the 1-labeled kNN (k=1) results in a 57.9% CCR. Both of the new transfer techniques surpass those CCRs, with TrDM at 96.5% and MTSL at 92.9% as shown in TABLE 20. Both results using the TrFLDA are worse than the original results but that may be due to the 10 validation trials since the random subsets add additional statistical variance. In regards to total transfer learning boost, the MTSL method outperforms the others but again the transfer boost only helps to move MTSL into the same CCR performance as the other techniques. For these results, the average correct classification rates are within ±1% of the true average with a confidence level of 99%.

The second experiment performed on the Synthetic vehicle data domes is a full cross-domain transfer challenge. Here the source classification problem is a Nissan Sentra vs. a Nissan Maxima and the target classification problem is a Mitsubishi Lancer vs. a Toyota Avalon. These vehicles were specifically selected since both the source and target domain each have a smaller and larger vehicle as their classes. Each vehicle has a total of 533 samples. The average RMSE for the pair-wise combinations of sample domains are 9.81, 14.93, 18.46, and 22.32 pixels for Sentra-Lancer, Maxima-Avalon, Sentra-Avalon, and Maxima-Lancer, respectively. These RMSE results make intuitive sense since the Sentra and Lancer are smaller vehicles than the Maxima and Avalon; hence it makes sense that the smaller vehicles align while the larger vehicles align.

The results of this experiment are shown in TABLE 22. Note how well the new transfer learning techniques performed in this experiment. Employing both the TrDM and the MTSL technique results in an average CCR of 90.1%. Note that in regards to transfer learning performance the MTSL outperforms all the other techniques at a 32.6% CCR transfer boost. For these results, the average correct classification rates are within ±1% of the true average with a confidence level of 99%.

In Section 7.1 several experiments were performed utilizing the Electro-optical synthetic vehicle data domes to determine the efficacy of traditional transfer challenge algorithms. In this section, part of those experiments are redone utilizing the newly developed transfer learning algorithms developed in the present disclosure. The partial cross-domain experiment in particular is redone. Recall that for that experiment, the transfer challenge includes the source classification problem of Toyota Avalon vs. Nissan Sentra and the target classification problem is Toyota Avalon vs. Mitsubishi Lancer. Since the Avalon is in both the source and target domains, this problem is considered a partial cross-domain transfer challenge. Recall that there are 533 samples of each vehicle and the images are 160×213 for a total of 34,080 dimensions. The average RMSEs between the different datasets for this experiment are 0, 15.78, 18.46, and 22.32 pixels. As reminder, recall that they are not identified pair-wise here since the assumption is only the source data is labeled hence we don't know which class in the source domain is aligning to which class in the target domain. Again, the 10-fold cross-validation technique was utilized for training on the source data. The parameters for the diffusion map process resulted in an $\sigma=30.5$, 4 dimensions, and $\alpha=1$.

In the Initial Results Section 7.1.2, the CCR for the partial cross-domain experiment using the TrFLDA method is 65.1% and the 1-labeled kNN (k=1) results in a 57.9% CCR. Both MTSL and TrDM surpass those CCRs, with TrDM resulting in 96.5% and MTSL in 92.9% as shown in TABLE 21. Both results using the TrFLDA are worse than the original results but that may be due to the 10 validation trials since the random subsets do add additional statistical variance. In regards to transfer learning performance, the MTSL method outperforms the others but again the transfer boost only helps to move MTSL into the same CCR performance as the other techniques. For these results, the average correct classification rates are within ±1% of the true average with a confidence level of 99%.

The next experiment performed on the Synthetic vehicle data domes is a full cross-domain transfer challenge. Here the source classification problem is a Nissan Sentra vs. a Nissan Maxima and the target classification problem is a Mitsubishi Lancer vs. a Toyota Avalon. These vehicles were specifically selected since both the source and target domain each have a smaller and larger vehicle as their classes. Each vehicle has a total of 533 samples.

The results of this experiment are shown in TABLE 22. Note how well the new transfer learning techniques perform in this experiment. Both the TrDM and MTSL algorithms outperform the other two techniques and results in a CCR of 90.1%. In regards to transfer learning performance the MTSL outperforms all the other techniques at a 32.6% CCR boost. Although the TrDM algorithm results in a high target CCR as a transfer technique it failed since the maximum was found at $\lambda=0$; meaning there wasn't any transfer involved in the process. For these results, the average correct classification rates are within ±1% of the true average with a confidence level of 99%.

MNIST Handwritten Digits: In Section 6.1, we describe the MNIST database in detail. For our transfer challenge the source classification domain is the handwritten digits nine and three and the target classification domain is handwritten digits four and five. The source classification domain is fully labeled while the target classification domain contains only one labeled sample per class. The challenge is to transfer an appropriate subspace from the source classification domain to the target classification domain. Confusion between a handwritten nine and a handwritten three has been observed to be minimal. The confusion of a handwritten three to a handwritten nine is 0% and the percent confusion of a handwritten nine to a handwritten three is 2%. Hence the source classification problem should provide good performance from which to transfer to the target domain. Likewise, the target classification problem also provides good performance with 0% confusion between a handwritten four and a handwritten five and 0.01% confusion between a handwritten five and a handwritten four.

This first transfer learning problem is an example of a cross-domain challenge. The entities are all handwritten digits but they are different digits. For this dataset a cross-operating conditions challenge could also be constructed. In this particular dataset the metadata includes whether the handwritten digits were written by students or professionals. We investigated transfer problems of the same digits in the source and target domain but where the source and target domains differed by student vs. professional. Those problems proved trivial so we increased the complexity by moving to cross-domain challenges.

In the first cross-domain challenge the source domain is a handwritten digit nine vs. a handwritten digit three while the target domain is a handwritten digit four vs. a handwritten digit five. For the source domain there are 370 samples of a nine and 371 samples of a three for a total of 741 samples. For the source domain there are 370 samples of a four and 371 samples of a five for a total of 741 samples. Recall the source database is assumed to be fully labeled while the target database has one labeled sample per class. The dimensionality of each image is 28×28 for a total of 784 dimensions. To gain an understanding of the difference between the source and target databases, the average RMSE is computed for each of the four possible combinations of classes. Based on TABLE 23 the expectation for the handwritten digits is that the Four align with the Nine and the Three align with the Five. The initial step to the process is to determine the diffusion map parameters which were determined as $\sigma=15$, $d=3$, and $t=1$. The 10-fold cross-validation process was utilized on the source domain.

The experiments are completed 10 times to add statistical variation. The results of the baseline techniques are shown below in TABLE 24. The 1-labeled kNN (k=1) CCR baseline for the target domain is 74.3%. Furthermore, the CCR on the raw data for the original TrFLDA implementation is 51.1% on the source domain, 51.3% on the Target domain, and 51.1% on the target domain with zero transfer. Utilizing the original implementation of TrFLDA does produce a slight transfer boost of 2%. The results utilizing the TrFLDA Enhanced method surpass the results utilizing the original implementation, at 99.6% for the source CCR, 71.1% for the target CCR, and 71.1% for the target domain with zero transfer. Hence the classification results utilizing the enhanced technique outperform the results using the original implementation but the enhanced technique does not utilize any transfer.

The transfer learning results are shown below in TABLE 25 notice the source CCR are all greater than 90%. Both MTSL and the original implementation of TrFLDA with the diffusion map as the input perform at the 92% level In regards to transfer performance TrDM outperforms all the other techniques at 18.2% transfer boost. However in this experiment the boost is simply elevating TrDM to perform as well as the other techniques. The average correct classification rates are within ±1% of the true average with a confidence level of 99%.

This is our most complete experiment which includes results for both of the diffusion map methods. Recall from Section 5.3 that there are two different methods for constructing the diffusion map—the merge method and the Out-of-Sample Extension (OSE) method.

The merge method is usually the best preforming and assumes that both source and target databases are available prior to transfer learning. The diffusion map is constructed for all objects in the source domain and all the objects in the target domain simultaneously. The second approach utilizes the OSE and is the most realistic approach since it doesn't rely on the source and target to coexist at the same time. The OSE method is best for situations where the target database is constructed on the fly, and so the instances need to adapt into the source diffusion map real-time.

Figure 26B:
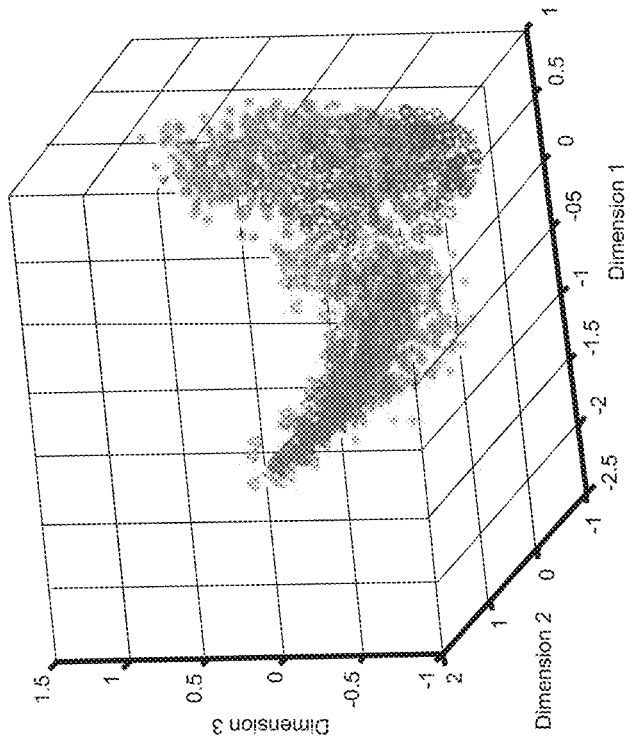
FIG. 26B illustrates a three-dimensional diffusion map for Modified National Institute of Standards and Technology (MNIST) data.
Figure 26A:
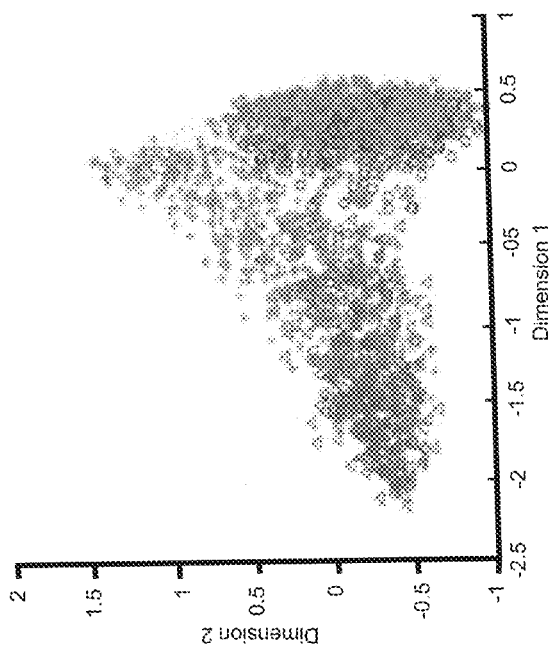
FIG. 26A illustrates a two-dimensional diffusion map for Modified National Institute of Standards and Technology (MNIST) data.

The first three dimensions of the diffusion map for this experiment is shown in FIG. 26. For this experiment the RMSE is indicative of the alignment achieved in the transfer process, the handwritten digits align as expected with the nine aligning to the four and three aligning with the five.

Figure 27:
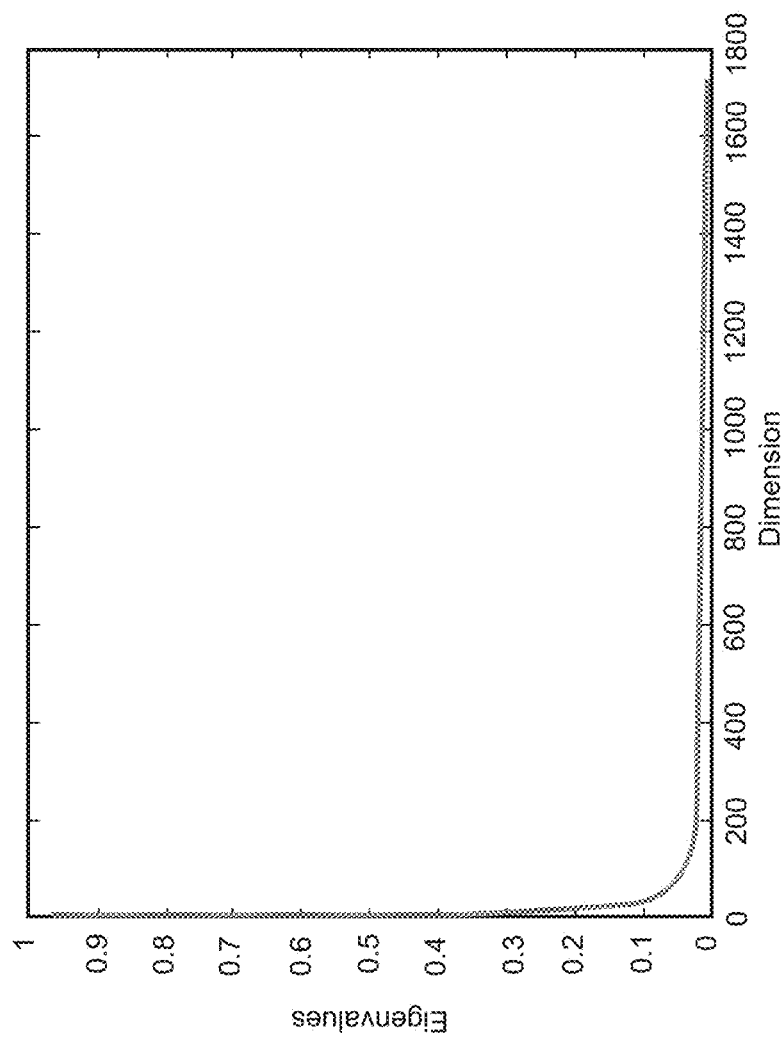
FIG. 27 illustrates a graphical plot of dimensionality versus Eigenvalues for the MNIST Data in graphical format.

To gain an understanding of what it means for the parameter strategy to select three dimensions, the associated eigenvalues are shown in FIG. 27. For the diffusion map method the first eigenvalue is always unused since it is always equal to one. The eigenvalues are related to the variation in the data explained by the different dimensions. The value of $1-\lambda_i$, where $\lambda_i$ is the ith eigenvalue approximately explains that amount of variation in the data captured by the ith dimension. For example the first eigenvalue is 0.664, which can be interrupted as dimension one explaining approximately 1−0.664=0.336 or 33.6 percent of the variation. Similarly, the eigenvalue for dimension two is 0.463, which can be interpreted as the top two dimensions explain approximately 53.7% of the variation or the second dimension explaining an additional 53.7−33.6=20.1 percent of the variation.

In a similar manner the first three dimensions explain approximately 1−0.30 0.620 percent of the variation which means the third dimension adds only 8.3% more. Analyzing the eigenvalues helps to understand why the diffusion maps strategy only requires three dimensions to separate the data.

For the next experiment, random subsamples of the target database were created with 97% of the original database for TrDM and MTSL. The previous experiments were repeated eight times and the average CCRs are reported in the TABLE 27 below.

Both of the techniques developed in the present disclosure outperform the traditional techniques for both CCR and transfer boost. The variability in is small which is promising since it will lead to a smaller search space for real-world applications.

Figure 28:
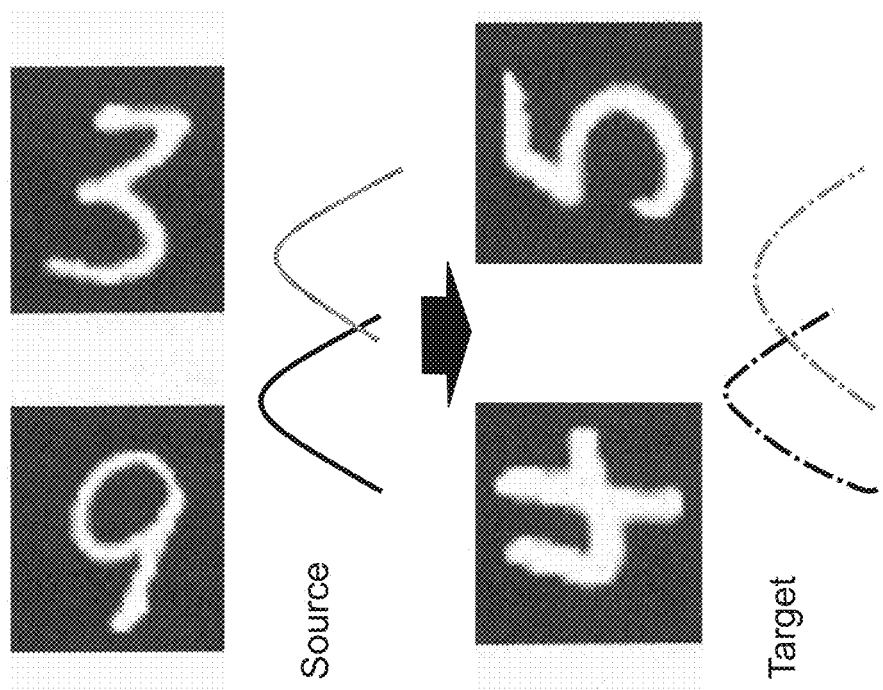
FIG. 28 illustrates a graphical depiction of handwritten digits 9 and 3 rotated by 90° and handwritten digits 4 and 5 with cartoons of the distributions as a gentle reminder that for Transfer Subspace Learning (TSL), PDFs of the data are utilized rather than the raw pixel data.

MNIST Handwritten Digits Rotated 90:° To increase the complexity of the transfer challenge, the source database is rotated by 90° and the target database is unchanged. The approach is to repeat the experiments of the previous section. The expectation is that CCRs will decrease but it is important to understand that degradation. In this experiment the source classification problem is the recognition between a rotated handwritten digit nine and a handwritten digit three and the target classification problem is the recognition between a handwritten digit four and five. The average RMSE between the four classes are shown in TABLE 7. Notice that the average RMSE increased from the previous experiment but the distributions should still align similarly; that is, the Rotated Nine with the Four and the Rotated Three with the Five. Samples of the images are shown in FIG. 28.

For this experiment the 1-labeled kNN (k=1) baseline CCR for the target classification problem is 74.3%. The CCR for the raw data for the target classification problem is 71.3% and 51.0% for the TrFLDA Enhanced and TrFLDA methods respectively.

The results for the Transfer Learning technique are shown below in TABLE 28. Both MTSL and TrDM outperform the traditional techniques. The results utilizing the MTSL approach is particularly impressive at 99.1%. Instead of degrading the target domain CCR improved for all techniques except for the original implementation of TrFLDA. It is impressive that when utilizing MTSL the target domain CCR increases by 7.1%. These results are significant with a 98% confidence level that the average CCR is within ±3% of the true CCR for TrDM and ±1% for MTSL. For TrFLDA are more confident with 99% confidence level that the average CCR is within ±1% of the true CCR.

The confusion matrix for the experiment, shown in TABLE 29 is interesting as it shows that the handwritten digit four is easier to recognize than the handwritten digit-five.

TABLE 15 provides Transfer Fisher's Linear Discriminative Analysis (TrFLDA) Results for Toyota Avalon and Nissan Sentra in LC-1 and LC-10:

TABLE 15

| $\lambda$ | Convergence Iteration | Classification Rate |
|---|---|---|
| 0 | 4 | 94.00% |
| 0.1 | 143 | 87.34% |
| 0.2 | 88 | 86.96% |
| 0.3 | 66 | 86.87% |
| 0.4 | 53 | 87.15% |
| 0.5 | 45 | 87.34% |
| 0.6 | 40 | 87.43% |
| 0.7 | 36 | 87.62% |
| 0.8 | 32 | 87.80% |
| 0.9 | 32 | 88.27% |
| 1 | 24 | 89.59% |
| ... | ... | ... |
| 0.01 | 147 | 96.34% |
| 0.02 | 258 | 94.37% |
| 0.03 | 266 | 90.34% |
| 0.04 | 241 | 88.84% |
| 0.05 | 216 | 88.18% |
| 0.06 | 196 | 87.71% |
| 0.07 | 179 | 87.71% |
| 0.08 | 165 | 87.62% |
| 0.09 | 153 | 87.34% |
| ... | ... | ... |
| 0.005 | 136 | 95.87% |
| 0.006 | 143 | 96.06% |
| 0.007 | 145 | 96.15% |
| 0.008 | 146 | 96.25% |
| 0.009 | 147 | 96.25% |
| ... | ... | ... |
| 0.011 | 149 | 96.25% |
| 0.012 | 152 | 96.06% |
| 0.013 | 158 | 95.87% |
| 0.014 | 168 | 95.78% |
| 0.015 | 182 | 95.59% |

TABLE 16 provides Transfer Fisher's Linear Discriminative Analysis (TrFLDA) Results for Source Data of Toyota Avalon and Nissan Sentra and Target Data of Toyota Avalon and Mitsubishi Lancer:

TABLE 16

| $\lambda$ | Convergence Iteration | Classification Rate |
|---|---|---|
| 0 | 4 | 50.00% |
| 0.1 | 251 | 61.73% |
| 0.2 | 306 | 64.53% |
| 0.3 | 247 | 64.63% |
| 0.4 | 205 | 64.54% |
| 0.5 | 176 | 64.92% |
| 0.6 | 155 | 64.82% |
| 0.7 | 138 | 64.92% |

TABLE 16-continued

| λ | Convergence Iteration | Classification Rate |
|---|---|---|
| 0.8 | 125 | 65.01% |
| 0.9 | 115 | 65.10% |
| 1 | 106 | 65.01% |
| ... | ... | ... |
| 0.85 | 120 | 65.01% |
| 0.95 | 110 | 65.10% |

TABLE 17 provides Hausdorff Distance for Vehicles:

TABLE 17

| Hausdorff Distance ($R^{45}$) | Hausdorff Distance ($R^3$) | Source | Target |
|---|---|---|---|
| 15.7227 | 2.4434 | LC01 Toyota Avalon | LC09 Toyota Avalon |
| 10.2022 | 2.4986 | LC01 Nissan Sentra | LC09 Nissan Sentra |
| 15.0741 | 1.1802 | LC01 Toyota Avalon | LC10 Toyota Avalon |
| 10.1777 | 1.1713 | LC01 Nissan Sentra | LC10 Nissan Sentra |

TABLE 18 provides Modified Hausdorff Distance for Vehicles:

TABLE 18

| Mod Hausdorff Distance ($R^{45}$) | Mod Hausdorff Distance ($R^3$) | Source | Target |
|---|---|---|---|
| 6.9804 | 1.0132 | LC01 Toyota Avalon | LC09 Toyota Avalon |
| 5.9523 | 1.6825 | LC01 Nissan Sentra | LC09 Nissan Sentra |
| 6.7870 | 0.5182 | LC01 Toyota Avalon | LC10 Toyota Avalon |
| 5.7648 | 0.6583 | LC01 Nissan Sentra | LC10 Nissan Sentra |

TABLE 19 provides experimental setup for the partial cross-domain experiment using the Air Force EO-SCVDD:

TABLE 19

| | Classification Problem | Samples |
|---|---|---|
| Source | Fully labeled database: | 533 |
| | Toyota Avalon vs. Nissan Sentra | 533 |
| | Total: | 1066 |
| Target | One labeled sample per class: | 533 |
| | Toyota Avalon vs. Mitsubishi Lancer | 533 |
| | Total: | 1066 |

TABLE 20 illustrates average percent accuracy of transfer learning classification methods over 10 validation trials utilizing the full original databases and the merge method for diffusion map (DM) construction; includes associated λ; EO-SVDD data results for partial cross-domain experiment:

TABLE 20

| Transfer Techniques | λ | λ range | Source CCR | Target CCR | No Transfer Baseline | Transfer Boost |
|---|---|---|---|---|---|---|
| TrDM | 0 | 0 | 100 | 96.5 | 96.5 | 0 |
| MTSL | 0.5 | 0.5 | 100 | 92.9 | 69.0 | 23.9 |
| DM→TrFLDA | 0.9 | 0.9 | 40.5 | 47.7 | 49.0 | −1.3 |
| DM→TrFLDA Original Implementation | 0.5 | N/A | 40.3 | 47.6 | 49.0 | −1.4 |

TABLE 21 illustrates EO-SCVDD—Average percent accuracy of transfer learning classification methods over 10 validation trials utilizing the full original databases and the merge method for diffusion map (DM) construction; includes associated λ:

TABLE 21

| Transfer Techniques | λ | λ range | Source CCR (Avg) | Target CCR (Avg) | No Transfer Baseline (Avg) | Transfer Boost (Avg) |
|---|---|---|---|---|---|---|
| TrDM | 0 | 0 | 100 | 96.5 | 96.5 | 0 |
| MTSL | 0.5 | 0.5 | 100 | 92.9 | 69.0 | 23.9 |
| DM→TrFLDA | 0.9 | 0.9 | 40.5 | 47.7 | 49.0 | −1.3 |
| DM→TrFLDA (Original) | 0.5 | N/A | 40.3 | 47.6 | 49.0 | −1.4 |

TABLE 22 provides EO-SCVDD—Average percent accuracy of transfer learning classification methods over 10 validation trials utilizing the full original databases and the merge method for diffusion map (DM) construction; includes associated

TABLE 22

| Transfer Techniques | λ | Source CCR (Avg) | Target CCR (Avg) | No Transfer Baseline (Avg) | Transfer Boost (Avg) |
|---|---|---|---|---|---|
| TrDM | 0 | 100 | 90.1 | 90.1 | 0 |
| MTSL | 0.49 | 100 | 90.1 | 57.5 | 32.6 |
| DM → TrFLDA | 0.035 | 64.4 | 53.2 | 53.3 | −0.1 |
| DM → TrFLDA (Original) | 0.5 | 63.9 | 53.1 | 53.3 | −0.2 |

TABLE 23 provides average RMSE between MNIST Handwritten Digits:

FIG. 23

| First Handwritten Digit | Second Handwritten Digit | Average RMSE |
|---|---|---|
| Nine | Four | 0.313 |
| Three | Five | 0.357 |
| Nine | Five | 0.364 |
| Three | Four | 0.388 |

TABLE 24 provides Correct Classification Rate (CCR) results using baseline techniques on MNIST data:

TABLE 24

| Baseline Techniques | λ | Source CCR | Target CCR | No Transfer Baseline | Transfer Boost |
|---|---|---|---|---|---|
| 1-Labeled (KNN) | — | — | 74.3 | — | — |
| Raw → TrFLDA Enhanced | 0 | 99.6 | 71.1 | 71.1 | 0 |
| Raw → TrFLDA | 0 | 51.1 | 51.3 | 51.1 | 0.2 |

TABLE 25 provides average correct classification rates results for transfer learning techniques on the MNIST data:

TABLE 25

| Transfer Techniques | λ | Source CCR | Target CCR | No Transfer Baseline | Transfer Boost |
|---|---|---|---|---|---|
| TrDM | 0.04 | 99.4 | 90.8 | 72.6 | 18.2 |
| MTSL | 0.70 | 98.3 | 92.0 | 91.7 | 0.3 |
| DM → TrFLDA | 0.1 | 95.0 | 88.8 | 87.2 | 1.6 |
| DM → TrFLDA Original Implementation | 0.5 | 94.8 | 92.4 | 87.2 | 5.2 |

TABLE 26 provides dimensionality versus Eigenvalues for the MNIST Data in tabular format:

TABLE 26

| Eigenvalue | Values | Eigenvalue | Values |
|---|---|---|---|
| 1 | 1 | 8 | 0.2667 |
| 2 | 0.664 | 9 | 0.2460 |
| 3 | 0.4633 | 10 | 0.2269 |
| 4 | 0.3799 | 11 | 0.2125 |
| 5 | 0.3528 | 12 | 0.2004 |
| 6 | 0.3280 | 13 | 0.1955 |
| 7 | 0.3132 | 14 | 0.1897 |

TABLE 27 provides MNIST Handwritten Digits: Average percent accuracy of transfer learning classification methods over eight validation trials utilizing 97% of the original database and the merge method for diffusion map construction; includes associated

TABLE 27

| Transfer Techniques | λ | λ Range | Source CCR | Target CCR | Baseline CCR | Transfer Boost |
|---|---|---|---|---|---|---|
| TrDM | 0.1 | [0-0.17] | 98.7 | 95.2 | 93.2 | 2 |
| MTSL | 0.48 | [0.09-0.57] | 98.5 | 96.3 | 92.7 | 3.6 |
| DM → TrFLDA | 0.1 | N/A | 88.8 | 87.2 | 1.6 | 0.1* |
| DM → TrFLDA Original | 0.5 | N/A | 92.4 | 87.2 | 5.2 | 0.5* |

*method was applied to full database only.

TABLE 28 provides MNIST at 90°: Average percent accuracy of transfer learning classification methods over 10 validation trials over the original database and the merge method for diffusion map (DM) construction; includes associated

TABLE 28

| Transfer Technique | λ | Source CCR (Avg) | Target CCR (Avg) | No transfer baseline | Transfer Boost |
|---|---|---|---|---|---|
| TrDM | 0.06 | 99.5 | 91.4 | 91.1 | 0.3 |
| MTSL | 0.70 | 98.3 | 99.1 | 91.7 | 7.4 |
| DM → TrFLDA | 0 | 91.5 | 87.6 | 87.6 | 0 |
| DM → TrFLDA Original | 0.5 | 93.4 | 94.5 | 90.9 | 3.6 |

TABLE 29 provides MNIST confusion matrix example for TrDM at =0.61:

TABLE 29

| TrDM | Handwritten Four | Handwritten Five |
|---|---|---|
| Handwritten Four | 100.0 | 0.0 |
| Handwritten Five | 17.2 | 82.8 |

Gene Expressions: To test the applicability of the transfer techniques to non-EO datasets, a database of mRNA microarray gene expressions was utilized from the Biomedical Knowledge Repository (BKR) developed at the National Library of Medicine (NLM). Specifically we used Lung Adenocarcinoma (LUAD) and the Breast Invasive Carcinoma (BRCA) data. The original dataset for both domains contains measurements of 60484 different genes. For our purposes, we view this as a 60484 dimensional vector per subject. These 60484 dimensions are not all the same for breast and lung cancer. Since MTSL is currently based on TrFLDA the attributes do need to be the same for the domain and source data. Thus the first step to working with the BRCA and LUAD data is to match the features.

Per tradition the two domains are combined then features are eliminated which do not have values for 90% of the subjects. Next, features were excluded that were not in the intersection of the BRAC and LUAD dataset. There were then 22622 features that persisted. Our resulting input data for BRAC is 112 positive breast cancer samples and 117 negative breast cancer samples. For LUAD there are 49 cancerous samples and 49 non-cancerous samples also with 22, 622 dimensions. The data is further processed by performing a principal component analysis (PCA) on the 22, 622 dimensions, as is common practice in the bioinformatic field. The PCA reduced the dataset to 276 dimensions.

There is an extensive body of literature describing techniques to classify cancerous and noncancerous breast cancer and lung cancer. When traditional two-class classification techniques are applied to breast microarray gene expressions Support Vector Machines (SVM) can achieve 97.6% recognition rates. Likewise SVM can achieve 97.2% recognition rates on lung microarray gene expressions. Our experiments should not be confused with those experiments. Recall we are using knowledge from lung microarray gene expressions to classify an entire dataset of breast microarray gene expressions in which only one sample per class is labeled. This is the first time that a cross-domain experiment of lung and breast cancer microarray gene expressions of this type has been performed.

Figure 29:
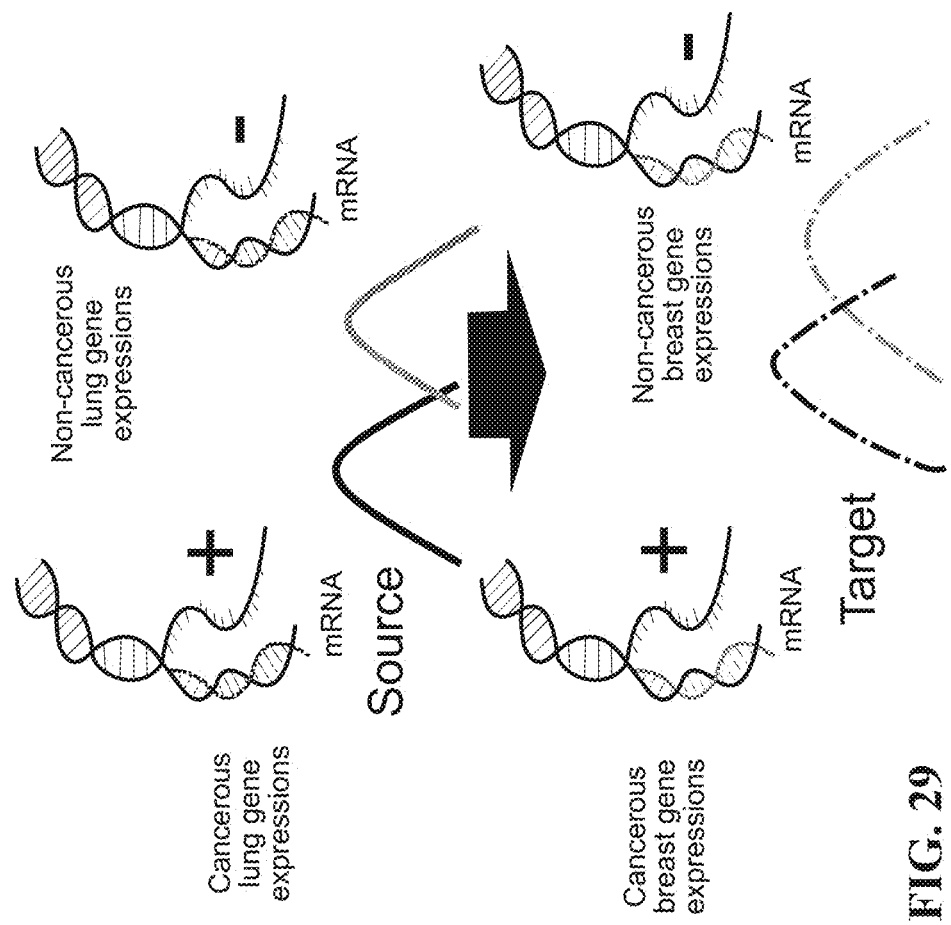
FIG. 29 illustrates a conceptual flow chart for cross-domain experiments recognizing the target data of cancerous and noncancerous breast genes by leveraging the source data of cancerous and non-cancerous lung genes.

Further recall that our experimental results are only based on one labeled sample from a cancerous breast microarray gene expression and one labeled sample of non-cancerous breast microarray gene expression. The rest of the breast microarray gene expression database is unlabeled. A flow diagram for the cross-domain experiments is depicted in FIG. 29.

For these experiments the diffusion maps parameters were set to d=15, t=1, and σ=30; we report results for different values of the parameter λ. These values were chosen to maximize the CCRs during the parameter selection method on the source domain.

TABLE 30 provides average percent accuracy of transfer learning classification methods on Cancer PCA data across 10 validation trials on the original database and the merge method for diffusion map (DM) construction; includes associated

TABLE 30

| Transfer Technique | λ | λ Range | Source CCR (Avg) | Target CCR (Avg) | No transfer baseline | Transfer Boost |
|---|---|---|---|---|---|---|
| TrDM | 0.5 | [0.5-0.77] | 99.0 | 90.6 | 60.0 | 30.6 |
| MTSL | 0.99 | [0.99] | 56.1 | 56.3 | 59.0 | -2.7 |
| DM → TrFLDA | 0.01 | [0.01] | 95.0 | 88.8 | 92.4 | -3.6 |
| DM → TrFLDA Original | 0.5 | N/A | 94.8 | 92.4 | 92.4 | 0 |

TABLE 31 reports the results for this experiment. Notice the original implementation of TrFLDA performs the best at 92.4% correct classification rate for the target domain with λ=0.5. TrDM is very close to the performance of TrFLDA at 90.6% CCR for λ=0.5. Here MTSL performs the worst at 56.3% CCR for λ=0.99. Notice that in terms of transfer learning, TrDM leverages the transfer the most with a transfer boost of 30.6%. For these results, the average CCR are within ±1% of the true average with a confidence level of 99%.

For the next experiment random subsets were constructed from the PCA dataset to introduce more statistical variation and protect from overfitting. Each subset utilizes 99% of the PCA dataset. The experiment was completed 10 times and the averages are reported. Due to time constraints this experiment was only conducted for TrDM and MTSL. The results are shown in TABLE 31.

Notice that the Target CCRs for TrDM decreased while the CCR for MTSL increased. For TrDM the average CCR decreased from 90.6% to 88.4%. For MTSL the average CCR increased from 56.3% to 86.3%.

TABLE 31 provides Average percent accuracy of transfer learning classification methods on Cancer PCA data across 10 validation trials on the original database and the merge method for diffusion map (DM) construction; includes associated

TABLE 31

| Transfer Technique | λ | λ Range | Source CCR (Avg) | Target CCR (Avg) | No transfer baseline | Transfer Boost |
|---|---|---|---|---|---|---|
| TrDM | 0.515 | [0.52-0.70] | 96.3 | 88.4 | 57.1 | 31.3 |
| MTSL | 0 | [0] | 98.9 | 86.3 | 86.3 | 0 |
| DM → TrFLDA | 0.01 | [0.01] | 95.0 | 88.8 | 92.4 | -3.6 |
| DM → TrFLDA Original | 0.5 | [0.5] | 94.8 | 92.4 | 92.4 | 0 |

It is instructive to observe how the transfer learning techniques perform without employing PCA. The experiments were redone using the overlapping dimensions of 22622. The results or this experiment are shown in TABLE 32. Notice how well TrDM performed compared to the other techniques and the small range for λ.

For TrDM and MTSL the validation trials were randomly selected subsets using 99% of the original database. Due to time constrains, for the TrFLDA the full dataset was utilized instead of random subsets. The results are shown in TABLE 32. Note the high CCR using TrDM of 95.2%. The other three techniques produced CCRs in the 80% range. In terms of transfer boost, TrDM outperformed the other techniques at 11.6%. For TrDM, the average CCRs are within ±3% of the true average with a confidence level of 92%.

For MTSL, the average CCR are within ±2% of the true average with a confidence level of 99%. For both of the TrFLDA implementations, the average CCR are within ±0.1% of the true average with a confidence level of 99%. These results are impressive as the state-of-the-art (SOA) for traditionally fully labeled lung cancer data is 97.2% and 97.6% for breast cancer. The CCRs for three of the techniques actually increased when it was expected that the CCRs would decrease. This may be due to the fact that the random samples provided some generalization and the ability to overcome outliers.

TABLE 32 provides Gene expressions (Full overlapping data): Average percent accuracy of transfer learning classification methods on Cancer data over 10 validation trials utilizing 99% of the database and the merge method for diffusion map (DM) construction; includes associated λ:

TABLE 32

| Transfer Technique | λ | λ Range | Source CCR (Avg) | Target CCR (Avg) | No transfer baseline | Transfer Boost |
|---|---|---|---|---|---|---|
| TrDM | 0.16 | [0.16-0.2] | 98.9 | 95.2 | 83.6 | 11.6 |
| MTSL | 0.42 | [0.38-0.50] | 98.0 | 83.2 | 83.2 | 0 |
| DM → TrFLDA | 0.38 | [0.38] | 82.5 | 85.2 | 85.2 | 0 |
| DM → TrFLDA Original | 0.5 | [0.5] | 82.5 | 85.6 | 85.2 | 0.4 |

For this experiment a confusion matrix is also provided below in TABLE 33. TABLE 33 provides Gene expressions: Confusion matrix example for TrDM method using full database; λ=0.16 results in 99.0% correct classification rate for the source and 96.1% CCR for the target:

TABLE 33

| TrDM | Negative Breast Cancer Samples | Positive Breast Cancer Samples |
|---|---|---|
| Negative Breast Cancer Samples | 92.0 | 8.0 |
| Positive Breast Cancer Samples | 0.0 | 100.0 |

Observe that the confusion matrix suggests that positive breast cancer is easier to recognize than negative breast cancer. However note this confusion matrix is just one realization. In order to understand the overall trends, the average confusion matrix would need to be calculated. Due to time constraints those calculations could not be completed in this effort and remain a topic for future investigation.

Performance Predictors: The focus of this section is on the Comanche Infrared database shown above in FIG. 30. Several transfer challenges can be constructed using this dataset. There are opportunities for cross-operating conditions (OCs) transfer challenges since the data is captured at different angles and ranges. There are also opportunities for partial and cross-domain transfer challenges given the different types of vehicles. We explore the Comanche dataset for both cross-domain and cross-OCs transfer challenges.

Two experiments are performed applying TrFLDA, MTSL, and TrDM to this dataset. While performing these experiments a hypothesis is that the average RMSE could potentially serve as a performance predictor. The classification performance of one experiment is quite poor while the classification performance of the other experiment is good. Analysis using the RMSE could have potentially predicted the performance.

Comanche Cross-Domain Transfer Learning: The first transfer challenge is a partial cross-domain challenge where the source classification problem is identifying a six wheel large truck (Target 4) vs. a tank (Target 7) and the target classification problem is a four wheel small truck (Target 1) vs. a different tank (Target 5). Sample images for this experiment are shown in FIG. 31. This transfer challenge could be considered a wheeled vs. non-wheeled classification problem, a vehicle with multiple tires vs. a vehicle with a few tires problem, or simply a tank vs. non-tank classification problem. Future work will include analysis of the diffusion map to better understand what features are salient for the transfer challenge.

After the parameter search, the best parameters are found to be σ=30, d=6, and σ=1. The average RMSE for the four classes can be seen in TABLE 8. This is an interesting table as it goes against intuition. Namely the results would suggest that Tank 7 would align to Tank 1 but the Six wheel large truck (Target 4) would not align best with the Four wheel small truck (Target 1). Based on this RMSE table, the prediction is that the transfer learning will not perform well in this experiment.

TABLE 34 provides experimental setup for the partial cross-domain experiment using the Air Force EO-SCVDD:

TABLE 34

|  | Classification Problem | Samples |
| --- | --- | --- |
| Source | Fully labeled database: | 152 |
|  | Six wheel large truck vs. Tank | 157 |
|  | Total: | 309 |
| Target | One labeled sample from each: | 151 |
|  | Four wheel small truck vs. Tank | 144 |
|  | Total: | 295 |

The TrDM technique outperformed all the other techniques at 86.6% CCR for the target domain as shown below in TABLE 36. The diffusion map coupled with the TrFLDA method also performed well at 81.9%. The MTSL and original implementation of TrFLDA performed poorly at 60.9% and 38.7% CCR, respectively. For the TrDM results, the average correct classification rates are within ±0.06% of the true average with a confidence level of 90%. For MTSL, the average CCR is within ±0.02% of the true average with a confidence level of 99%. Using the TrFLDA method results in CCRs within ±0.01% of the true average with a confidence level of 99%.

Comanche Cross-Operating Conditions: The next experiment with the Comanche dataset is an example of a cross-operating conditions transfer challenge. The source classification problem is Target 4 vs. Target 7 both at approximately 2000 meters with 152 and 157 samples, respectively. Since there are limited samples per range, the samples spanned a range of 1900-2184 meters. The target classification problem is the same vehicles but now at approximately 3000 meters with 151 and 144 samples respectively. The DM→TrFLDA outperforms all other techniques at 81.9% CCR. TrDM is the second best performer with 76.5% CCR. The DM→TrFLDA Original performs poorly at 38.7% CCR. The only technique that utilizes transfer is DM→TrFLDA Original.

TABLE 35 provides Comanche Cross Domain: Average percent accuracy of transfer learning classification methods over 10 validation trials utilizing the full original databases and the merge method for diffusion map (DM) construction; includes associated λ:

TABLE 35

| Technique | λ Mean | λ Range | Source CCR (Avg) | Target CCR (Avg) | No Transfer Baseline (Avg) | Transfer Boost (Avg) |
| --- | --- | --- | --- | --- | --- | --- |
| TrDM | 0 | [0] | 80.0 | 76.5 | 76.5 | 0 |
| MTSL | 0.42 | [0.42] | 66.0 | 64.7 | 64.7 | 0 |
| DM → TrFLDA | 0 | [0] | 73.6 | 81.9 | 81.9 | 0 |
| DM → TrFLDA Original | 0.5 | [0.5] | 38.7 | 38.7 | 38.1 | 0.6 |

TABLE 36 provides Comanche Cross Domain: Average percent accuracy of transfer learning classification methods over 11 validation trials utilizing 99% of the original databases and the merge method for diffusion map (DM) construction; includes associated λ:

FIG. 36

| Technique | λ Mean | λ Range | Source CCR (Avg) | Target CCR (Avg) | No Transfer Baseline (Avg) | Transfer Boost (Avg) |
| --- | --- | --- | --- | --- | --- | --- |
| TrDM | 0.25 | [0.12-0.28] | 98.1 | 86.6 | 61.9 | 0 |
| MTSL | 0.24 | [0.19-0.44] | 60.2 | 60.9 | 62.3 | 0 |
| DM → TrFLDA | 0 | [0] | 73.6 | 81.9 | 81.9 | 0 |
| DM → TrFLDA Original | 0.5 | [0.5] | 38.7 | 38.7 | 38.1 | 0.6 |

This cross-operating conditions experiment was performed again using 11 validation trials utilizing 99% of the original database. With the additional statistical variation the results changed. The TrDM outperforms all the other techniques 86% CCR. The DM→TrFLDA is the second best performer at 81.9% CCR. The DM→TrFLDA Original performs poorly at 38.7% CCR. Similarly to the previous experiment the only technique that utilizes transfer is DM→TrFLDA Original.

Analysis: In this section overall analysis is presented. First, the overall general observations are given then a note on experimental robustness is discussed. Lastly a note on computational expense is given.

Observations: The summary of all of the transfer challenge experiments are reported in TABLES 37 and 38. Notice that for seven of the eight applications, the new transfer subspace learning (TSL) algorithms outperform the traditional transfer learning techniques in regards to correct classification rates for the source classification problem. Also notice that for seven of the eight applications, the new TSL algorithms result in the highest transfer boost. The performance of the new techniques indicates they represent significant advantages over the existing transfer techniques due to a greater CCR. The TrDM boost sometimes results in elevating the performance of the technique to the average performance of the MTSL boost. For example, the overall highest transfer boost occurs for the data domes cross-domain application at 32.6%. This increases the performance of the TrDM algorithm to match the performance of the MTSL algorithm.

There are also some interesting observations with the λ utilized in the experiments shown in TABLE 38. For example, notice that only three times is the resulting λ greater than 0.5. The majority of the time the resulting λ is closer to the 0.25 range. Recall that in the original implementation the λ is selected as 0.5. Given the observations in this effort if optimization over λ is not utilized then a better constant might be λ=0.25 rather than λ=0.5. In future efforts it may be wise to change the bounds of λ from [0, 1], to (0, 1). This is because the best solution shouldn't be found at the extremes—one extreme emphasizes only the alignment between the source and target domains, and the other emphasizes only the classification performance of the source data.

One general observation that is true of all experiments using the transfer learning approaches is that not only did the classification performance improve for the target classification problem but it also improved for the source classification problem. For example, in the MNIST experiments for both cases, on average the source target classification increased 2.4% when using the projection from the transfer learning as opposed to the projection from the source classification. This could be because the classification of the source data is more generalized since the data is being mixed with other 'similar' data. This strongly suggest that analyzing the CCR boost seen in the source domain is a fruitful avenue for future research.

Experimental Robustness: In traditional classification problems, there exist several techniques to introduce robustness into the solution algorithm. For example 10-cross fold validation is often utilized to illustrate confidence in the robustness of classification algorithms. For a Transfer Learning problem there is not a standard method that is utilized across algorithms. In the present disclosure we want to provide some understanding of the robustness of the algorithms developed herein. In order to do that, we created a technique with similar principles to the 10-fold cross-validation method. In this section we will introduce the details of that method and share our ideas for future work in the area.

We introduce a 10 validation trials technique applicable to Transfer Learning algorithms. For the source classification problem we utilize the standard 10-fold cross-validation method to search for the parameters. This will prevent overfitting of the parameters. For the Transfer Learning we first create random subsets of the source and target databases. Since we need large datasets to form the manifold, we create the subsets utilizing a percentage of the dataset. For the experiments herein we utilized 80%-90% of the source and target data and we kept the ratios of objects in the source and target data the same. For example if in the target data there was a 50/50 distribution between objects for a two-class problem then we generate a random selected subset where the 50/50 ratio is maintained. For our experiments we create 10 of these subsets, complete the experiments on the subsets, and present the average classification performance of the 10 trials.

TABLE 37 is summary results for the transfer learning experiments. Max Boost refers to the maximum transfer learning CCR boost. The number indicated in parenthesis corresponds to the technique number where (1) indicates TrDM, (2) indicated MTSL, (3) indicates diffusion map input into TrFLDA and (4) indicates Diffusion Map input into the original implementation of TrFLDA:

TABLE 37

| Data | Object | Mod | Type | TrDM (1) | MTSL (2) | DM → TrFLDA (3) | DM → TrFLDA (SiSi) (4) | Max Boost |
|---|---|---|---|---|---|---|---|---|
| MNIST | H. Digits | EO | M | 95.2 | 96.3 | 87.2 | 87.2 | 3.6 (2) |
| MNIST 90 | H. Digits | EO | M | 91.4 | 99.1 | 87.6 | 94.5 | 7.4 (2) |
| Comanche Targets | Military Vehicles | IR | M | 86.6 | 60.9 | 81.9 | 38.7 | 0.6 (4) |
| Comanche Cross OC's | Military Vehicles | IR | M | 86.6 | 59.8 | 38.0 | 38.7 | 24.2 (1) |
| Cancer PCA | Humans | Genes | M | 90.6 | 56.3 | 88.8 | 92.4 | 30.6 (1) |
| Cancer Full | Humans | Genes | M | 95.2 | 83.2 | 85.2 | 85.2 | 11.6 (1) |
| Domes Partial Cross Domain | Vehicles | EO | S | 96.5 | 92.9 | 47.7 | 47.6 | 23.9 (2) |
| Domes Cross Domain | Vehicles | EO | S | 90.1 | 90.1 | 53.2 | 53.1 | 32.6 (2) |

TABLE 38 is summary results for the lambda values utilized in the transfer learning experiments conducted in the present disclosure. The numbers in bold indicate the technique that resulted in the highest CCR for the target classification problem:

TABLE 38

| Data | Object | Mod | Type | TrDM λ | MTSL λ | DM → TrFLDA λ | DM → TrFLDA (SiSi) λ |
|---|---|---|---|---|---|---|---|
| MNIST | H. Digits | EO | M | 0.1 | 0.48 | 0.1 | 0.5 |
| MNIST 90 | H. Digits | EO | M | 0.06 | 0.7 | 0 | 0.5 |
| Comanche Targets | Military Vehicles | IR | M | 0.25 | 0.24 | 0 | 0.5 |
| Comanche Cross OC's | Military Vehicles | IR | M | 0.25 | 0.24 | 0.57 | 0.5 |
| Cancer PCA | Humans | Genes | M | 0.5 | 0.99 | 0.01 | 0.5 |
| Cancer Full | Humans | Genes | M | 0.16 | 0.42 | 0.38 | 0.5 |

TABLE 38-continued

| Data | Object | Mod | Type | TrDM λ | MTSL λ | DM → TrFLDA λ | DM → TrFLDA (SiSi) λ |
|---|---|---|---|---|---|---|---|
| Domes Partial Cross Domain | Vehicles | EO | S | 0 | 0.5 | 0.9 | 0.5 ) |
| Domes Cross Domain | Vehicles | EO | S | 0 | 0.49 | 0.035 | 0.5 |

Future work will include adapting more features of the 10-fold cross-validation method. For example, it may be difficult to incorporate the 10-fold method because a dataset that is 90% smaller will destroy the structure of the manifold. However, perhaps we can build datasets that are not that small. One idea is to utilize one of the 80% subset for the Transfer Learning training and then for testing, we utilize a different 80% subset. Then we can repeat this process multiple times to obtain tighter confidence intervals.

Computational Requirements for New Algorithm: In this Section the computational complexity of the different algorithms is briefly discussed. TABLE 39 provides a comparison of computational time of the four techniques for two different sample sizes. The nonlinear techniques are more computationally expensive. This is mostly due to the complexity of building a diffusion map. The time complexity for TSL training is $O((D+N)^2)$ where N is the number of samples and D is the number of dimensions. This time complexity for Diffusion Maps is $O((N)^3)$. The time complexity then for TSL and Diffusion Maps is then $O(D+N)^3)$:

TABLE 39

| Technique | Computational Time (Minutes) MNIST Data For n = 872 | Computational Time (Minutes) Comanche Cross OC Data For n = 335 |
|---|---|---|
| TrDM | 4.40 | 1.68 |
| MTSL | 4.42 | 2.01 |
| TrFLDA Enhanced | 9.24 | 4.70 |
| TrFLDA | 0.08 | 0.47 |

Closing Remarks: In this chapter, we provide a summary of the unique contributions of the present disclosure, discuss expected impacts, and provide some thoughts about future research in this area.

Transfer Learning is a relatively new technique based on the idea of using information from one dataset to recognize objects in a different but related dataset. The ability to leverage existing data without the need for additional data collections is attractive for many Aided Target Recognition applications. However, many Aided Target Recognition systems built from a particular dataset frequently exhibit substantial performance loss when used with a similar but different dataset. Therefore we seek to build an Aided Target Recognition system that can perform well in cross-dataset and cross-domain applications.

Transfer Subspace Learning is a particular Transfer Learning technique that has recently gained popularity for its ability to perform cross-dataset and cross-domain object recognition. The objective of Transfer Subspace Learning is to determine a subspace which separates the source data and aligns the distributions of the source and target data in the lower-dimensional subspace. By aligning the distributions of the source and target data in the lower-dimensional subspace it becomes more likely that what is learned from the source data is applicable to the target data.

Transfer Subspace Learning is a theoretically well motivated and a promising technique but the existing implementation has several limitations. First, Transfer Subspace Learning is implemented as an optimization problem in which the objective function is a linear combination of (i) separating the source data and (ii) aligning the distributions of the source and target data. The term measuring the alignment of the distributions is referred to as the regularization term. Currently Transfer Subspace Learning techniques use an arbitrary weight for the regularization term and there is no methodology for selecting this weight.

Second, the implementation of Transfer Subspace Learning is computationally prohibitive for high-dimensional data. Therefore, Transfer Subspace Learning could be improved by combining it with a dimensionality reduction technique. Finally, current implementations of Transfer Subspace Learning are restricted to linear techniques. The present disclosure implements the first nonlinear Transfer Subspace Learning technique.

Summary of Contributions and Expected Impact: The present disclosure combines Manifold Learning and Transfer Subspace Learning to improve the existing Transfer Subspace Learning techniques and create innovative and dynamic Aided Target Recognition (AiTR) systems capable of achieving high target recognition rates for cross-dataset and cross-domain applications. The Manifold Learning technique used in the present disclosure is Diffusion Maps, a nonlinear dimensionality reduction technique which can capture the basic structure of the data in a lower dimensional subspace. The new Target Recognition systems introduced in the present disclosure are referred to as (i) Manifold Transfer Subspace Learning (MTSL) and (ii) Transfer Diffusion Maps (TrDM).

Manifold Transfer Subspace Learning (MTSL): The basic framework for Manifold Transfer Subspace Learning (MTSL) can be described as a two-step process. In step one the data is transformed using a Manifold Learning technique. In step two the Transfer Subspace Learning technique is applied to the transformed data. In the present disclosure Diffusion Maps (DM) is used as the Manifold Learning technique and Transfer Fishers Linear Discriminative Analysis (TrFLDA) is used as the Transfer Subspace Learning (TSL) technique, but other techniques can be used within the basic framework.

The new Manifold Transfer Subspace Learning technique introduced in the present disclosure represents a number of improvements over the existing implementation of Transfer Fishers Linear Discriminative Analysis (TrFLDA). First, by using the Diffusion Maps technique in step one, the TrFLDA technique is able to operate more efficiently in a lower-dimensional subspace. Second, we made several improvements to the existing TrFLDA algorithm including the implementation of relative weights, a reformulation of the objective function, and improvements to the KDE technique. Although these changes are relatively minor, the enhanced version of TrFLDA consistently outperforms the classic implementation. Finally, we introduced and incorporated a methodology for selecting the appropriate weight for the regularization term and for quantifying the improvement in classification performance brought about by transfer learning.

The MTSL framework was used to analyze several datasets including (i) the EO synthetic vehicle dataset, (ii) the MNIST handwritten digits dataset, (iii) the BKR microarray gene expressions dataset, and the (iv) IR military vehicles dataset. Overall the MTSL framework performed very well, particularly with the synthetic vehicle and handwritten digits datasets. For instance using the EO synthetic vehicle dataset the MTSL technique was able to consistently achieve cross-dataset and cross-domain target classification rates in the 90s compared to classification rates in the 60s and 50s for TrFLDA and KNN, respectively.

Similarly for the MNIST handwritten digits dataset, the MTSL technique was able to consistently achieve target classification rates in the high 90s, compared to classification rates in the 50s and 70s for TrFLDA and KNN, respectively. Moreover, the MTSL technique actually outperformed the TrDM technique in all of the experiments with the handwritten digits dataset. The MTSL technique performs worse than the TrDM technique on the gene expressions and the military vehicles datasets; which were the more difficult datasets.

The MTSL technique clearly represents an improvement over the traditional TrFLDA technique. By capturing the basic structure of the data in a lower-dimensional subspace the Diffusion Maps technique makes the Transfer Subspace Learning technique more effective. This is indicated by the high Transfer Boost rates for TSL that are observed when Diffusion Maps are utilized. We are able to further increase the performance of the Transfer Subspace Learning technique by introducing a methodology for selecting the optimal transfer rate.

Both results and intuition indicate the MTSL technique can outperform the TrDM technique when the Diffusion Maps technique does well capturing the structure of the data such that the different classes in the source and target data can be separated in the same one-dimensional subspace. This is the situation in the MNIST dataset for which the MTSL technique worked best. The other datasets were more complex as the different classes in the source and target datasets could not be easily separated in the same one-dimensional subspace.

Transfer Diffusion Maps (TrDM): The other innovative Target Recognition system introduced in the present disclosure is Transfer Diffusion Maps (TrDM). In contrast to Manifold Transfer Subspace Learning (MTSL) which combines Diffusion Maps and Transfer Subspace Learning sequentially in separate steps, Transfer Diffusion Maps (TrDM) integrates Diffusion Maps and Transfer Subspace Learning simultaneously in one step. This allows Transfer Subspace Learning to affect the Diffusion Maps representation of the data. The Diffusion Maps representation of the data takes into account the alignment of the distributions of the source and target data in the lower-dimensional subspace.

In the formulation of the TrDM technique, a technical challenge was to formulate the Diffusion Maps technique as an optimization problem. To simultaneously combine Diffusion Maps and Transfer Subspace Learning, it was necessary to obtain the Diffusion Maps coordinates for the data as the solution to an optimization problem. Diffusion Maps is a nonlinear dimensionality reduction technique in which the data is transformed into a weighted graph and the Diffusion Maps coordinates are computed using the eigenvalues and eigenvectors of the associated Markov transition probability matrix. Considerable effort was employed to reformulate the Diffusion Maps technique as an optimization problem.

The TrDM framework was used to analyze the previously described datasets, including (i) the EO synthetic vehicle dataset, (ii) the MNIST handwritten digits dataset, (iii) the BKR microarray gene expressions dataset, and the (iv) IR military vehicles dataset. Overall, the TrDM framework performed very well. Except for the cross-domain military vehicles dataset which is particularly challenging TrDM consistently achieved classification rates in the 90s. With the exception of the MNIST handwritten digits dataset, TrDM consistently outperformed the other techniques in the experiments.

The performance of TrDM was particularly impressive on the BKR microarray gene expressions dataset, the dataset. Recall, the state-of-the-art classification techniques using Support Vector Machines (SVM) can achieve classification rates of 97.2% and 97.6% for lung and breast microarray gene expressions, respectively. In our experiments TrDM was able to achieve classification rates of 98.9% and 95.2% for the lung (source) and breast (target) microarray gene expressions, respectively. This is impressive because TrDM trains only on the source data and uses what it learned from the source data to classify the target data, implying that a significant amount of learned knowledge from lung cancer genes can be transferred to recognize cancerous breast genes.

FUTURE RESEARCH: This section provides some thoughts about possible improvements and extensions of the techniques presented in the present disclosure. Transfer Diffusion Maps (TrDM) is essentially a nonlinear dimensionality reduction technique in which Transfer Subspace Learning is able to affect the lower-dimensional subspace generated by Diffusion Maps while using the relatively simple kNN classifier. In contrast within Manifold Transfer Subspace Learning (MTSL) the Transfer Subspace Learning technique does not affect the initial lower-dimensional subspace generated by Diffusion Maps, but instead uses the more sophisticated TrFLDA technique to map the transformed data into a one-dimensional subspace for classification. An advantage of TrDM over MTSL is that Transfer Subspace Learning is able to affect the lower-dimensional subspace generated by Diffusion Maps, while a disadvantage is that it uses a relatively simple classifier.

The threads presented provides a useful framework for future research. A possible extension is to enhance TrDM by combining it with a more sophisticated classification method such as FLDA or Support Vector Machines (SVM). An interesting extension would be to combine TrDM with FLDA, which would create a new technique in which the Transfer Subspace Learning technique is able to affect the lower-dimensional subspace generated by Diffusion Maps and FLDA is used as a more sophisticated classification technique.

This hypothesized technique is different from the MTSL technique introduced herein. The suggested new technique can be described as a two-step procedure with TrDM followed by FLDA, while the MTSL technique can be described as a two-step procedure with DM followed by TrFLDA. For the hypothesized TrDM-FLDA algorithm the FLDA technique would be applied separately to the source and target data, which would remove the restriction inherent in TrFLDA of separating the source and target data using the same one-dimensional space.

There are a number of possible improvements which can be made to the techniques presented herein including the parameter selection process, the computation of the regularization term in the Transfer Subspace Learning technique, and the process by which the optimal transfer rate is selected. Additional experiments of varying data type, dimensionality, operating conditions, and quantity could provide further insight into the performance of the techniques developed herein.

In one or more embodiments, the present disclosure provides an ability to distinguish unknown objects based on learning to distinguish well-known objects. An analogy of this capability is the learning of a child to recognize characteristics of the child's mother and father. This learning can be applied to recognizing other men and women as being potentially being fathers and mothers.

Figure 32:
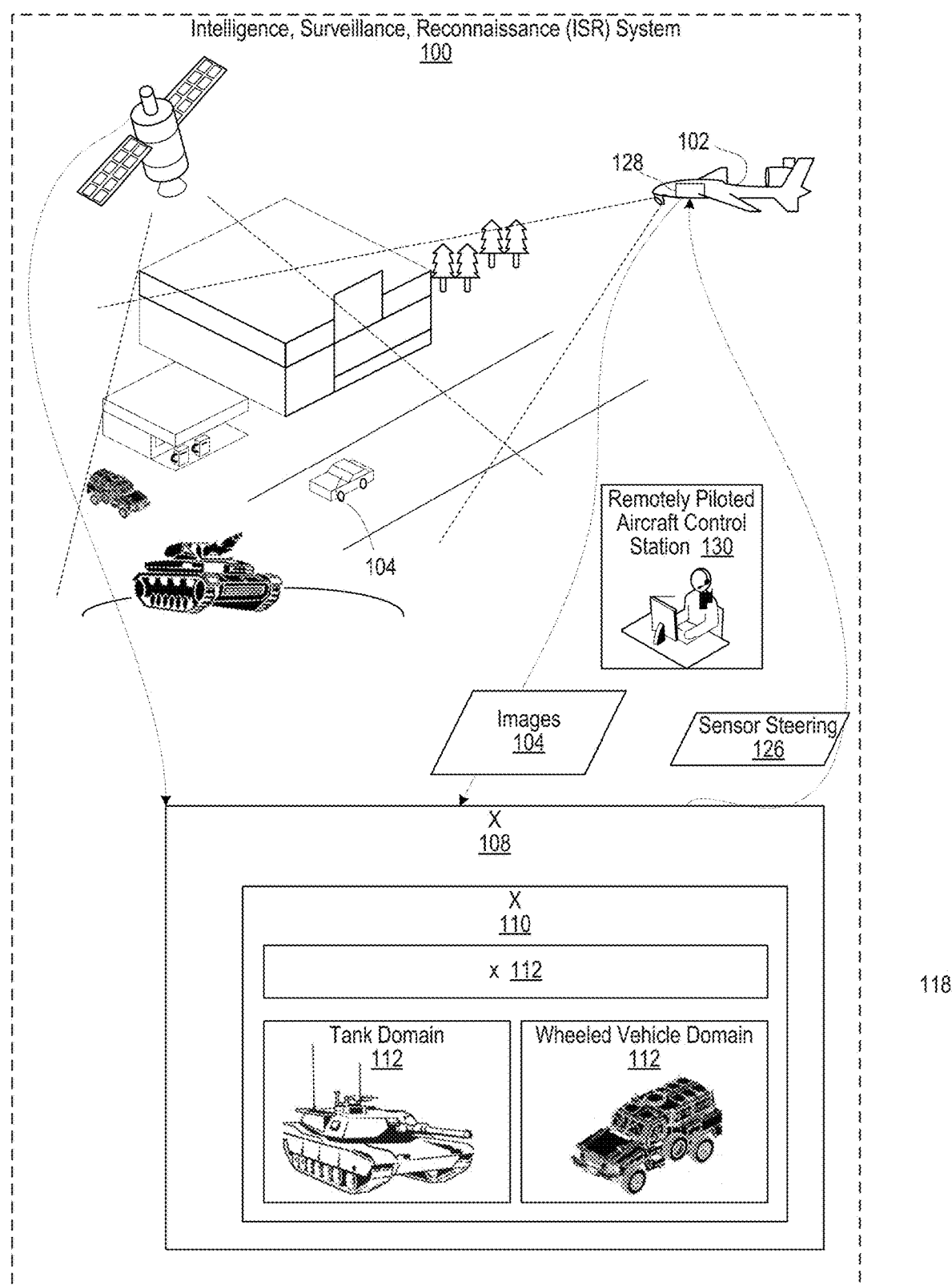
FIG. 32 illustrates an aircraft having an image tracking system that performs real-time recognition and tracking of ground targets, according to one or more embodiments.

In one or more embodiments, FIG. 32 illustrates an aircraft 3200 having an image tracking system 3202 that performs real-time recognition and tracking of ground targets 3204, 3206.

FIG. 32 is a diagram of an intelligence, surveillance, and reconnaissance (ISR) and targeting system 100. The system 100 includes one or more unmanned aerial vehicles (UAVs) 102 that provide images or full motion video (FMV) 104 of a movable ground target 106 to a collaborative human-automation tracking system 108 that includes a UAV command station 110. An automated video object tracker ("tracker") 112 enhances and improves the UAV command station 110 by providing humanly-perceptible indicators 114 and control affordances 116 on one or more user interface devices 118 to a human operator 120. The indicators 116 enhance situational awareness of the human operator 120 by indicating historical path 122 of the movable ground target 106 and a confidence level indication 124 in the automated tracking. An operator can visually extrapolate the historical path 122 to determine an expected path. In one or more embodiments, when in automated control, the tracker 112 communicates a sensor steering command 126 directly to an autonomous controller 128 of a UAV 102 that provides the FMV 104 or a remotely piloted aircraft (RPA) control station 130. In one or more embodiments, when in automated control, the tracker 112 communicates the sensor steering command 126 indirectly to an autonomous controller 128 of a UAV 102 that provides the FMV 104 or a remotely piloted aircraft (RPA) control station 130.

Optical object tracking algorithms have been deeply researched for full motion video (FMV) and wide area motion imagery (WAMI). Optical object tracking algorithms are designed to follow pedestrians and vehicles of interest as viewed by these sensors. Object trackers are selectively used by the US government to perform intelligence, surveillance, and reconnaissance (ISR) and targeting within the U.S. Department of Defense (DoD) and other Federal agencies. Likewise, foreign government agencies utilize them for similar purposes. Optical object tracking algorithms are also a component of commercial imagery analysis software.

Ground targets 3204, 3206 respectively are similar to, but not the same as, previously-learned domains 3208, 3210 of image data. As conventionally known, cross domain learning is theoretically possible based on divergence-based regulation for transfer substance learning:

$$W*= \arg \min_{W \in R^{D \times d}} F(W) + \lambda D_W(P_S \| P_T) \qquad \text{(Eqn. 120)}$$

However, Eqn. 120 is not bounded and thus not solvable by a real-time controller 3212 of image tracking system 3202. As provided above, Eqn. 120 is expanded to become a bounded equation:

$$W*= \arg \min_{W \in R^{D \times d}} (1-\lambda)F(W) + \lambda D_W(P_S \| P_T) \qquad \text{(Eqn. 121)}$$

Thus, controller 3212 is capable of finding the optimal solution. Once ground targets 3204, 3206 are recognized in real-time, airborne tracking enables steering of a sensor gimble 3214 to maintain ground targets 3204, 3206 within a field of view (FOV) of imaging sensor 3216.

In one or more embodiments, creating the bounded equation includes creating an optimization form of a diffusion map and recasting the optimization form as an optimization problem. The optimization problem is the transfer diffusion map (TrDM) that is inserted in the above Eqn. 121 for "F(W)"

Controller 3212 performs transfer substance learning, specifically manifold transfer substance learning (MTSL), to TrDM. (i) Diffusion map coordinates are computed from the eigenvectors of P (Transition Probability Matrix); (ii) Question becomes: How can we derive the eigenvectors of P as a solution to an optimization problem? (iii) There is a connection between optimization and the eigenvector of a matrix $$\max_x x^T M x \qquad \text{(Eqn. 122)}$$
$$x^T x = 1 \Rightarrow Mx = \lambda x$$

If M is a symmetric matrix, then the solution to the maximization problem gives you the eigenvectors of M; (iv) But not easy because P is not symmetric—Kernel matrix (K) is symmetric though; and (v) The optimization problem for diffusion maps can be written as $$\min_y x^T Dx - x^T Kx \quad A = D^{-1/2} K D^{-1/2} \quad \min_w -w^T A w \qquad \text{(Eqn. 123)}$$
$$\rightarrow$$
$$x^T Dx = 1 \quad w = D^{1/2} x \quad w^T w = 1$$

In one aspect of the present innovation, a methodology is provided to select the appropriate parameters (specifically t and X) for TrDM. Using the source, various combinations of parameters are used to create a range of options. These options are automatically evaluated as good or bad.

Figure 33:
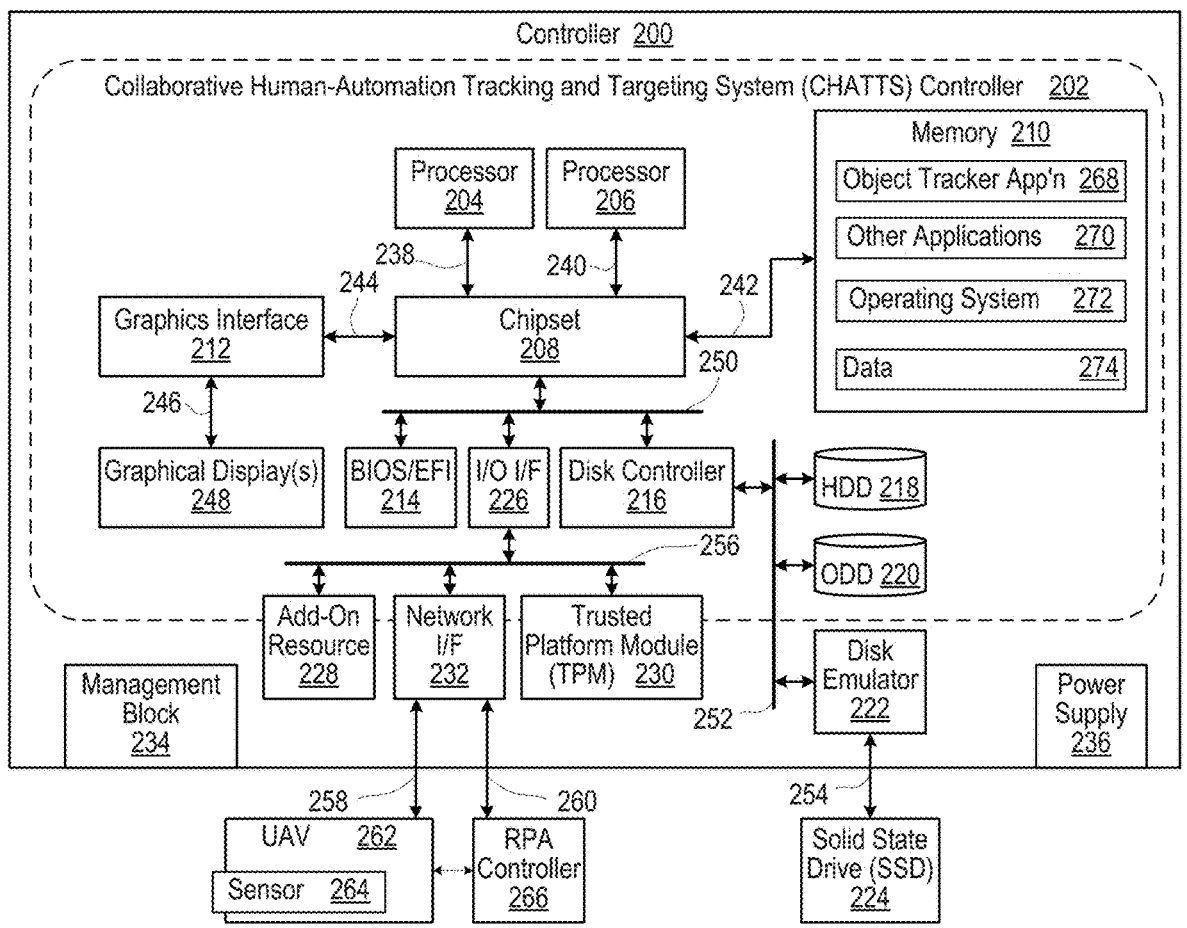
FIG. 33 is a diagrammatic illustration of an exemplary hardware and software environment of an unmanned aerial vehicle (UAV) control station, customized to implement a collaborative human-automation tracking and targeting system (CHATTS) controller, according to one or more embodiments.

FIG. 33 is a diagrammatic illustration of an exemplary hardware and software environment of a UAV control station 200, such as UAV control station 110 (FIG. 32), customized to implement a collaborative human-automation tracking and targeting system (CHATTS) controller 202 consistent with embodiments of the innovation. UAV control station 200 is in part a customized information handling system (IHS) 100 that performs at least a part of the methodologies and features as described herein. UAV control station 200 can include processing resources for executing machine-executable code, such as a central processing unit (CPU), a programmable logic array (PLA), an embedded device such as a System-on-a-Chip (SoC), or other control logic hardware. UAV control station 200 can also include one or more computer-readable medium for storing machine-executable code, such as software or data. Additional components of UAV control station 200 can include one or more storage devices that can store machine-executable code, one or more communications ports for communicating with external devices, and various input and output (I/O) devices, such as a keyboard, a mouse, and a video display. UAV control station 200 can also include one or more interconnects or buses operable to transmit information between the various hardware components.

UAV control station 200 includes processors 204 and 206, chipset 208, memory 210, graphics interface 212, a basic input and output system/extensible firmware interface (BIOS/EFI) module 214, disk controller 216, hard disk drive (HDD) 218, optical disk drive (ODD) 220, disk emulator 222 connected to an external solid state drive (SSD) 224, input/output (I/O) interface (I/F) 226, one or more add-on resources 228, a trusted platform module (TPM) 230, network interface 232, management block 234, and power supply 236. Processors 204 and 206, chipset 208, memory 210, graphics interface 212, BIOS/EFI module 214, disk controller 216, HDD 218, ODD 220, disk emulator 222, SSD 224, I/O interface 226, add-on resources 228, TPM 230, and network interface 232 operate together to provide a host environment of UAV control station 200 that operates to provide the data processing functionality of the information handling system. The host environment operates to execute machine-executable code, including platform BIOS/EFI code, device firmware, operating system code, applications, programs, and the like, to perform the data processing tasks associated with UAV control station 200.

In a host environment, processor 204 is connected to chipset 208 via processor interface 238, and processor 206 is connected to the chipset 208 via processor interface 240. Memory 210 is connected to chipset 208 via a memory bus 242. Graphics interface 212 is connected to chipset 208 via a graphics bus 244, and provides a video display output 246 to graphical display(s) 248. In a particular embodiment, UAV control station 200 includes separate memories that are dedicated to each of processors 204 and 206 via separate memory interfaces. An example of memory 210 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 214, disk controller 216, and I/O interface 226 are connected to chipset 208 via an I/O channel 250. An example of I/O channel 250 includes a Peripheral Component Interconnect (PCI) interface, a PCI-Extended (PCI-X) interface, a high speed PCI-Express (PCIe) interface, another industry standard or proprietary communication interface, or a combination thereof. Chipset 208 can also include one or more other I/O interfaces, including an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. BIOS/EFI module 214 includes BIOS/EFI code operable to detect resources within UAV control station 200, to provide drivers for the resources, initialize the resources, and access the resources. BIOS/EFI module 214 includes code that operates to detect resources within UAV control station 200, to provide drivers for the resources, to initialize the resources, and to access the resources.

Disk controller 216 includes a disk interface 252 that connects the disk controller to HDD 218, to ODD 220, and to disk emulator 222. An example of disk interface 252 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 222 permits SSD 224 to be connected to UAV control station 200 via an external interface 254. An example of external interface 254 includes a USB interface, an IEEE 1394 (Firewire) interface, a proprietary interface, or a combination thereof. Alternatively, solid-state drive 164 can be disposed within UAV control station 200.

I/O interface 226 includes a peripheral interface 256 that connects the I/O interface to add-on resource 228, to TPM 230, and to network interface 232. Peripheral interface 256 can be the same type of interface as I/O channel 242, or can be a different type of interface. As such, I/O interface 226 extends the capacity of I/O channel 242 when peripheral interface 256 and the I/O channel are of the same type, and the I/O interface translates information from a format suitable to the I/O channel to a format suitable to the peripheral channel 256 when they are of a different type. Add-on resource 228 can include a data storage system, an additional graphics interface, a network interface card (NIC), a sound/video processing card, another add-on resource, or a combination thereof. Add-on resource 228 can be on a main circuit board, on separate circuit board or add-in card disposed within UAV control station 200, a device that is external to the information handling system, or a combination thereof.

Network interface 232 represents a NIC disposed within UAV control station 200, on a main circuit board of the information handling system, integrated onto another component such as chipset 208, in another suitable location, or a combination thereof. Network interface 232 includes network channels 258 and 260 that provide interfaces to devices that are external to UAV control station 200. In a particular embodiment, network channels 258 and 260 are of a different type than peripheral channel 256 and network interface 232 translates information from a format suitable to the peripheral channel to a format suitable to external devices. An example of network channels 258 and 260 includes InfiniBand channels, Fibre Channel channels, Gigabit Ethernet channels, proprietary channel architectures, or a combination thereof. Network channels 258 and 260 can be connected to external network resources (not illustrated). The network resource can include another information handling system, a data storage system, another network, a grid management system, another suitable resource, or a combination thereof. In an exemplary embodiment, network channel 258 is communicatively coupled to UAV 262 to directly adjust slaving of a sensor 264 or to perform other targeting. Network channel 260 is communicatively coupled to RPA control station 266 to indirectly adjust slaving of the sensor 264 or to perform other targeting.

Management block 234 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for UAV control station 200. In particular, management block 234 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of UAV control station 200, such as system cooling fans and power supplies. Management block 234 can include a network connection to an external management system, and the management block can communicate with the management system to report status information for UAV control station 200, to receive BIOS/UEFI or system firmware updates, or to perform other task for managing and controlling the operation of UAV control station 200. Management block 234 can operate off of a separate power plane from the components of the host environment so that the management block receives power to manage UAV control station 200 when the information handling system is otherwise shut down. An example of management block 234 may include a commercially available BMC product that operates in accordance with an Intelligent Platform Management Initiative (IPMI) specification. Management block 234 may further include associated memory devices, logic devices, security devices, or the like, as needed or desired.

Within memory 210, HDD 218, ODD 220, or SSD 224, one or more software and/or firmware modules and one or more sets of data can be stored that can be utilized during operations of UAV control station 200. These one or more software and/or firmware modules can be loaded into memory 210 during operation of UAV control station 200. Specifically, in one embodiment, memory 210 can include therein a plurality of such modules, including an object tracker application 268, one or more other applications 270, operating system (OS) 272, and data 274. These software and/or firmware modules have varying functionality as disclosed herein when their corresponding program code is executed by processors 204, 206.

FIG. 34 is a flow diagram of method 3400.

The present disclosure is related to reference (a) O. Mendoza-Schrock, M. M. Rizki, M. L. Raymer, & V. J. Velten, "Manifold Transfer Subspace Learning (MTSL) for High Dimensional Data Applications to Handwritten Digits and Health Informatics", Int'l Conf. IP, Comp. Vision, and Pattern Recognition (IPCV), July 2017. Reference (a) published less than a year prior to the priority date of the present application.

The present disclosure is related to reference (b) Mendoza-Schrock, Olga, Mateen M. Rizki, and Vincent J. Velten. "Manifold Transfer Subspace Learning (MTSL) for Applications in Aided Target Recognition." International Journal of Monitoring and Surveillance Technologies Research (IJMSTR) 5.3 (July 2017): 15-32. Reference (b) published less than a year prior to the priority date of the present application. The disclosure of reference (b) is hereby incorporated by reference in its entirety.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method of aided target recognition (AiTR) capable of achieving high target recognition rates for cross-dataset conditions and cross-domain applications, the method comprising:
   accessing source data comprising high-dimensional images of a first object;
   receiving target data from a sensor of an airborne platform of a second object that is unknown, the target data comprising high-dimensional images of the one or more unknown objects;
   normalizing the target data;
   computing a kernel matrix using a Euclidean distance between points and a Gaussian kernel;
   performing a manifold learning step;
   performing a transfer subspace learning step;
   computing the source data in a lower-dimensional subspace;
   computing the target data in a lower-dimensional subspace;
   performing a classification step by computing a classification rate for the target data in the lower-dimensional subspace based on the source data in a lower-dimensional subspace to identify at least one object in the target data;
   determining a geospatial location of a real-world object that corresponds to the identified at least one object in the target data; and
   directing a targeting system to target the real-world object
   wherein performing the manifold learning step comprises computing diffusion maps coordinates for the source data and coordinates for the target data using a Nystrom extension.

2. The method of claim 1, wherein the image data is a selected of: (i) an electro optical image; (ii) an infrared image; and (iii) a synthetic radar aperture image.

3. The method of claim 1, wherein:
   the manifold learning technique comprises a nonlinear dimensionality reduction technique of diffusion maps based on a heat diffusion analogy; and
   the transfer subspace learning technique comprises transfer Fisher's linear discriminative analysis.

4. The method of claim 1, wherein performing the transfer subspace learning step comprises computing a projection matrix that solves an optimization problem.

\* \* \* \* \*